(12) United States Patent
Mori et al.

(10) Patent No.: US 8,194,007 B2
(45) Date of Patent: Jun. 5, 2012

(54) ORGANIC ELECTRO LUMINESCENSE DISPLAY APPARATUS AND APPLICATION THEREOF

(75) Inventors: Yukio Mori, Hirakata (JP); Susumu Tanase, Kodama (JP); Atsuhiro Yamashita, Osaka (JP); Masutaka Inoue, Neyagawa (JP); Shigeo Kinoshita, Higashiosaka (JP); Haruhiko Murata, Ibaraki (JP); Takashi Yabukawa, Ibaraki (JP); Hiroyuki Goya, Kawanishi (JP); Yuichi Taneya, Osaka (JP); Masae Ichino, Osaka (JP); Kazuo Nakamoto, Higashiosaka (JP)

(73) Assignees: Sanyo Electric Co., Ltd., Osaka (JP); Sanyo Telecommunications Co., Ltd., Osaka (JP)

( * ) Notice: Subject to any disclaimer, the term of this patent is extended or adjusted under 35 U.S.C. 154(b) by 858 days.

(21) Appl. No.: 12/265,248

(22) Filed: Nov. 5, 2008

(65) Prior Publication Data
US 2009/0170564 A1 Jul. 2, 2009

Related U.S. Application Data

(60) Division of application No. 10/933,431, filed on Sep. 3, 2004, now Pat. No. 7,561,127, which is a continuation of application No. PCT/JP03/02503, filed on Mar. 4, 2003.

(30) Foreign Application Priority Data

| Mar. 4, 2002 | (JP) | 2002-057467 |
|---|---|---|
| Mar. 20, 2002 | (JP) | 2002-079418 |
| Mar. 27, 2002 | (JP) | 2002-089126 |
| Mar. 27, 2002 | (JP) | 2002-089127 |
| Mar. 27, 2002 | (JP) | 2002-089707 |
| Mar. 27, 2002 | (JP) | 2002-090017 |

(51) Int. Cl.
*G09G 3/30* (2006.01)

(52) U.S. Cl. .......................... 345/76; 345/82

(58) Field of Classification Search .............. 345/76–81, 345/211
See application file for complete search history.

(56) References Cited

U.S. PATENT DOCUMENTS 5,703,644 A * 12/1997 Mori et al. ............. 348/363
6,002,797 A * 12/1999 Mori et al. ............. 382/173
6,621,927 B1 * 9/2003 Mori et al. ............. 382/173

(Continued)

FOREIGN PATENT DOCUMENTS
CN 2429872 Y 5/2001
(Continued)

OTHER PUBLICATIONS

Japanese Notification of Reason(s) for Refusal, with English translation thereof, issued in Japanese Patent Application No. JP 2008-115944 dated on Dec. 2, 2008.

(Continued)

*Primary Examiner* — Nitin Patel
(74) *Attorney, Agent, or Firm* — McDermott Will & Emery LLP

(57) ABSTRACT

A technology for reducing the so-called "phosphor burn-in" phenomenon where the variation of luminance arises by reducing display luminance of a certain pixel caused by deterioration in a display apparatus constituted by an organic electro luminescence element is provided. In the display apparatus, when displaying an image acquired by an image acquiring unit, luminance substantially same as average luminance of the acquired image is set to a non-display area where the image is not displayed.

10 Claims, 43 Drawing Sheets

U.S. PATENT DOCUMENTS

| | | | |
|---|---|---|---|
| 6,850,214 B2 * | 2/2005 | Nishitani et al. | 345/87 |
| 6,963,335 B2 * | 11/2005 | Tanaka et al. | 345/204 |
| 7,176,912 B2 * | 2/2007 | Kota et al. | 345/211 |
| 7,304,621 B2 * | 12/2007 | Oomori et al. | 345/82 |
| 7,561,127 B2 * | 7/2009 | Mori et al. | 345/82 |
| 2002/0180723 A1 * | 12/2002 | Siwinski | 345/212 |
| 2002/0186214 A1 * | 12/2002 | Siwinski | 345/212 |
| 2003/0151573 A1 * | 8/2003 | Yamaguchi et al. | 345/89 |
| 2004/0217918 A1 * | 11/2004 | Ando et al. | 345/1.1 |
| 2005/0057462 A1 * | 3/2005 | Kota et al. | 345/76 |
| 2005/0122287 A1 * | 6/2005 | Nishitani et al. | 345/63 |

FOREIGN PATENT DOCUMENTS

| | | |
|---|---|---|
| CN | 1311617 A | 9/2001 |
| JP | 60-82384 U | 6/1985 |
| JP | 04-295887 | 10/1992 |
| JP | 06-102845 | 4/1994 |
| JP | 8-239177 | 9/1996 |
| JP | 9-114418 | 5/1997 |
| JP | 2001-245025 | 5/1997 |
| JP | 10-171427 | 6/1998 |
| JP | 10-222125 | 8/1998 |
| JP | 2000-221908 | 8/2000 |
| JP | 2000-227775 | 8/2000 |
| JP | 2000-105573 | 11/2000 |
| JP | 2000-322027 | 11/2000 |
| JP | 2000-352953 | 12/2000 |
| JP | 2001-075532 | 3/2001 |
| JP | 2001-078113 | 3/2001 |
| JP | 2001-092411 | 4/2001 |
| JP | 2001-92740 | 4/2001 |
| JP | 2001-111675 | 4/2001 |
| JP | 2001-117531 | 4/2001 |
| JP | 2001-175212 | 6/2001 |
| JP | 2001-184010 | 6/2001 |
| JP | 2002-91373 | 3/2002 |
| JP | 2002-268601 | 9/2002 |

OTHER PUBLICATIONS

Japanese Notification of Reason(s) for Refusal, with English translation thereof, issued in Japanese Patent Application No. JP 2008-115938 dated on Dec. 2, 2008.

Chinese Office Action, with English translation, issued in Chinese Patent Application No 200710140949.1, mailed Mar. 1, 2010.

European Office Action issued in European Patent Application No. 03 707 198.2-1228, dated Dec. 18, 2009.

Japanese Notification of Reason(s) for Refusal, w/ English translation thereof, issued in Japanese Patent Application No. JP 2008-115944 dated Aug. 4, 2009.

Chinese Office Action, w/ English translation thereof, issued in Chinese Patent Application No. CN 2007101409491 dated Sep. 4, 2009.

European Search Report issued in European Patent Application No. EP 03 70 7198 dated Oct. 1, 2009.

Korean Office Action dated May 26, 2006 with English Translation.

Korean Office Action with English translation issued in corresponding Korean Patent Application No. 10-2004-7013852, dated Dec. 29, 2006.

Office Action dated Mar. 30, 2007 for corresponding Chinese Patent Application No. 03805125.7 with English translation.

Korean Office Action, with English translation, issued in Korean Patent Application No. KR 10-2004-7013852, mailed May 18, 2007.

Chinese Office Action (with English Translation) issued in corresponding Chinese Patent Application No. 03805125.7 dated on Aug. 31, 2007.

Japanese Office Action with English Translation issued in Japanese Patent Application No. 2003-573631 dated on Feb. 26, 3008.

Japanese Office Action, with English translation, issued in Japanese Patent Application No. JP 2003-573631 dated on Nov. 5, 2008.

* cited by examiner

FIG.6

| AREA ID (110) | DISPLAY AREA SIZE (112) | DISPLAY AREA ACCUMULATED AVERAGE LUMINANCE (114) | NON-DISPLAY AREA ACCUMULATED AVERAGE LUMINANCE (116) |
|---|---|---|---|
| 1 | 100 × 100 | 70.5 | 70.3 |
| 2 | 100 × 200 | 72.2 | 71.5 |
| 3 | 200 × 100 | 70.9 | 70.8 |
| 4 | 200 × 200 | 71.1 | 71.6 |
| ⋮ | ⋮ | ⋮ | ⋮ |

FIG.14A
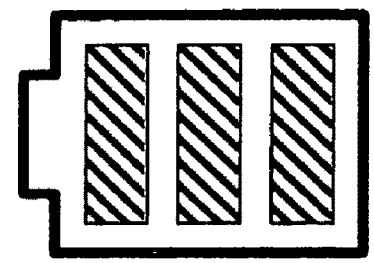
FIG.14B
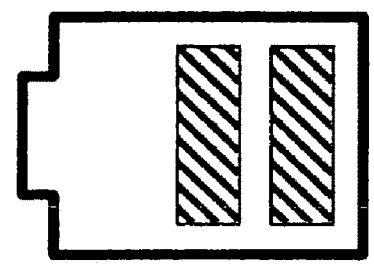
FIG.14C
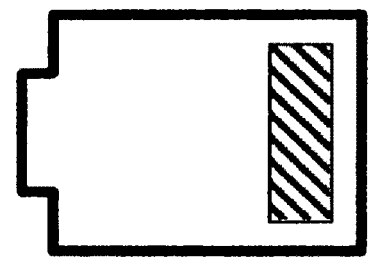
FIG.14D
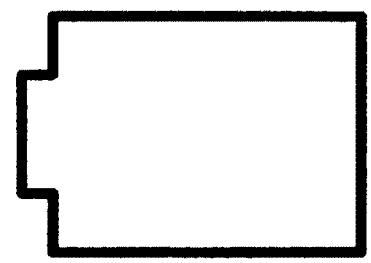
FIG.14E
充電

FIG.17A
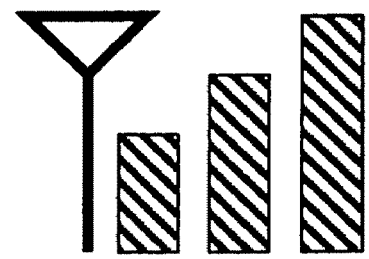
FIG.17B
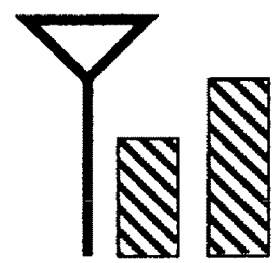
FIG.17C
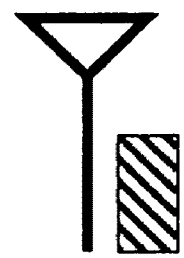
FIG.17D
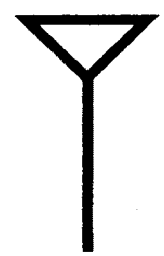
FIG.17E
圏外

ORGANIC ELECTRO LUMINESCENSE DISPLAY APPARATUS AND APPLICATION THEREOF

CROSS-REFERENCE TO RELATED APPLICATIONS

This application is a Divisional application of U.S. application Ser. No. 10/933,431, filed Sep. 3, 2004 now U.S. Pat. 7,561,127, which is a continuation application of International Application Number PCT/JP03/02503, filed on Mar. 4, 2003, which in turn claims the priority benefits of Japanese Patent Application Number JP2002-057467, filed on Mar. 4, 2002, Japanese Patent Application Number JP2002-079418, filed on Mar. 20, 2002, Japanese Patent Application Number JP2002-089126, filed on Mar. 27, 2003, Japanese Patent Application Number JP2002-089127, filed on Mar. 27, 2003, Japanese Patent Application Number JP2002-089707, filed on Mar. 27, 2003, and Japanese Patent Application Number JP2002-090017, filed on Mar. 27, 2002.

BACKGROUND OF THE INVENTION

1. Field of the Invention

The present invention relates to a display method and a display apparatus, and it particularly relates to a technology for averaging degradations of each optical element in an active matrix type organic electro-luminescence display apparatus and reducing variation of luminance thereof.

2. Description of the Related Art

Organic electro-luminescent displays (hereinafter, also referred to as "organic EL displays" or "organic EL panels") are attracting attention as new flat-type displays. In particular, active matrix type organic EL displays having thin film transistors (hereinafter, also referred to as "TFTs") as switching elements are regarded as sweeping out the currently prevailing liquid crystal displays in the near future, and are in a fierce development race for practical use.

Unlike liquid crystal displays, organic EL displays have self-luminous elements. This eliminates the need for a backlight which is indispensable to liquid crystal displays, promising apparatuses of yet lower profile and lighter weight. Moreover, organic EL panels are expected for application as a light emitting devices such as the backlight of liquid crystal displays using a self-luminous characteristic.

It is known that, as for the organic EL element, degradation progresses with luminescence and luminance thereof gradually decreases. Development of the organic luminescent material which does not deteriorate easily is important for providing the organic EL panel with high display quality and long life, of course, but it is unescapable that degradation with the passage of time arises for the organic EL element. The first thing to do is development of the technology for suppressing the influence of the degradation to the minimum at a present stage.

SUMMARY OF THE INVENTION

The present invention has been made in view of the foregoing circumstances and an object thereof is to provide a technology for improving display quality of a display apparatus.

An embodiment of the present invention relates to a display method. In this display method, when displaying an image on a display area narrower than an area which can be displayed, luminance data of a non-displaying area which does not display the image among the area which can be displayed is set as a guessed value of an average luminance of the image. "An area which can be displayed" means a whole display screen in the display apparatus, and "a display area" means an area where an image as an object of display is actually displayed among the area which can be displayed. "A non-displaying area" means an area other than the display area among the area which can be displayed. "Non-displaying" means that the image as an object of display is not displayed, and does not necessarily mean that nothing is displayed. The degradation speed of the display element which constitutes each pixel can be averaged over the whole screen and the variation in the display luminance resulting from the variation in degradation speed can be reduced, by making the average luminance of the image displayed on the display area and the average luminance of the image displayed on the non-displaying area become almost the same.

Another embodiment of the present invention relates to a display apparatus. This display apparatus comprising: an acquisition unit which acquires a first image to be displayed; a first setting unit which sets a first area in which the first image is displayed and places the first image on the first area; and a second setting unit which sets, when the first area is smaller than an area which can be displayed, a second image to be displayed on a second area in which the first image is not displayed; wherein said second setting unit sets the second image in a manner where a guessed value of an average luminosity of the first image is substantially same as a guessed value of an average luminosity of the second image. The average luminance of a general image may be guessed beforehand, and thus guessed average luminance may be made become almost the same as the average luminance of the second image. The luminance of more than 30% and less than 40%, or more favorably more than 30% and less than 35%, for example, of the maximum luminance may be adapted as the average luminance of the general picture.

The second setting unit may calculate the average luminance of the first image and may set the second image whose average luminance is substantially same as calculated average luminance of the first image to the second area. The degradation speed of the display elements can be averaged with higher accuracy by selecting the second image according to the average luminance of the first image whenever the first image is displayed.

Further another embodiment of the present invention also relates to a display apparatus. This display apparatus comprising: an acquisition unit which acquires a first image to be displayed; a first setting unit which sets a first area in which the first image is displayed and places the first image on the first area; a second setting unit which sets, when the first area is smaller than an area which can be displayed, a second image to be displayed on a second area in which the first image is not displayed; a first storing unit which stores an accumulative average luminance of the first image previously displayed on the first area; and a second storing unit which stores an accumulative average luminance of the second image previously displayed on the second area; wherein said second setting unit sets the second image in a manner where the accumulative average luminance of the second image approaches the accumulative average luminance of the first image. Though the average luminance of each first image differs from the average luminance of each second image somewhat, it does not necessarily lead to the variation in the display luminance immediately. These average luminance should just become almost the same for long term. The accumulative average luminance of the first images and second images may be stored, and the second image may be adjusted to make these accumulative average luminance values become almost the same for long term. The variation in the display luminance can be reduced by this method. According to this method, grater flexibility of a display can be achieved. For example, the second image can be selected based on the color or theme of the first image.

The second image may be an image in which all pixels have the almost same luminance data. That is, the second image may be an image which consisted of only one color. In this specification, the word an "image" is used, even if the image consists of only one color.

Optional combinations of the aforementioned constituting elements, and implementations of the invention in the form of methods, apparatuses and systems may also be practiced as additional modes of the present invention.

This summary of the invention does not necessarily describe all necessary features so that the invention may also be a sub-combination of these described features.

BRIEF DESCRIPTION OF THE DRAWINGS

The object described above, other objects, characteristics and advantages will be appreciated by referring to the preferred embodiments and associated drawings.

FIG. 6 is a figure showing an example of an internal data of an accumulated average luminance storing unit.

FIGS. 14A, 14B, 14C, 14D, and 14E are schematic diagrams showing five steps of a specific picture used for displaying residual quantity of a battery.

FIGS. 17A, 17B, 17C, 17D, and 17E are schematic diagrams showing five steps of a specific picture used for displaying antenna picture.

DETAILED DESCRIPTION OF THE INVENTION

The invention will now be described based on the preferred embodiments. This does not intend to limit the scope of the present invention, but exemplify the invention.

First Embodiment
[Example of the First Embodiment]

FIRST EXAMPLE

In the present embodiment, in order to average degradation speed of display elements which constitute pixels of a display apparatus on the whole screen, and to reduce variation in display luminosity resulting from variation in degradation speed, when displaying an image, an area where the image is not displayed is displayed in a color of about 30% of white which is assumed as average luminance of a general image.

Figure 1:
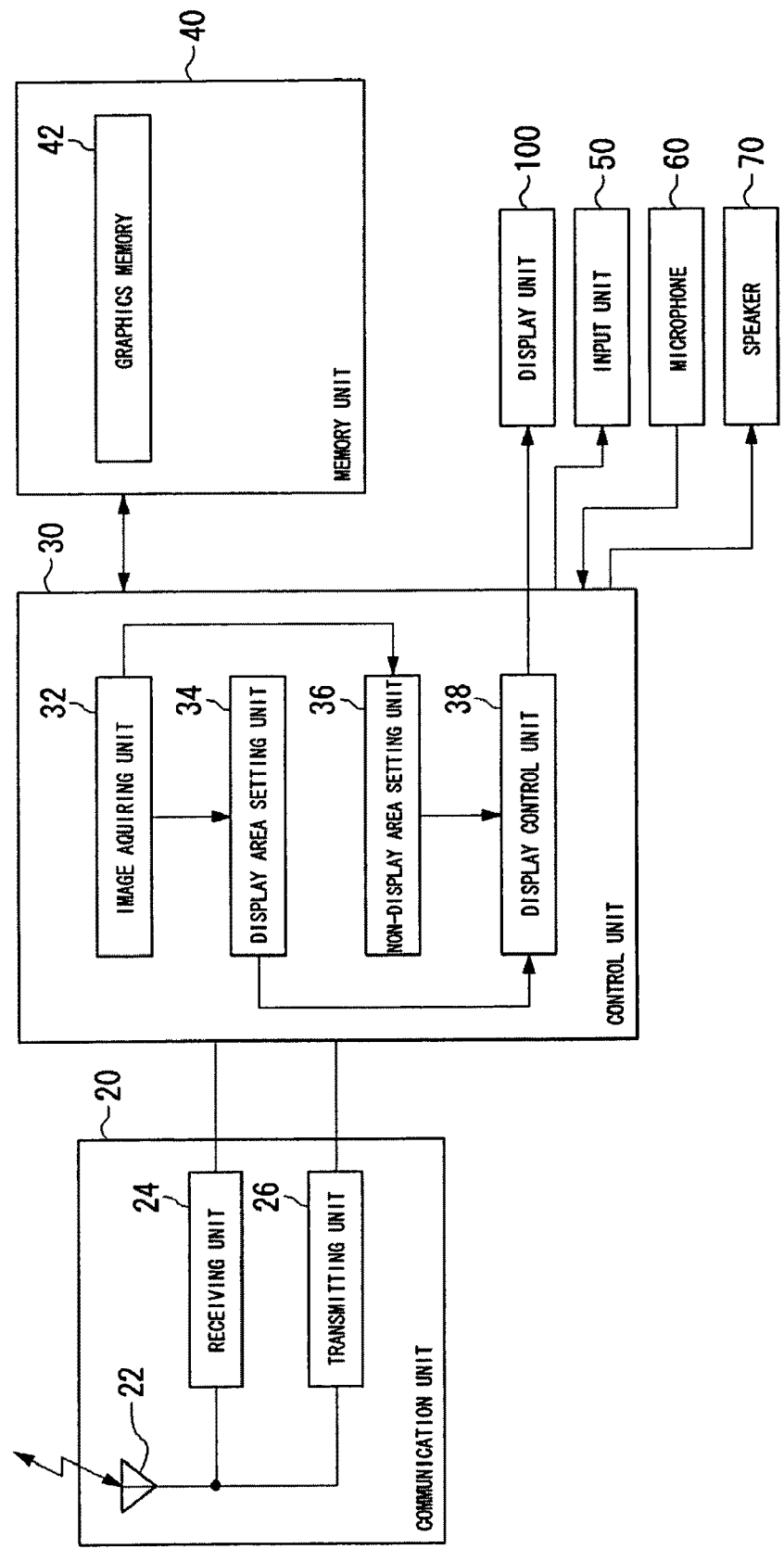
FIG. 1 is a figure showing an internal structure of a mobile terminal according to a first example of a first embodiment.

FIG. 1 shows an internal structure of a mobile terminal 10, as an example of a display apparatus of the present embodiment. The mobile terminal 10 mainly comprises a communication unit 20, a control unit 30, a memory unit 40, a display unit 100, an input unit 50, a microphone 60, and a speaker 70. The communication unit 20 includes an antenna 22 which transmits and receives a signal, a receiving unit 24 which decodes received signal, and a transmitting unit 26 which modulates and transmits data. The communication unit 20 controls communication with other apparatus via a cellular phone network. The display unit 100 displays text information, image information and the like. In this embodiment, an organic EL panel is used as the display unit 100. The display unit 100 may be an inorganic EL panel or a liquid crystal panel and the like. The technology of this embodiment is especially suitable for the organic EL panel with which degradation of the display element poses a problem. The input unit 50 receives input information from outside via a keyboard, mouse, button, and the like. The microphone 60 inputs audio information from outside. The speaker 70 outputs audio information to outside.

The control unit 30 controls of the mobile terminal 10 as a whole and performs various processings required for a display. In terms of hardware, this structure can be realized by a CPU, a memory and other LSIs of an arbitrary computer. In terms of software, it is realized by memory-loaded programs or the like having a function of controlling display, but drawn and described here are functional blocks that are realized in cooperation with those. Thus, it is understood by the skilled in the art that these functional blocks can be realized in a variety of forms by hardware only, software only or the combination thereof.

The image acquiring unit 32 acquires an image to be displayed from outside via the communication unit 20 or by reading out the image stored in the memory unit 40. The display area setting unit 34 sets an area to display the image inside an area which can be displayed in the display unit 100 according to the size of the acquired image. The non-display area setting unit 36 sets an image to be displayed on an area other than the display area among the area which can be displayed, that is, a non-display area in which the acquired image is not displayed. The display control unit 38 places the image acquired by the image acquiring unit 32 on the area set by the display area setting unit 34, and sets the image set by the non-display area setting unit 36 to the non-display area around the display area. The display control unit 38 thus generates the image data of the display screen and writes it to the graphics memory 42. Then, the display control unit 38 outputs the image data and the driving signal to each pixel of the display unit 100 at the predetermined timing.

Figure 2:
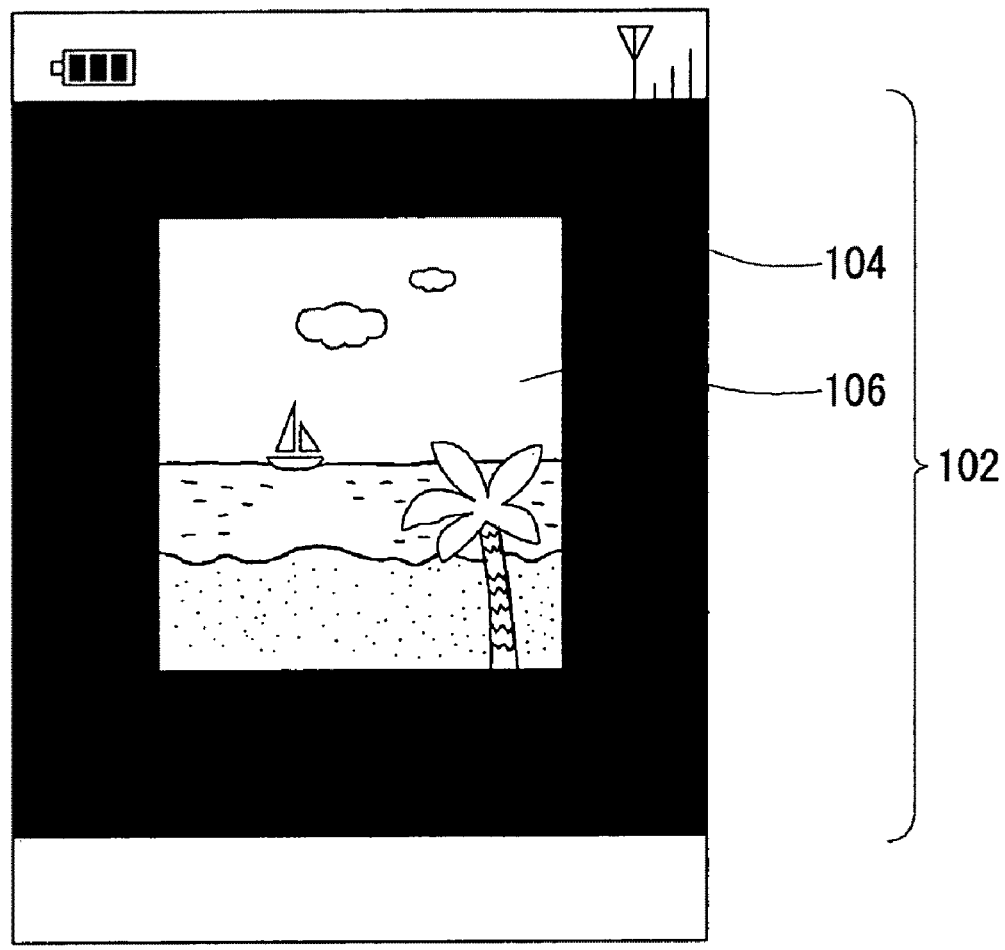
FIG. 2 is a figure showing a state where a display area is set up in the center of an area of a display unit which can be displayed, and an image is displayed.

FIG. 2 shows a state where the display area 104 is set up in the center of the area 102 which can be displayed of the display unit 100, and the image is displayed. In the example shown in FIG. 2, the display area 104 is set up in the center of the area 102 which can be displayed to display the image, and the non-display area 106 is set around the display area 104, because the size of the image is smaller than the area 102 which can be displayed. It is favorable, considering a viewpoint of reduction of the power consumption and reduction of the degradation of the organic EL element constituting each pixel, that the luminance of the non-display area 106 is set zero, that is, blackout. If an image is displayed on the display area 104 for a long time, however, since the time in which the pixel of the display area 104 is on becomes long as compared with the pixel of the non-displaying area 106, degradation of the organic EL element in the display area 104 will progress earlier, and luminance will decrease. As a result thereof, even if the whole screen is displayed with the same luminance data, the luminance of the organic EL element near center of the screen will become lower than the luminance of the organic EL element near end of the screen, and a part near center of the screen will be displayed darkly. Especially, when displaying the image of the same size frequently, as a result of continuing displaying an image on the same display area 104 for a long time, the pixel in the display area 104 deteriorates earlier than surrounding pixels and the luminance thereof decreases. Consequently, the so-called "phosphor burn-in" phenomenon will happen in which the rectangle of the display area 104 is seen when displaying an image on the whole screen.

In this embodiment, to reduce generating such a phenomenon, the non-display area setting unit 36 displays the non-display area 106 in color of about from 30% to 35% of white which is a guessed average luminance level of the general image to make the organic EL element in the non-display area 106 deteriorate to the same extent as the organic EL element in the display area 104. Thereby, the degradation speed of the organic EL element in a whole screen can be averaged and the variation in the luminance and the phosphor burn-in phenomenon can be reduced. By reducing the variation in the luminance and phosphor burn-in, it contributes also to an improvement of the life of the display unit 100.

Figure 3:
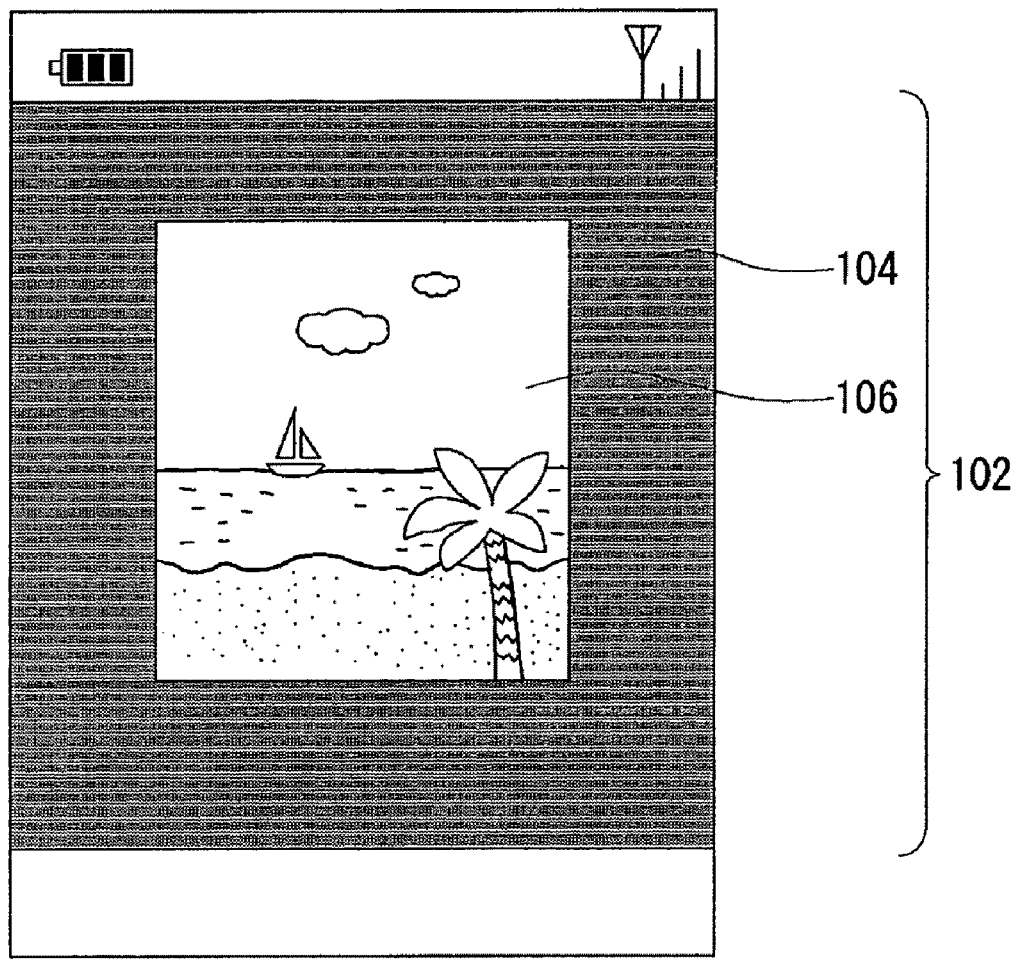
FIG. 3 is a figure showing a state where average luminance data of a general image is set up to a non-display area.

FIG. 3 shows a state where an image having average luminance of a general image is set up to a non-display area. In this example, the image constituted by one color of about 30% of white is set up to the non-display area 106. However, the image which has arbitrary colors and patterns may be set as long as the average luminance thereof is about 30% of white. In the case where the patterned image is displayed on the non-display area 106, two or more images whose average luminance is about 30% of white should be prepared. The image should be replaced suitably and displayed to prevent the phosphor burn-in of the image.

Figure 4:
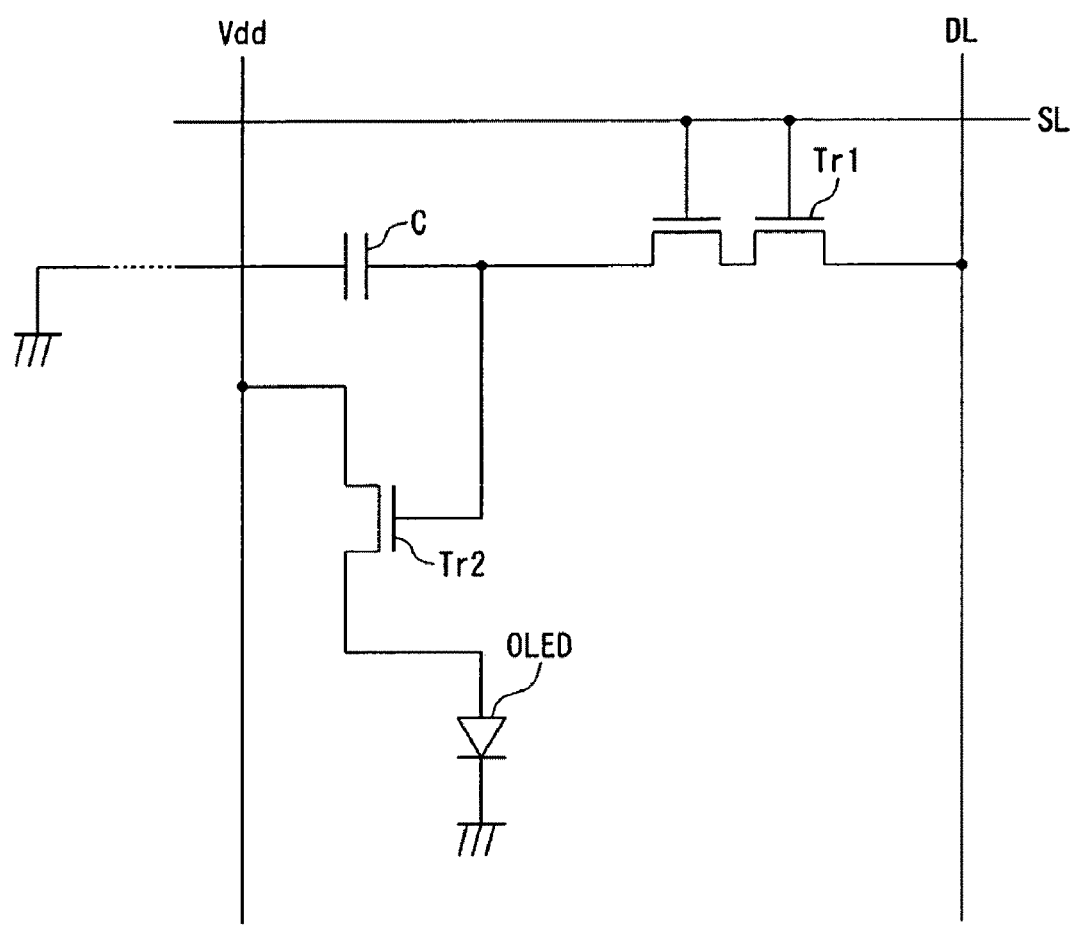
FIG. 4 is a figure showing a circuit structure of a single pixel of the display unit.

FIG. 4 shows a circuit structure of a single pixel of the display unit 100. This circuit comprises an organic light emitting element OLED, two transistors Tr1 and Tr2 for controlling the organic light emitting element OLED, a capacitor C, a scan line SL which transmits a scan signal, a data line DL which transmits a luminance data, and a power supply line Vdd which supplies current to the organic light emitting element.

The power supply line Vdd supplies an electric current for making the organic light emitting element OLED emit. The data line DL transmits luminance data for controlling luminance of each of the organic light emitting elements OLED. The scanning line SL transmits scan signals for controlling the emitting timing of each of the organic light emitting elements OLED. The luminance data and the scan signal are supplied by the display control unit 38.

A gate electrode of a first transistor Tr1 (hereinafter also referred to as "switching transistor") is connected to the scanning line SL. A drain electrode (or a source electrode) of the switching transistor Tr1 is connected to the data line DL. A source electrode (or a drain electrode) of the switching transistor Tr1 is connected to a gate electrode of a second transistor Tr2 (hereinafter also referred to as "driving transistor") In this embodiment, the switching transistor is a double-gate transistor having two gate electrodes. In another embodiment, the switching transistor may be a single-gate transistor or a multi-gate transistor having three or more gate electrodes. The switching transistor Tr1 may be an n-channel transistor or a p-channel transistor.

A source electrode (or a drain electrode) of the driving transistor Tr2 is connected to an anode of the organic light emitting element OLED. A drain electrode (or a source electrode) of the driving transistor Tr2 is connected to the power supply line Vdd. Similar to the switching transistor Tr1, the driving transistor Tr2 may be a single-gate transistor or a multi-gate transistor, and may be an n-channel transistor or a p-channel transistor.

An anode of the organic light emitting element OLED is connected to the source electrode (or the drain electrode) of the driving transistor Tr2. A cathode of the organic light emitting element OLED is connected to ground potential. An electrode of the capacitor C is connected to the drain electrode (or the source electrode) of the switching transistor Tr1 and the gate electrode of the driving transistor Tr2. Another electrode of the capacitor C is connected to ground potential via a wire not shown in figures, or may be connected to the power supply line Vdd.

An operation of the circuit structured as described above is explained hereinbelow. As the scan signal of the scanning line SL goes high for writing the luminance data to the organic light emitting element OLED, the switching transistor Tr1 turns on, the luminance data which is being inputted to the data line DL is set in the driving transistor Tr2 and the capacitor C. A current which corresponds to the luminance data thus flows between the source electrode and the drain electrode of the driving transistor Tr2, and this current flows in the organic light emitting element OLED, so that the organic light emitting element OLED emits. When the scan signal of the scanning line SL becomes low, the switching transistor Tr1 turns off, but the gate voltage of the driving transistor Tr2 is maintained, so that the organic light emitting element OLED continues emitting according to the set luminance data.

At the next emitting timing, the scan signal of the scanning line SL becomes high again, the switching transistor Tr1 turns on, then the new luminance data which is inputted to the data line DL is set in the driving transistor Tr2 and the capacitor C. Thereby, the organic light emitting element OLED emits corresponding to the new luminance data.

SECOND EXAMPLE

In this example, when the mobile terminal acquires the image to be displayed, the mobile terminal calculates average luminance of the image and selects an image to be displayed on the non-display area based on the average luminance. The internal structure of the mobile terminal according to this example is similar to the first example shown in FIG. 1. Hereinafter, a structure differing from that in the first embodiment will be mainly described.

The non-display area setting unit 36 calculates the average luminance of the image acquired by the image acquiring unit 32. The average luminance may be calculated for every signal of R, G, and B. The non-display area setting unit 36 may calculate the average luminance of luminance signal Y. The non-display area setting unit 36 displays an image whose average luminance is substantially the same as the calculated average luminance. The image may be an image may be covered with the average luminosity value or an image with pattern which is prepared in the memory unit 40 beforehand. In the case of the patterned image, the phosphor burn-in of the image can be prevented by replacing two or more images suitably and displaying.

THIRD EXAMPLE

In this example, an accumulated average luminance of images displayed on the display area and an accumulated average luminance of images displayed on the non-display area are stored, and the mobile terminal adjusts the images so that these accumulated average luminance values become almost the same for a long term.

Figure 5:
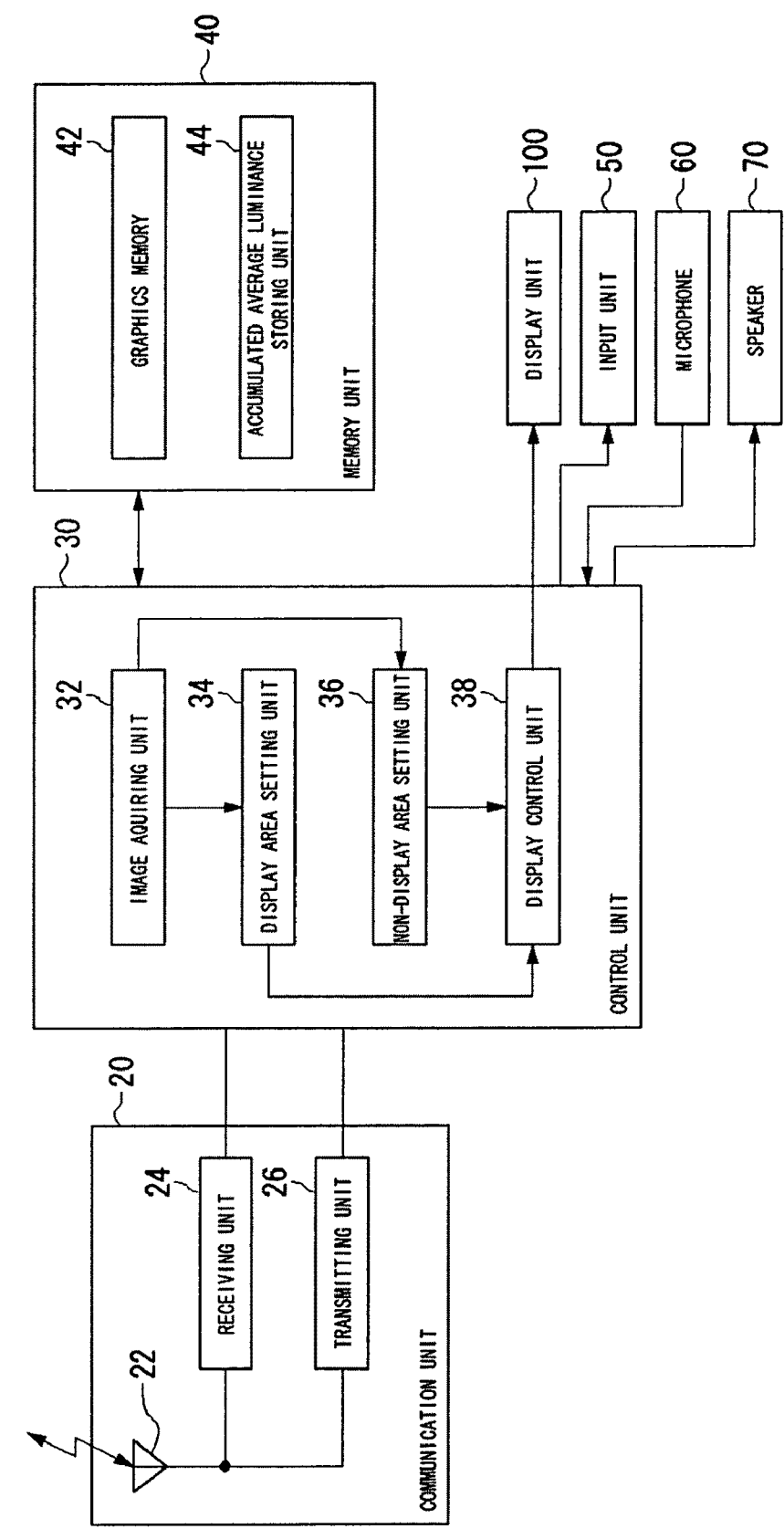
FIG. 5 is a figure showing an internal structure of a mobile terminal according to a third example of the first embodiment.

FIG. 5 shows an internal structure of the mobile terminal 10 according to the third example. The mobile terminal 10 of the present example further comprises an accumulated average luminance storing unit 44 in addition to the structure of the mobile terminal 10 of the first example shown in FIG. 1. Hereinafter, a structure differing from that in the first embodiment will be mainly described.

When the image acquiring unit 32 acquires an image to be displayed, the non-display area setting unit 36 calculates the average luminance of the image. The non-display area setting unit 36 reads out the accumulated average luminance of the display area and the accumulated average luminance of the non-display area for the display area from the accumulated average luminance storing unit 44 according to the size of the image. The non-display area setting unit 36 selects an image to be displayed on the non-display area so that these accumulated average luminance values can approach. For example, when the accumulated average luminance of the display area is lower than the accumulated average luminance of the non-display area, the image whose average luminance is higher than the average luminance of the image to be displayed this time is set as the non-display area. Thereby, the average luminance of the display area and the non-display area can be averaged in a long term. The non-display area setting unit 36 re-calculates the accumulated average luminance using the average luminance of the image displayed this time and the average luminance of the image displayed on the non-display area, and stores thus calculated accumulated average luminance in the accumulated average luminance storing unit 44. When a display image is a still image, the accumulated average luminance may be calculated in consideration of display time.

FIG. 6 shows an internal data of the accumulated average luminance storing unit 44. In the accumulated average luminance storing unit 44, an area ID column 110, a display area size column 112, a display area accumulated average luminance column 114, and a non-display area accumulated average luminance column 116. For example, when the size of the image acquired by the image acquiring unit 32 is 100 dots by 100 dots, the information of the record of area ID "1" is read by the non-display area setting part 36. Since the accumulated average luminance of the display area of area ID "1" is "70.5" and the accumulated average luminance of the non-display area is "70.3", the average luminance of the non-display area should just set up higher than the average luminance of the display area in this time. The non-display area setting unit 36 may adjust so that the accumulated average luminance of the display area and the non-display area may become equal by one display. The non-display area setting unit 36 may adjust so that the accumulated average luminance of the display area and the non-display area may become gradually equal by two or more displays.

The flexibility of the image set as the non-display area spreads according to this method. For example, when displaying a photograph and the like, a frame may be displayed around the photograph. Surrounding image can be selected according to the kind or color of the image displayed or taste of a user. When displaying an animation on the display area, if the average luminance of a surrounding image is changed according to change of the average luminance of the animation, there is a possibility that the screen becomes hard to see. In this case, the image displayed on the non-display area may be fixed with the image set up first, and the accumulated average luminance of the display area and the non-display area may be calculated and stored when the display of the animation is completed. In the next display, the accumulated average luminance should just be adjusted so that they can approach.

Above-mentioned embodiments are only exemplary. It is understood by those skilled in the art that there exist other various modifications to the combination of each component and process described above and that such modifications are encompassed by the scope of the present invention.

In this embodiment, explanation is made taking the case of the mobile terminal as the display apparatus. The technology of the present invention is not limited in this, however, and can also be applied to the arbitrary display apparatus like the television, the display of the computer.

[Effect of the First Embodiment]

The variation in luminance of a display apparatus can be reduced and display quality can be improved according to this embodiment.

Second Embodiment

[Field of the Second Embodiment]

The present embodiment relates to a mobile terminal comprising an organic EL (Electro Luminescence) display apparatus.

[Related Art of the Second Embodiment]

In recent years, development of an organic EL display is progressing. For example, adopting the organic EL display as a display of a cellular phone is in the air.

Figure 11:
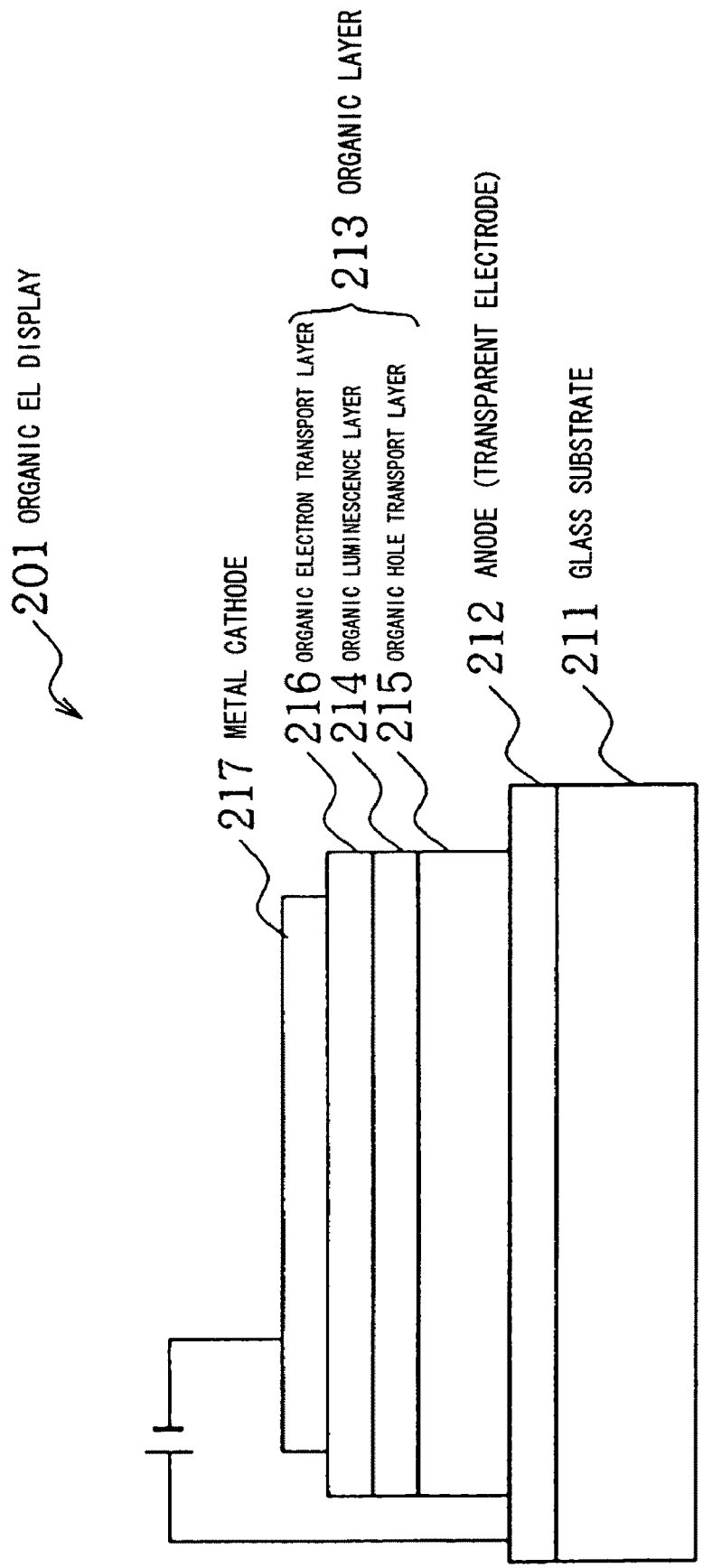
FIG. 11 is a figure showing a basic structure of an organic EL display.

As shown in FIG. 11, an organic layer 213 is formed on a glass substrate 211 by arranging an organic hole transport layer 215 and an organic electron transport layer 216 on both sides of the organic luminescence layer 214. An organic EL panel is formed by arranging an anode 212 and a cathode 217 on both sides of the organic layer 213. The organic luminescence layer 214 emits light by applying a predetermined voltage between the anode 212 and the cathode 217.

The anode 212 is made with transparent ITO (Indium Tin Oxide). The cathode 217 is made with Al—Li alloy for example. They are formed stripe type and arranged in the direction which crosses mutually configuring a matrix.

The anode 212 is used for a data electrode, and the cathode 217 is used for a scanning electrode, for example. In the state where one scanning electrode placed horizontally is selected, a voltage according to an input data is applied to each data electrode placed perpendicularly. Then the organic layer 213 emits light at the intersection of these electrodes and one line is displayed. The scanning electrode is scanned by switching perpendicularly one by one, and one field is displayed.

An active matrix type driving mode is known as the driving mode of the organic EL display, in which luminescence of each pixel is continued over one vertical scanning term, other than the above-mentioned passive matrix type driving mode in which the time division driving is performed using the scanning electrode and the data electrode.

Figure 12:
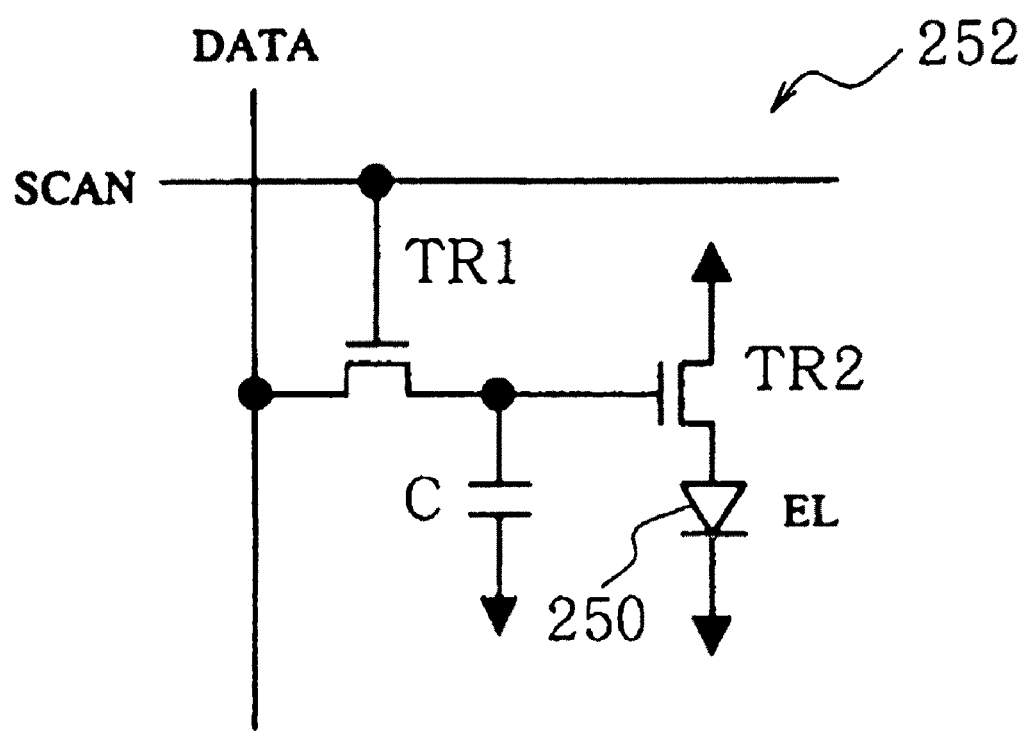
FIG. 12 is a circuit diagram of a single pixel of an active matrix type organic EL display.

In the active matrix type organic EL display, each pixel 252 comprises an organic EL element 250 constituted by a part of the organic layer, a driving transistor TR2 which controls current supply to the organic EL element 250, a writing transistor TR1 which turns on by being applied a scanning voltage SCAN from the scanning electrode, and a capacitor element C which holds charge by being applied a data voltage DATA from the data electrode when the writing transistor TR1 turns on, as shown in FIG. 12. The output voltage of the capacitor C is applied to a gate of the driving transistor TR2.

At first, a voltage is applied to each scanning electrode, then the first transistors Tr1 connected to this scanning electrode turns on. The data voltage (input signal) is applied to each data electrode synchronizing with this scan. The data voltage is held in the capacitor C at this time, because the first transistor TR1 is on.

The operating state of the second transistor TR2 is determined by the charge quantity held in this capacitor C. When the second transistor TR2 turns on, for example, current according to the data voltage is supplied to the organic EL element via the second transistor TR2. Consequently, The organic EL element 250 emits light with brightness according to the data voltage.

By the way, in the organic EL display, the luminescence characteristic of the organic EL element deteriorates with progress of luminescence time, the luminance obtained by the same input current may decrease consequently. In a cellular phone comprising the organic EL display, the luminescence frequency of pixels in a fixed area always becomes high when displaying a character of an e-mail on a screen. Thereby, the luminescence characteristic of these pixels deteriorate remarkably compared with other pixels. The problem so-called "phosphor burn-in" may arise as a result.

[Summary of the Second Embodiment]

The object of the present embodiment is to solve a problem of the "phosphor burn-in" with simple structure in a cellular phone comprising an organic EL display.

The mobile terminal according to this embodiment comprises an image processing circuit which can switch a display mode between a black character display mode in which a character part is displayed in black or a color with luminosity lower than that of a background part and the background part is displayed in white or a color with luminosity higher than that of the character part, and a white character display mode in which the background part is displayed in black or a color with luminosity lower than that of the character part and the character part is displayed in white or a color with luminosity higher than that of the background part, when displaying an electric mail on an organic electro-luminescence display apparatus; and a control circuit which controls an operation of said image processing circuit; wherein said control circuit alternately switches the display mode between the black character display mode and the white character display mode.

The control circuit may instruct a mode switch between the black character display mode and the white character display mode in accordance with a predetermined rule in the concrete. As a predetermined rule, the rule of changing the mode between a display of transmitted mail and a display of received mail, and the rule of changing the mode with a fixed cycle are employable, for example.

The control circuit may switch the mode at a random timing.

The mode switching described above can be achieved by simple change of the control program.

In the mobile terminal according to the present invention, the black character display mode in which a character is displayed with lower luminance and the white character display mode in which a character is displayed with higher luminance can be switched with a predetermined cycle, at a predetermined timing according to an operation of a user, or at a random timing. Thereby, the situation where only the pixel in a fixed area always emits light with high luminance can be avoided, and the problem of "phosphor burn-in" can be solved.

[Example of the Second Embodiment]

Hereinafter, an embodiment in which the present invention is carried out to the cellular phone will be concretely explained making reference to drawings.

Figure 7:
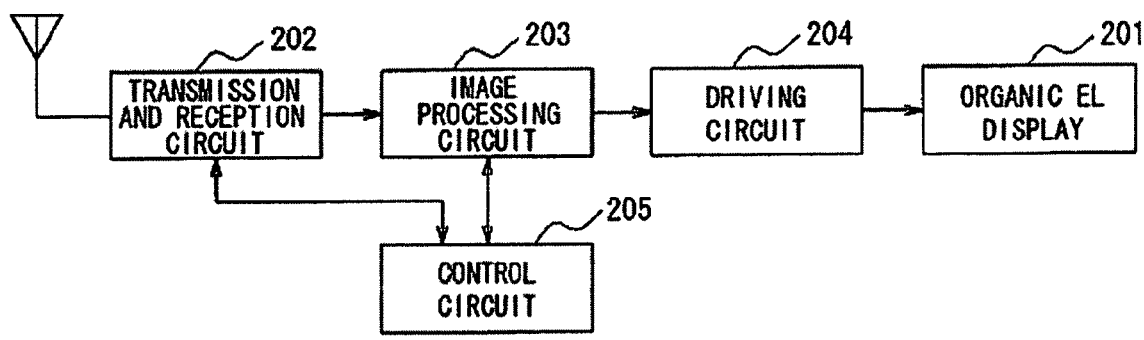
FIG. 7 is a block diagram showing a structure of a cellular phone according to a second embodiment.

As shown in FIG. 7, the mobile telephone of the present embodiment comprises a transmission and reception circuit 202, an image processing circuit 203 for displaying an electronic mail received or to be transmitted by the transmission and reception circuit 202 on an organic EL display 201, a driving circuit 204 which drives the organic EL display 201 in response to an image signal from the image processing circuit 203, and a control circuit 205 consisted of a micro computer which controls operations of the transmission and reception circuit 202 and the image processing circuit 203.

Figure 9:
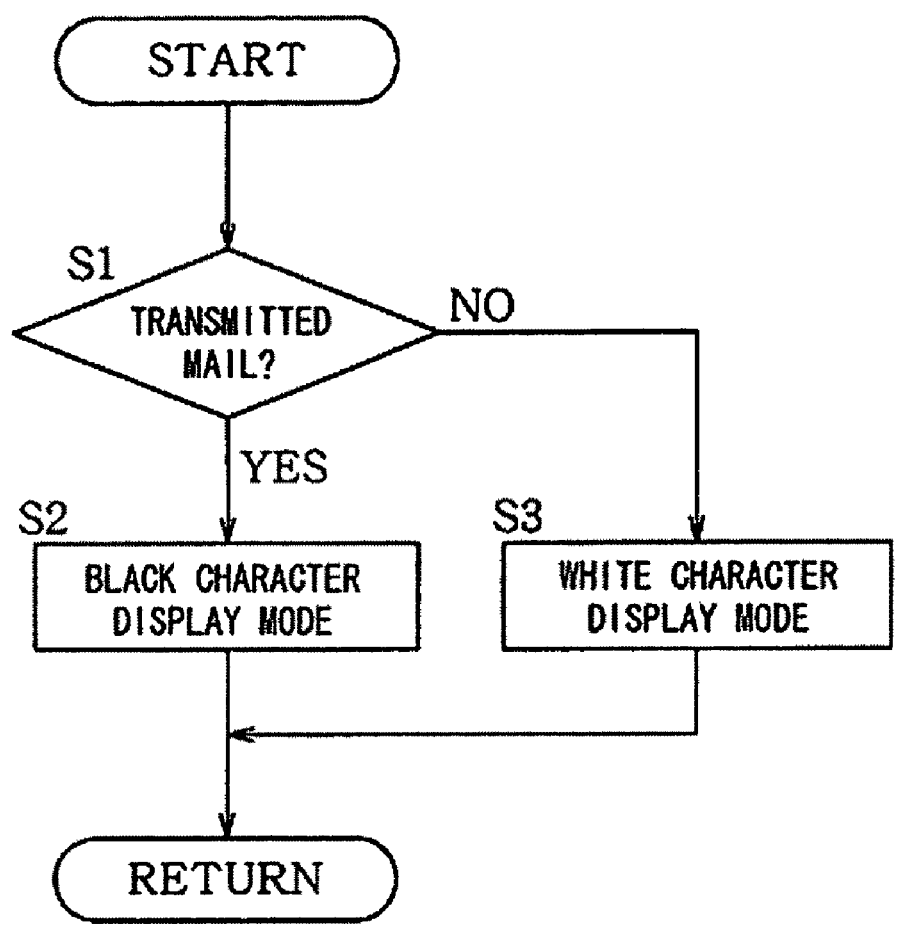
FIG. 9 is a flowchart showing an example of a procedure of changing a mode.

FIG. 9 shows procedures performed in case the control circuit 205 displays an e-mail on the organic EL display 201. At first, it is judged whether an electronic mail to be displayed is transmitted mail or not, at the step S1.

Figure 8A:
FIGS. 8A and 8B are figures for explaining a black character display mode and a white character display mode.

If the mail to be displayed is a transmitted mail, a black character display mode in which a character part is displayed in black and a background part is displayed in white is set as shown in FIG. 8A, and the control circuit 205 supplies a mode switching signal to the image processing circuit 203, at the step S2.

On the other hand, if the mail to be displayed is a received mail, a white character display mode in which a character part is displayed in white and a background part is displayed in black is set, and the control circuit 205 supplies a mode switching signal to the image processing circuit 203, at the step S3 of FIG. 9.

Figure 8B:
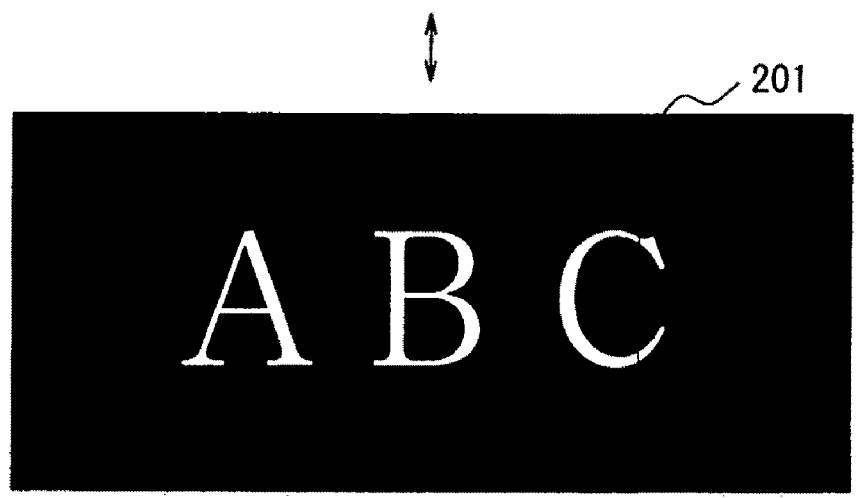

The transmitted mail is displayed in the black character display mode on the organic EL display 201 as shown in FIG. 8A, and the received mail is displayed in the white character display mode on the organic EL display 201 as shown in FIG. 8B, consequently.

Figure 10:
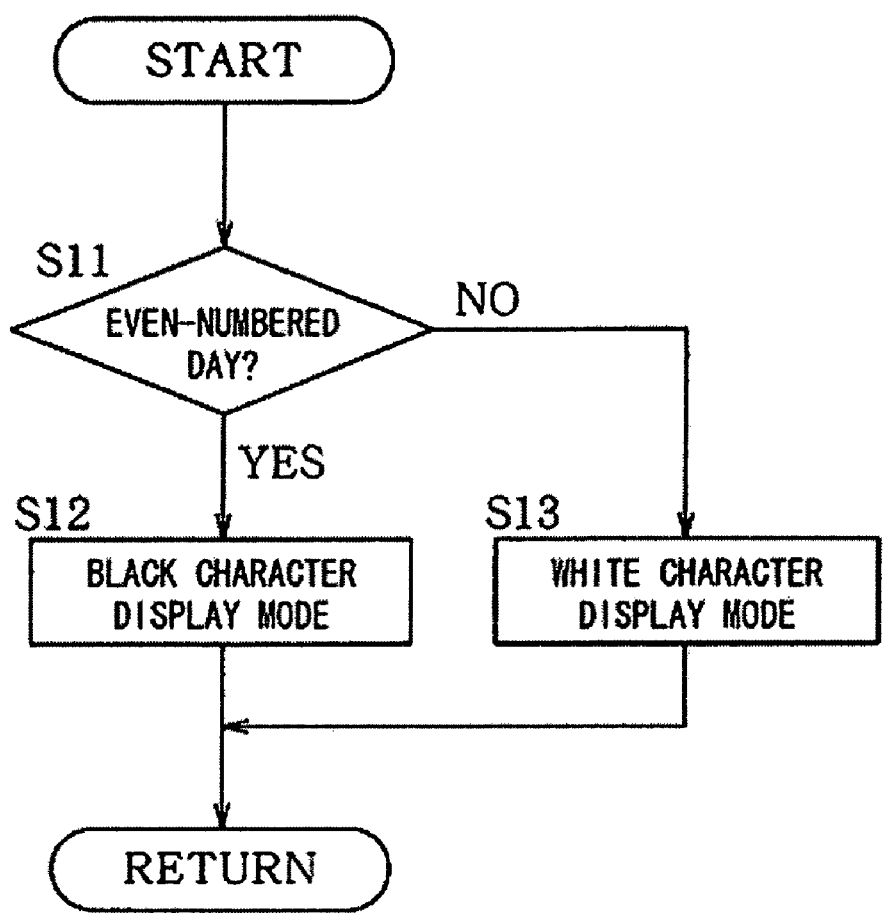
FIG. 10 is a flowchart showing another example of a procedure of changing a mode.

FIG. 10 shows other procedures performed in case the control circuit 205 displays an e-mail on the organic EL display 201. At first, it is judged whether today is even-numbered day or not, at the step S11.

If today is even-numbered day, a black character display mode in which a character part is displayed in black and a background part is displayed in white is set as shown in FIG. 8A, and the control circuit 205 supplies a mode switching signal to the image processing circuit 203, at the step S12.

On the other hand, if today is odd-numbered day, a white character display mode in which a character part is displayed in white and a background part is displayed in black is set, and the control circuit 205 supplies a mode switching signal to the image processing circuit 203, at the step S13 of FIG. 10.

The transmitted mail and the received mail are displayed in the black character display mode on the organic EL display 201 at even-numbered day as shown in FIG. 8A, and displayed in the white character display mode on the organic EL display 201 at odd-numbered day as shown in FIG. 8B, consequently.

In the mobile telephone of the present embodiment, since the black character display mode and the white character display mode are switched by whether an E-mail is a transmitted mail or a received mail, or whether today is an even-numbered day or an odd-numbered day, the luminance of pixels which constitute the organic EL display 201 can be averaged in time over the whole screen, and deviation of the luminance can be reduced. Consequently, the "Phosphor burn-in" resulting from only some pixels carrying out age degradation early can be prevented.

Moreover, in a conventional mobile telephone which always displays a character part in black and a background part in white, the power consumption of the organic EL display was large because the white background part occupies larger area than the black character part. In the mobile telephone of the present embodiment, however, the power consumption can be reduced because the black character display mode and the white character display mode can be switched.

Each component of the present invention is not limited to the above-mentioned embodiment. Various changes can be made without departing from the scope of the technology which is described in the claims.

Various changing rules are employable, for example: a rule in which the black display mode and the white display mode are switched every time the power of the cellular phone is turned on; a rule in which the mode is switched every time a mail screen is displayed; a rule in which the mode is switched between a case of writing mail and a case of reading mail; a rule in which the mode is switched for every time or predetermined number of times on the occasion of a display of a mail at the time of mail creation; a rule in which the mode is switched for every time or predetermined number of times on the occasion of a display of a mail which has already been received or transmitted. Moreover, the structure where the mode is switched at a random timing without following a predetermined rule can be adopted.

[Effect of the Second Embodiment]

The "phosphor burn-in" problem can be solved with simple component by a mobile terminal comprising an organic EL display according to the present embodiment.

Third Embodiment

[Field of the Third Embodiment]

The present embodiment relates to a method for displaying a specific picture (a picture writing) called "PICT" like an antenna picture, a picture showing residual quantity of a battery, and the like, in a cellular phone comprising an organic EL (Electro Luminescence) display.

[Related Art of the Third Embodiment]

In a color organic EL display, one color pixel is constituted by three kinds of organic EL elements (R luminescent element, G luminescent element, and B luminescent element) which emit R, G, and B light respectively. The luminescent elements deteriorates and luminance thereof decreases, if the color organic EL display is used over a long term. Especially, if large current is continuously supplied to the luminescent element, that is, the luminescent element continuously emits light with high luminance, the speed of reduction of luminance becomes high.

[Summary of the Third Embodiment]

The object of this embodiment is to provide a display method of a specific picture that can make hard to be conspicuous in luminance degradation with displaying the picture.

A display method according to the first aspect of the present embodiment is a display method of a specific picture which is displayed on a color organic EL display and a lighting part thereof increases or decreases according to a situation, wherein the higher a probability of lighting of a part, the lower luminance of the part is set beforehand.

A display method according to the second aspect of the present embodiment is a display method of the specific picture according to the first aspect, wherein the specific picture is a picture showing an antenna and/or a picture showing residual quantity of a battery.

A display method according to the third aspect of the present embodiment is a display method of a specific picture which is displayed at areas which overlie each other on a color organic EL display, in which two or three kinds of the specific picture in roughly classification are switched and displayed according to a situation, wherein a dot which constitutes each specific picture is set up in a manner where a color of an emitting element turned on differs mutually among the two or three kinds of the specific picture.

A display method according to the fourth aspect of the present embodiment is a display method of the specific picture according to the third aspect, wherein the specific picture is a picture of an antenna which is switched between a first picture showing an antenna bar and a second picture showing a character showing outside an area where an electric wave reaches.

A display method according to the fifth aspect of the present embodiment is a display method of the specific picture according to the third aspect, wherein the specific picture is a picture showing residual quantity of a battery which is switched between a first picture showing a bar showing the residual quantity of the battery and a second picture showing a character showing a charge.

A display method according to the sixth aspect of the present embodiment is a display method of a plurality of specific pictures which is displayed on a color organic EL display, wherein the higher a frequency of displaying a pixel is, the lower luminance of the pixel is set beforehand.

[Example of the Third Embodiment]

Hereinafter, an example where the present invention is adopted to a cellular phone comprising a color organic EL display will be explained with reference to drawings.

Figure 13:
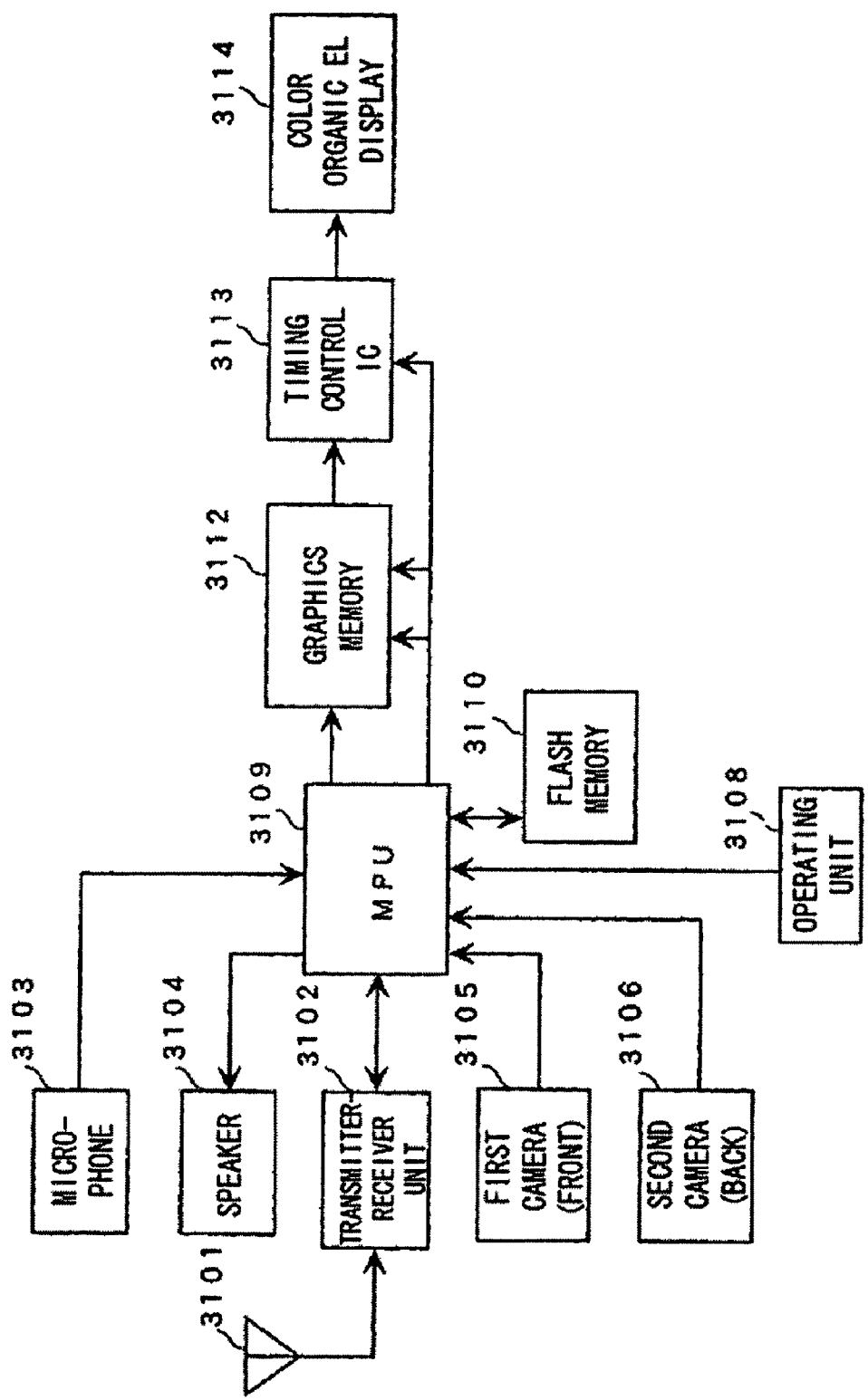
FIG. 13 is a block diagram showing a schematic structure of a cellular phone.
Figure 15:
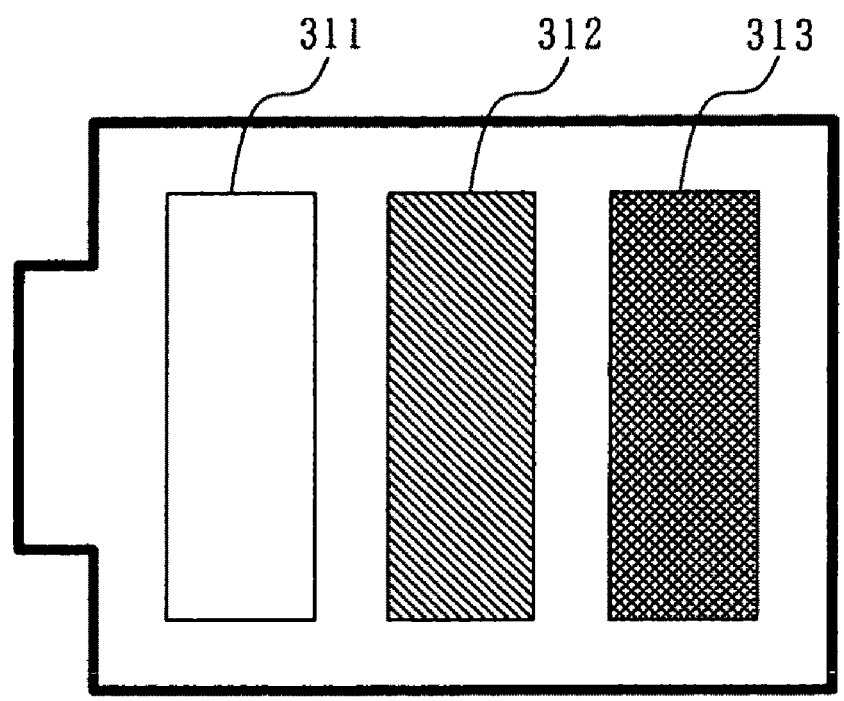
FIG. 15 is a schematic diagram showing an example of initial display in case where display luminance of a rightmost bar is set up lowest, a leftmost bar highest, and a mean value of them is set up as display luminance of a central bar, in the battery residual quantity picture.

FIG. 13 shows a schematic structure of a cellular phone. An MPU 3109 controls a cellular phone as a whole. An antenna 3101 transmits and receives an electric wave. A transmitter-receiver unit 3102 receives the electric wave and transmits the received content to the MPU 3109. The transmitter-receiver unit 3102 transmits a transmission signal outputted from the MPU 3109 with the electric wave.

A microphone 3101 communicates an audio signal to the MPU 3109. A speaker 3104 outputs an audio signal outputted from the MPU 3109 as a sound. A first camera 3105 is a camera attached in the front of a main body of the cellular phone in which a color organic EL display 3114 is formed, and transmits shot image to the MPU 3109. A second camera 3106 is a camera attached in the back of the cellular phone, and transmits shot image to the MPU 3109. At a shooting mode, an image shot by the camera 3105 or 3106 is displayed on the color organic EL display 3114 instead of a display image at a normal mode.

An operating unit 3108 is comprised in the main body of the cellular phone, includes various buttons and various switches. In a flash memory 3110, data which should be saved when a power turns off are stored.

In a graphics memory 3112, image data to be displayed on the display is stored. Image data is written at the predetermined address in the graphics memory 3112 based on the image data and a write control signal outputted from the MPU 3109. Pixel data of the pixel corresponding with a display cycle of the color organic EL display is outputted from the graphics memory 3112 according to a scan timing.

A timing control IC 3113 supplies a drive signal to the organic EL display 3114 with the image data, and displays an image on the color organic EL display 3114.

In the color organic EL display 3114, a single color pixel is constituted with three kinds of organic EL elements (R luminescent element, G luminescent element, B luminescent element) which emit light in R, G, B, respectively. Such a color organic EL display 3114 includes the organic EL element for each color luminescence of RGB (R luminescent element, G luminescent element, B luminescent element).

In such a cellular phone, a battery residual quantity picture which shows residual quantity of a battery and an antenna picture which shows reception sensitivity are displayed on the upper part of the display screen of the color organic EL display 3114. In the present embodiment, the following three methods are proposed as the display method of such specific pictures.

The first method is a display method of a specific picture which is displayed on a color organic EL display 314 and a lighting part thereof increases or decreases according to a situation, wherein the higher a probability of lighting of a part, the lower luminance of the part is set beforehand.

The second method is a display method of a specific picture which is displayed at areas which overlie each other on a color organic EL display 3114, in which two or three kinds of the specific picture in roughly classification are switched and displayed according to a situation, wherein a dot which constitutes each specific picture is set up in a manner where a color of an emitting element turned on differs mutually among the two or three kinds of the specific picture.

The third method is a display method of a plurality of specific pictures which is displayed on a color organic EL display 3114, wherein the higher a frequency of displaying a pixel is, the lower luminance of the pixel is set beforehand.

Hereinafter, these method will be explained more concretely.

[1] Explanation about the First Method

[1-1] Explanation in the Case Where the First Method is Adopted to the Battery Residual Quantity Picture As shown in FIGS. 14A-14E, a first picture showing a level of the residual quantity of the battery with 0 to 3 bars (FIGS. 14A, 14B, 14C, 14D), and a second picture showing a character of "charge" (FIG. 14E) are prepared for displaying the battery residual quantity picture. This second picture is displayed when the residual quantity of the battery decreases extremely.

The first picture consists of a battery frame figure imitated the battery and bars displayed in the battery frame figure. As shown in FIGS. 14A, 14B, 14C, and 14D, the bars displayed in the battery frame figure change to four stages like 3, 2, 1, and 0. The more bars are displayed, the more residual quantity of the battery is left.

Five kinds of images shown in FIGS. 14A, 14B, 14C, 14D, and 14E are switched and displayed according to the battery residual quantity level. The first picture (bar) is displayed in green for example, and the second picture (character of "charge") is displayed in red.

In the first method, the higher a probability of lighting of a bar, the lower the luminance of the bar is set beforehand. The probability of lighting of the rightmost bar is highest, the probability of lighting of the leftmost bar is lowest, and the probability of the middle bar is middle of the rightmost bar and the leftmost bar. Therefore, the display luminance of the rightmost bar 313 is set lowest, the display luminance of the leftmost bar 311 is set highest, and the display luminance of the middle bar 312 is set as the intermediate value thereof.

Figure 16A:
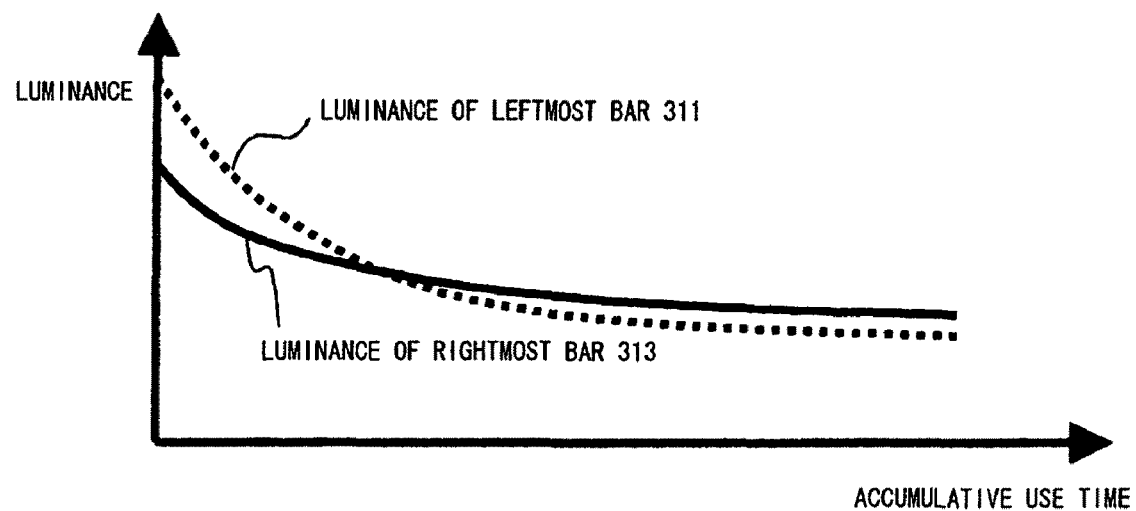
FIGS. 16A and 16B are graphs showing a change over time of display luminance of a rightmost bar which has high probability to light (solid line) and a change over time of display luminance of a leftmost bar which has low probability to light (doted line).
Figure 16B:
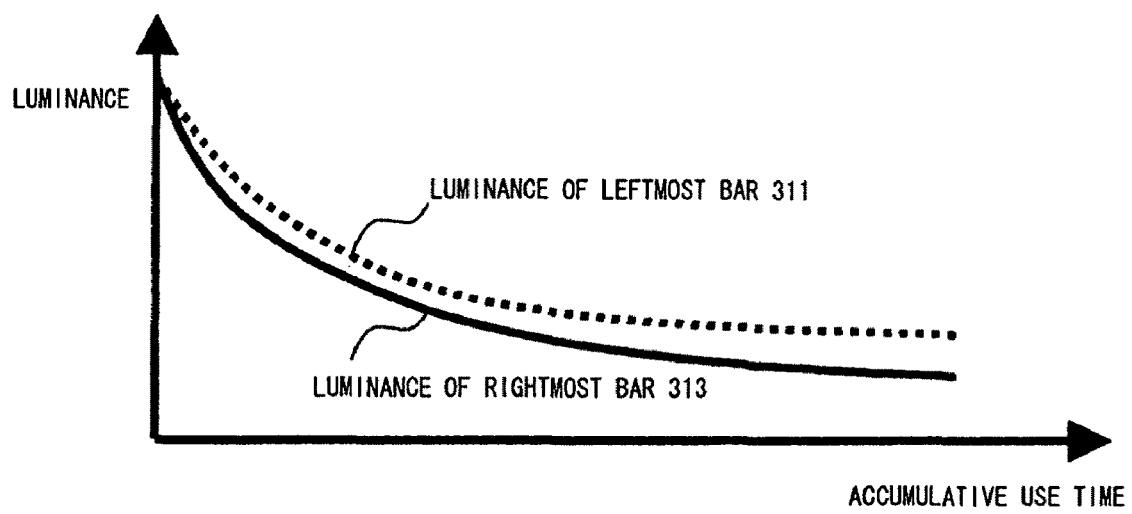

FIGS. 16A and 16B show a change over time of the display luminance of the rightmost bar which has high probability to light (solid line) and a change over time of the display luminance of the leftmost bar which has low probability to light (doted line).

FIG. 16A shows a change over time of the display luminance in the case where the display luminance of the bar which has high probability to light is set low beforehand (the first method). FIG. 16B shows a change over time of the display luminance in the case where the display luminance of the bars are set as equal value beforehand (the conventional method).

The reduction speed of the display luminance of the rightmost bar which has high probability of lighting is higher than that of the leftmost bar which has low probability of lighting. Thereby, the difference between the display luminance of these bars becomes gradually large when accumulated usage time of the cellular phone becomes long.

The display luminance of the leftmost bar and the display luminance of the rightmost bar are gradually averaged and the difference between the display luminance of both becomes small as accumulative use time becomes large, because the display luminance of the bar which has higher probability of frequency of lighting is set lower beforehand. If it passes over the time when the difference between the display luminance of both becomes zero, the difference of the luminance spreads to the opposite direction. Use time can be extended until the difference of the luminance becomes incapable for visibility.

Considering three bars, the display luminance of each bars are gradually averaged and the differences between the display luminance values of each bars become small as accumulative use time becomes large, because the display luminance of the bar which has higher probability of frequency of lighting is set lower beforehand in the first method. If it passes over the time when the difference between the display luminance of each bars becomes zero, the difference of the luminance spreads to the opposite direction. Use time can be extended until the difference of the luminance becomes incapable for visibility.

[1-2] Explanation in the Case Where the First Method is Adopted to the Antenna Picture As shown in FIGS. 17A-17E, a first picture showing a receiving sensitivity with 0 to 3 bars (FIGS. 17A, 17B, 17C, 17D), and a second picture showing a character of "outside" (FIG. 17E) are prepared for displaying the antenna picture. This second picture is displayed when the receiving sensitivity decreases extremely.

The first picture consists of a antenna figure imitated the antenna and bars displayed right side of the antenna figure. As shown in FIGS. 17A, 17B, 17C, and 17D, the bars displayed right side of the antenna figure change to four stages like 3, 2, 1, and 0. The more bars are displayed, the higher the receiving sensitivity of the antenna is.

Five pictures shown in FIGS. 17A-17E is switched and displayed according to receiving sensitivity. The first picture is displayed in green, the second picture is displayed in red, for example.

Figure 18:
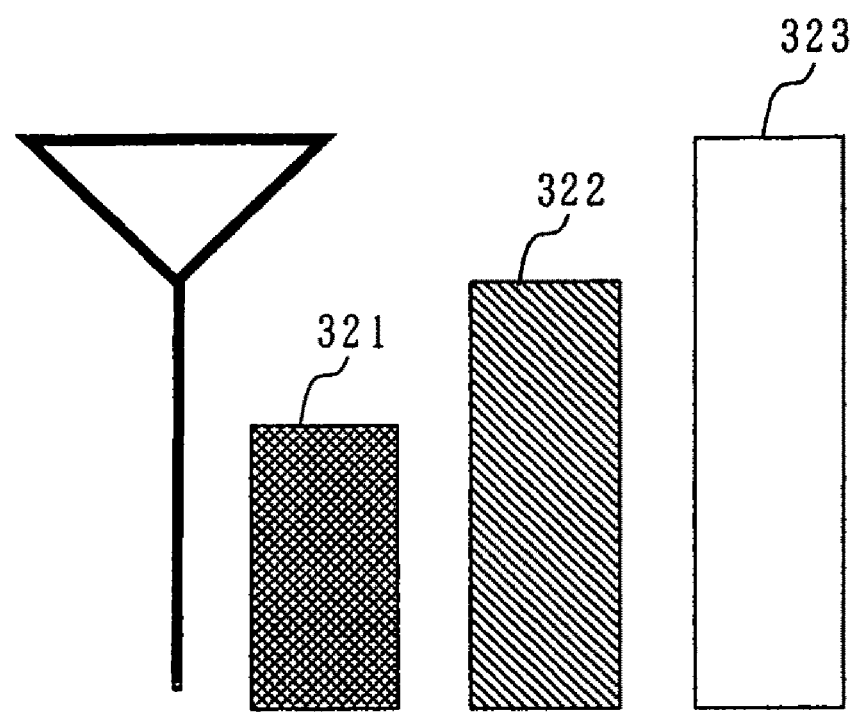
FIG. 18 is a schematic diagram showing an example of initial display in case where display luminance of a leftmost bar is set up lowest, a rightmost bar highest, and a mean value of them is set up as display luminance of a central bar, in the antenna picture.

In the first method, the higher a probability of lighting of a bar, the lower the luminance of the bar is set beforehand. The probability of lighting of the leftmost bar is highest, the probability of lighting of the rightmost bar is lowest, and the probability of the middle bar is middle of the rightmost bar and the leftmost bar. Therefore, the display luminance of the leftmost bar 321 is set lowest, the display luminance of the rightmost bar 323 is set highest, and the display luminance of the middle bar 322 is set as the intermediate value thereof, as shown in FIG. 18.

Also in this case, the display luminance of each bars are gradually averaged and the differences between the display luminance values of each bars become small as accumulative use time becomes large, because the display luminance of the bar which has higher probability of frequency of lighting is set lower beforehand in the first method. If it passes over the time when the difference between the display luminance of each bars becomes zero, the difference of the luminance spreads to the opposite direction. Use time can be extended until the difference of the luminance becomes incapable for visibility.

[2] Explanation about the Second Method

A display method of a specific picture which is displayed at areas which overlie each other on a color organic EL display, in which two or three kinds of the specific picture in roughly classification are switched and displayed according to a situation, wherein a dot which constitutes each specific picture is set up in a manner where a color of an emitting element turned on differs mutually among the two or three kinds of the specific picture.

As mentioned above, in the color organic EL display 3114, a single color pixel is constituted with three kinds of organic EL elements (R luminescent element, G luminescent element, B luminescent element) which emit light in R, G, B, respectively. That is, the single color pixel is constituted with three dots.

As the battery residual quantity picture, the first pictures showing residual quantity level of the battery with 0-3 bar(s) (FIGS. 14A, 14B, 14C, 14D) and the second picture showing the character of "charge" (FIG. 14E) are switched and displayed according to the situation as mentioned above.

In the second method, the dots which constitute the first picture (bar) and the second picture (character of charge) are set in a manner where the kind of color of the emitting elements turned on when displaying these pictures differs each other.

Figure 19A:
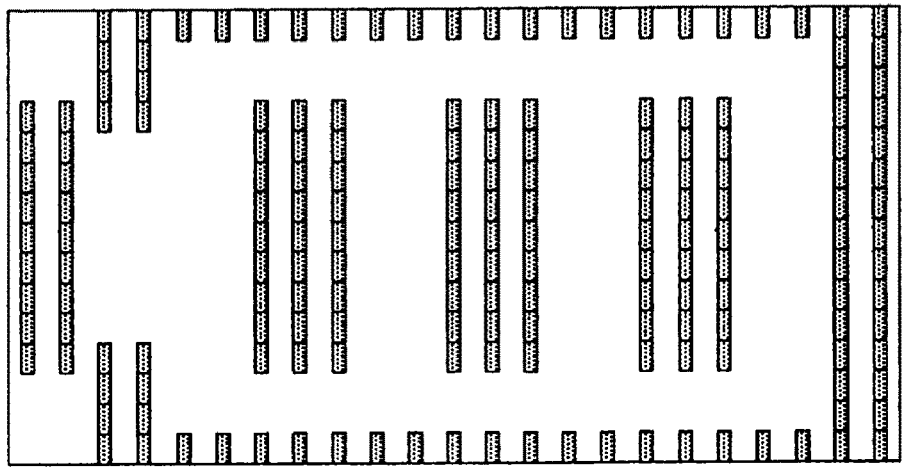
FIGS. 19A, 19B, and 19C are schematic diagrams showing dots constituting a first picture (bar) and dots constituting a second picture (character of "charge") in the battery residual quantity picture.
Figure 19B:
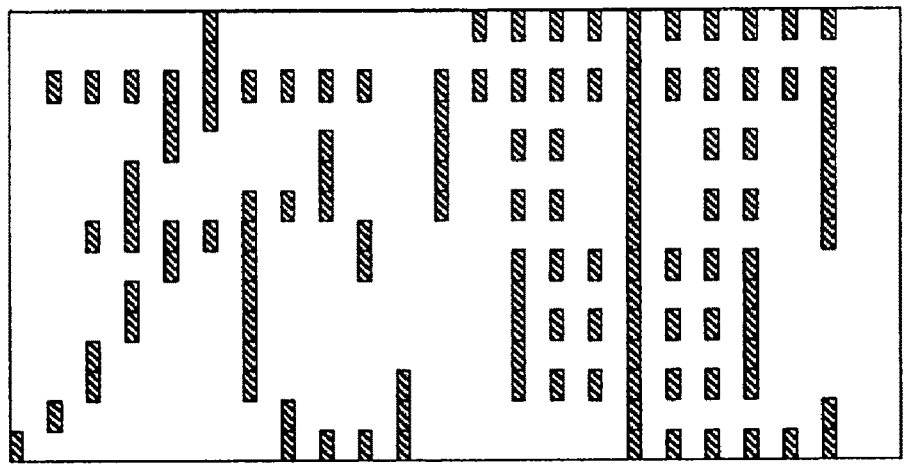
Figure 19C:
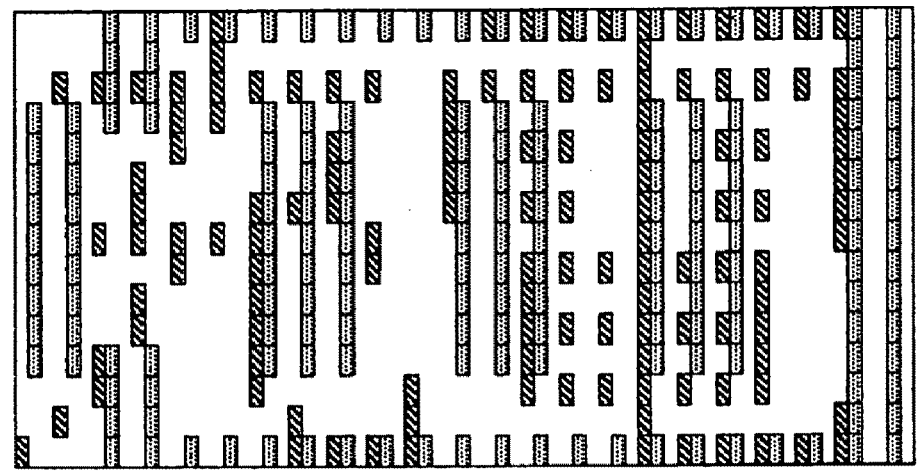

FIG. 19A shows dots which constitute the picture (corresponding to the picture shown in FIG. 14A) in which the lighting pixels are most among the first pictures. FIG. 19B shows dots which constitute the second picture (corresponding to the picture shown in FIG. 14E). FIG. 19C shows a relation between the position of the dots which constitute the first picture and the position of the dots which constitute the second picture.

In this example, the first picture is displayed only in green. All of the dots which constitute the first picture are G emitting elements. On the other hand, the second picture is displayed only in red. All of the dots which constitute the second picture are R emitting element.

The dots which constitute either the first picture or the second picture may consist of the emitting elements of two colors (for example, R emitting element and G emitting element), and the dots which constitute another picture may consist of a color different from above-mentioned two colors (for example, B emitting element).

In the second method, the dots which constitute the first picture and the second picture are set in a manner where the kind of color of the emitting elements turned on when displaying these pictures differs each other.

Therefore, the one picture is not influenced by the degradation of the luminance of another picture among the first picture and the second picture, even if these pictures are displayed almost the same area.

The second method can be also adopted to the first picture showing the receiving sensitivity with 0-3 bar(s) (FIGS. 17A, 17B, 17C, 17D) and the second picture showing the character of "outside" (FIG. 17E) in the antenna picture.

[3] Explanation about the Third Method

Figure 20:
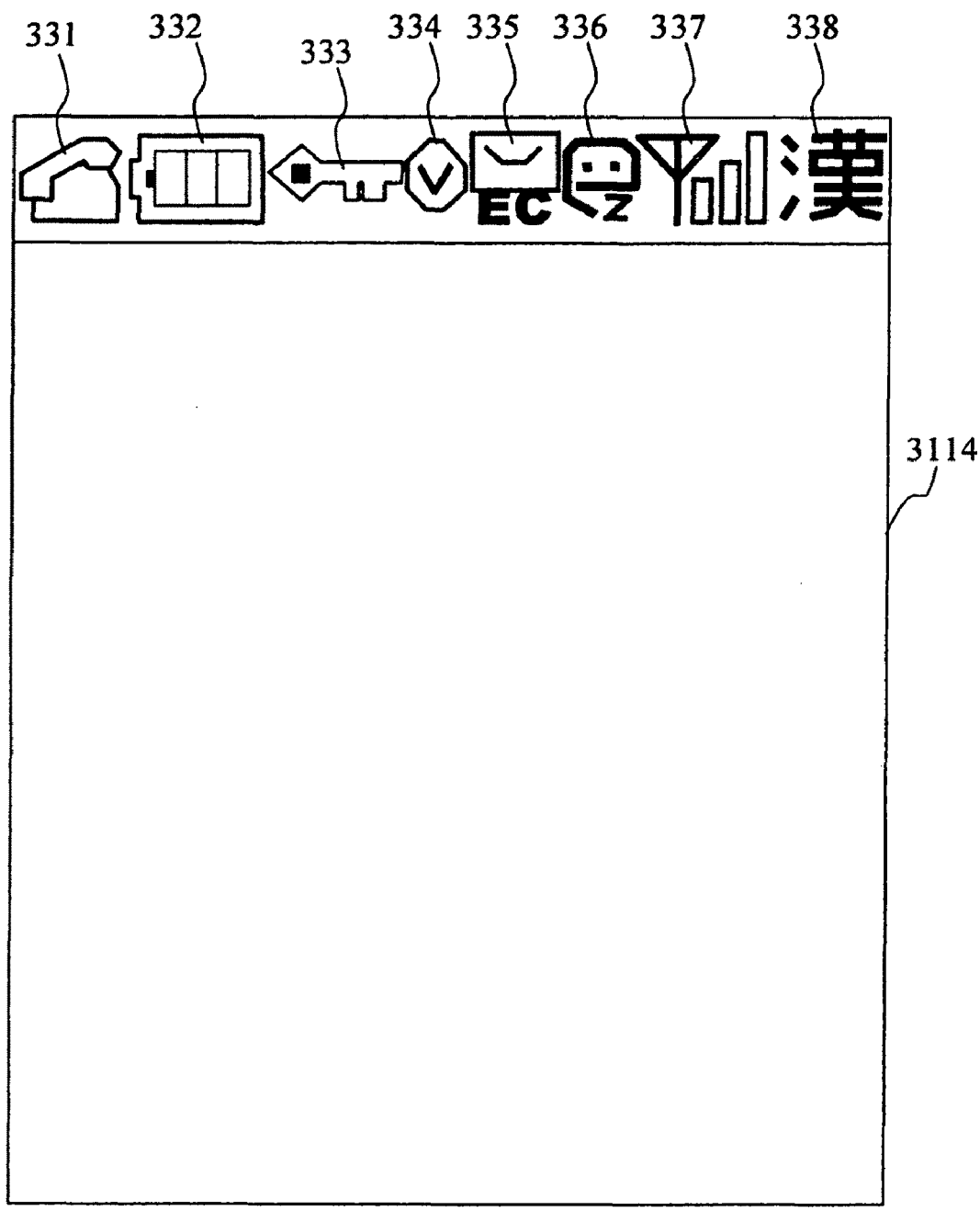
FIG. 20 is a schematic diagram showing pictures which can be displayed on upper part of a color organic EL display.

FIG. 20 shows pictures which can be displayed on upper part of the color organic EL display 3114.

In the third method, the higher a frequency of displaying the picture is, the lower luminance of the picture is set beforehand among these pictures 331-338.

Concretely, the picture 331 is a picture showing a state during a telephone call. The picture 331 is displayed only during the telephone call. The display luminance of thereof is set high beforehand because the frequency of a display of the picture 331 is low.

The picture 332 is a picture showing residual quantity of the battery. The picture 332 is always displayed. The display luminance thereof is set low beforehand because the frequency of a display of the picture 332 is high.

The picture 333 is a picture showing a state where a key of the cellular phone is locked. The picture 333 is only displayed when the key is locked. The display luminance thereof is set high beforehand because the frequency of a display of the picture 333 is low.

The picture 334 is a picture showing a state where the cellular phone is in the manner mode. The picture 334 is only displayed when the cellular phone is in the manner mode. The display luminance thereof is set high beforehand because the frequency of a display of the picture 334 is low.

The picture 335 is a picture showing a reception of a mail. The picture 334 is only displayed when the mail is received. The display luminance thereof is set high beforehand because the frequency of a display of the picture 335 is low.

The picture 336 is a picture showing a state where a search on the web is performed. The picture 336 is only displayed when the search on the web is performed. The display luminance thereof is set high beforehand because the frequency of a display of the picture 336 is low.

The picture 337 is a picture showing the antenna. The picture 337 is always displayed. The display luminance thereof is set low beforehand because the frequency of a display of the picture 337 is high.

The picture 338 is a picture showing a state where the cellular phone is in the character input mode. The picture 338 is only displayed when the character is inputted. The display luminance thereof is set high beforehand because the frequency of a display of the picture 338 is low.

That is, the display luminance of the pictures 332 and 337 which are frequently displayed is set low among the pictures 331-338 in the example shown in FIG. 20.

[Effect of the Third Embodiment]

According to the present embodiment, luminance degradation with displaying the specific picture can be made hard to be conspicuous.

Fourth Embodiment

[Field of the Fourth Embodiment]

The present embodiment relates to a display apparatus and a display method, and it particularly relates to a technology for improving a display quality of the display apparatus and the display method.

[Related Art of the Fourth Embodiment]

Notebook type personal computers and mobile terminals are spreading widely. A liquid crystal display is mainly used as a display apparatus thereof. Organic EL (Electro Luminescence) display is expected as a next-generation flat display panel. As for the liquid crystal display, the straitness of the view angle and the lateness of response speed still remain as a subject. On the other hand, the organic EL display can solve the above-mentioned subject and can achieve high luminosity and high efficiency.

As for the organic EL display, however, it can not be avoided a change with the passage of time, that is, degradation, of an optical element because of the characteristic thereof. A white balance may collapse or a variation of luminance may be arisen by continuous use, even if the white balance is adjusted at the time of manufacture. It is known that degradation of the optical element of the organic EL display is remarkable compared with that of the liquid crystal display, and it is recognized that it is a big problem in view of the quality of a product.

[Summary of the Fourth Embodiment]

The present embodiment has been made in view of the foregoing circumstances and an object thereof is to improve reduction of display quality caused by the above-mentioned variation of the luminance. Another object thereof is to avoid a phosphor burn-in of a display image caused by localizing the variation of the luminance.

An aspect of the present embodiment relates to a display apparatus. This apparatus is a display apparatus comprising: an optical element; a luminance information storing unit which stores luminance information set to said optical element; and a display changing unit which changes a display image displayed on said display apparatus in a manner where a guessed value of degradation of each optical elements can be averaged based on the luminance information stored.

Here, the display apparatus means an apparatus comprising a display screen, for example, a cellular phone, a PDA (Personal Digital Assistant), a personal computer, and the like. An organic light emitting diode (hereinafter, simply referred to as "OLED") as an optical element of an organic EL display deteriorates with passage of time as mentioned above. Cause of the deterioration is considered a current supplied to the OLED. The degradation of the OLED can be assumed by monitoring a luminance set to the OLED, for example, storing accumulated luminance set to the OLED, since the luminance of light emitted from the OLED is dependent on the current. If the degradation of the OLED is averaged, the variation of the luminance can be avoided.

Generally, a specific character or a specific image is displayed on a specific position in the display screen of the cellular phone in many cases. It may cause the phosphor burn-in. The degradation of the OLED can be averaged by changing a display position, luminance, or color tone of the character and the image displayed. Here, "average" may be a state almost equalized, and equalization should just be the grade where a user cannot recognize the variation of the luminance.

In the case of color display in the organic EL display, the degradation speed of the OLEDs of R (Red), G (Green), and B (Blue) differs since the materials thereof differ each other. Thereby, there may be arisen a phenomenon that the display image is displayed in a little been for example as the display is used. Therefore, it is necessary to equalize the grade of degradation of the OLED of each color of R, G, and B.

Another aspect of the present embodiment also relates to a display apparatus. This apparatus is a display apparatus comprising: an optical element; and a display changing unit which changes a display image displayed on said display apparatus in a manner where a guessed value of degradation of each optical element can be averaged, maintaining an outline of the display image.

Further another aspect of the present embodiment also relates to a display apparatus. This display apparatus is a display apparatus comprising: an optical element; a display screen which is composed of a plurality of display areas; and a display changing unit which changes a display image of each display area, maintaining an identity of a content of the display.

A display screen of the cellular phone, for example, may be divided into a plurality of areas. A horizontally long and slender display area is set in the upper part of many cellular phones, and the picture which showing the residual quantity of a battery and the picture showing the intensity of an electric wave are displayed there. These pictures are always displayed. Thereby, if the display area of these pictures is burned in, there arises a possibility that a user can not recognize the residual quantity of the battery and the intensity of the electric wave. It is convenient that the picture displayed is changed for every divided area.

The display changing unit may change the display image again, when a guessed value of degradation of the optical element reaches a predetermined value from the last change as a starting point. For example, the display image may be changed when the accumulated value of the luminance set to the optical element exceeds a predetermined value, and the accumulated value of the luminance may be initialized in the case where the change is performed. The display changing unit may change the display image, when an absolute value of an accumulated difference of a luminance of neighboring pixels exceeds a predetermined value.

That is, the difference between the degradation of optical elements of neighboring pixels can be assumed by calculating the difference of the luminance thereof. The degradation of the pixel for a accumulating term can be assumed by accumulating the difference over the term.

The display changing unit may change the display image, when a difference of a guessed value of degradation of the optical element in a row or a column of even number and odd number exceeds a predetermined value. That is, The display image may be changed when a difference between the accumulated luminance set to the even-numbered row and the accumulated luminance set to the odd-numbered row, or a difference between the accumulated luminance set to the even-numbered column and the accumulated luminance set to the odd-numbered column exceeds a predetermined value.

The display image may be changed when following two conditions are fulfilled. First, the difference of the luminance set to the even-numbered and odd-numbered rows or columns in the image previously displayed is accumulated. The difference of the luminance set to the even-numbered and odd-numbered rows or columns in the image to be displayed next is accumulated. Then, the display image may be changed so that the degradation of the optical element can be averaged according to whether each accumulated value is positive or negative. Moreover, the luminance set to the even-numbered and odd-numbered rows or columns in the image previously displayed is accumulated. The luminance set to the even-numbered and odd-numbered rows or columns in the image to be displayed next is accumulated. Then, the display image may be changed so that the degradation of the optical element can be averaged according to which of the accumulated values is greater. In the case of these two conditions, it is not necessary to prepare a memory storing a predetermined value which is a threshold value at the time of changing the display image in a circuit.

The display changing unit may change, when a power supply of the display apparatus is turned on or off, the display image in the process of turning the power on or off. For example, a user may not be noticed the change of the display image by changing the display image when the user does not see the display apparatus. The display changing unit may change, when an application displayed on the display apparatus is changed, the display image in the process of the change of the application.

The display screen of the display apparatus can be opened and closed, the display apparatus may further comprise an opening-and-closing detecting unit which detects opening or closing of the display screen; and the display changing unit may change the display screen when opening and closing of the display screen are detected by the opening-and-closing detecting unit. An operating unit for operating the display apparatus may be slide-type; the display apparatus may further comprise a slide detecting unit which detects a slide of the operating unit; and the display changing unit may change the display screen when the slide of the operating unit is detected by the slide detecting unit. For example, in the case where the operating unit like a keyboard is normally hidden under the display screen and is slid out when operating in the cellular phone, the display screen may be changed by operation of sliding out or closing of the operating unit.

The display changing unit may change the display image by shifting a display position of the display image. The display changing unit may adjust a signal set up to each optical element according to a guessed value of degradation of the optical element. For example, the degradation grade of the optical element may be assumed by accumulating the luminance set to the optical element as mentioned above. The luminance set to the optical element whose degradation is assumed large may be adjusted so that the variation of the luminance can be avoided based on the thus assumed value of degradation.

The display changing unit may include an area detecting unit which detects a specific area, the display position thereof is to be shifted, among an area of the display image; and the display changing unit may change the display image by shifting the display position of the specific area detected. The display image can be relatively easily changed if the size and the display position is managed by an MPU or a memory comprised by the display apparatus. On the other hand, although a display screen appears to be divided into plurality, the display screen displayed on each may not be managed individually, but may be substantially managed as one display screen inside the display apparatus. Even in such a case, only a certain image displayed on the certain divided display screen may be shifted.

For example, a display screen of a cellular phone is exemplified. The display screen of the cellular phone comprises elongated display areas in top and bottom, and relatively large display area in middle. In the top and bottom area, an image showing a state of an electric wave and an image showing residual quantity of a battery are displayed for example. In the middle area, an electric mail is displayed, or a background image is displayed when the cellular phone is not used.

Only the background image displayed in the middle display area may be shifted since there is a possibility of phosphor burn-in if the same image is always displayed. When three areas are managed as one display screen, only the image displayed in the middle needs to be taken out and shifted. When the image is constituted by the background image of a single color and an image such as an illustration in it, Only the illustration is taken out and shifted.

The display changing unit may determine an amount of compensation to be given to a signal according to a value of the signal, when adjusting the signal set up to said optical element. For example, if the same amount of compensation is given to the signal in the case where the low luminance is set to the optical element and in the case where the high luminance is set to the optical element, there is a possibility that the influence given to the display image in the case where the low luminance is set is larger. Thereby, a processing of reducing the amount of compensation given to the signal is performed when the low luminance is set.

The display changing unit may determine an amount of compensation to be given to a signal based on the guessed value of degradation of the optical element of a surrounding pixel, when adjusting the signal set up to the optical element.

The display changing unit may change the display image by changing a display color of each optical element. The display changing unit may change the display color for a predetermined cycle. As mentioned above, when the accumulated luminance is reached to a predetermined value, and there is not an input from a user for a predetermined term, in a case where the accumulated value of luminance of green is small for example, the whole display image may be changed to green. The change of the display color may be made by changing gradually a luminance ratio of the optical element corresponding to each color which constitutes a pixel.

A display area needed for displaying an actual display image may be set up smaller than an effective display area which can be displayed in said display apparatus; and the display changing unit may shift the display area in the effective display area. For example, in the case where the display screen is constituted by 105*105 pixels, the display area to be actually displayed may be 100*100 pixels, and five pixels of vertical and horizontal direction may be an area in which the image can be shifted.

The optical element may correspond to a dot, a pixel may include dots of a plurality of colors, and the display changing unit may shift the display image per dot, and may change combination of the optical elements which originally constitute one pixel. As mentioned above, one pixel of the color display apparatus is generally constituted by dots of three colors of R, G, and B. Thereby, the display image may be shifted per pixel or per dot.

In a case where the display image to be shifted includes a character, the display changing unit may set a margin space which is originally set for displaying the character not to touch each other as an area in which the arbitrary character can be shifted. Generally, the font does not use one line in one side of the display area so that the font may not contact with a neighbor font, and the line is set as the margin area. In a case of the font of 16*16 pixels, for example, only 15*15 pixels are used actually. Thereby, each vertical and horizontal one line can be used as the display area of the font.

In a case where the display image to be shifted includes a character, the display changing unit may shift the display image to a direction in which influence for readability of the character is small when a user sees the character. For example, the display changing unit may scroll the character string horizontally when the user sees an e-mail on the display screen of the cellular phone.

The display changing unit may scroll the display image or may perform a mosaic processing to the display image and displays it when there is no input from a user for predetermined period. A size of a block generated by the mosaic processing may be changed with passage of time.

The display changing unit may select, when a background image which functions as a wallpaper is newly set up, the wallpaper according to grade of degradation of said optical element. Here, "set the wallpaper" means both of a case where a new wallpaper is selected as the background image, and a case where a color of the displayed wallpaper is changed and set as the background image.

The reduction of the luminance of each color can be averaged by changing the color of the wallpaper according to the grade of the assumed degradation of the optical element. Moreover, in a case where the reduction of the luminance of red is assumed large, the reduction of the luminance of each color can be averaged by setting an image in which green and blue is largely used as the wallpaper.

The color tone of the wallpaper may be changed by adjusting the white balance of the selected wallpaper so that the degradation of the optical element corresponding to each color of RGB can be averaged. Since the advance degrees of degradation of the OLED of each color differ in the organic EL display especially, such a setup is highly effective.

Another aspect of the present embodiment relates to a display method. This method is a display method in a display apparatus which comprises an optical element, the method including: storing information of luminance set up to the optical element; and changing a display image displayed on the display apparatus in a manner where a guessed value of degradation of each optical element can be averaged based on the luminance information stored.

Further another aspect of the present embodiment also relates to a display method. This method is a display method in a display apparatus which comprises an optical element, the method including: changing a display image displayed on the display apparatus in a manner where a guessed value of degradation of each optical element can be averaged, maintaining an outline of the display image.

Optional combinations of the aforementioned constituting elements, and implementations of the invention in the form of methods, apparatuses and systems may also be practiced as additional aspects of the present invention.

[Example of the Third Embodiment]

Premise Technology

Figure 21:
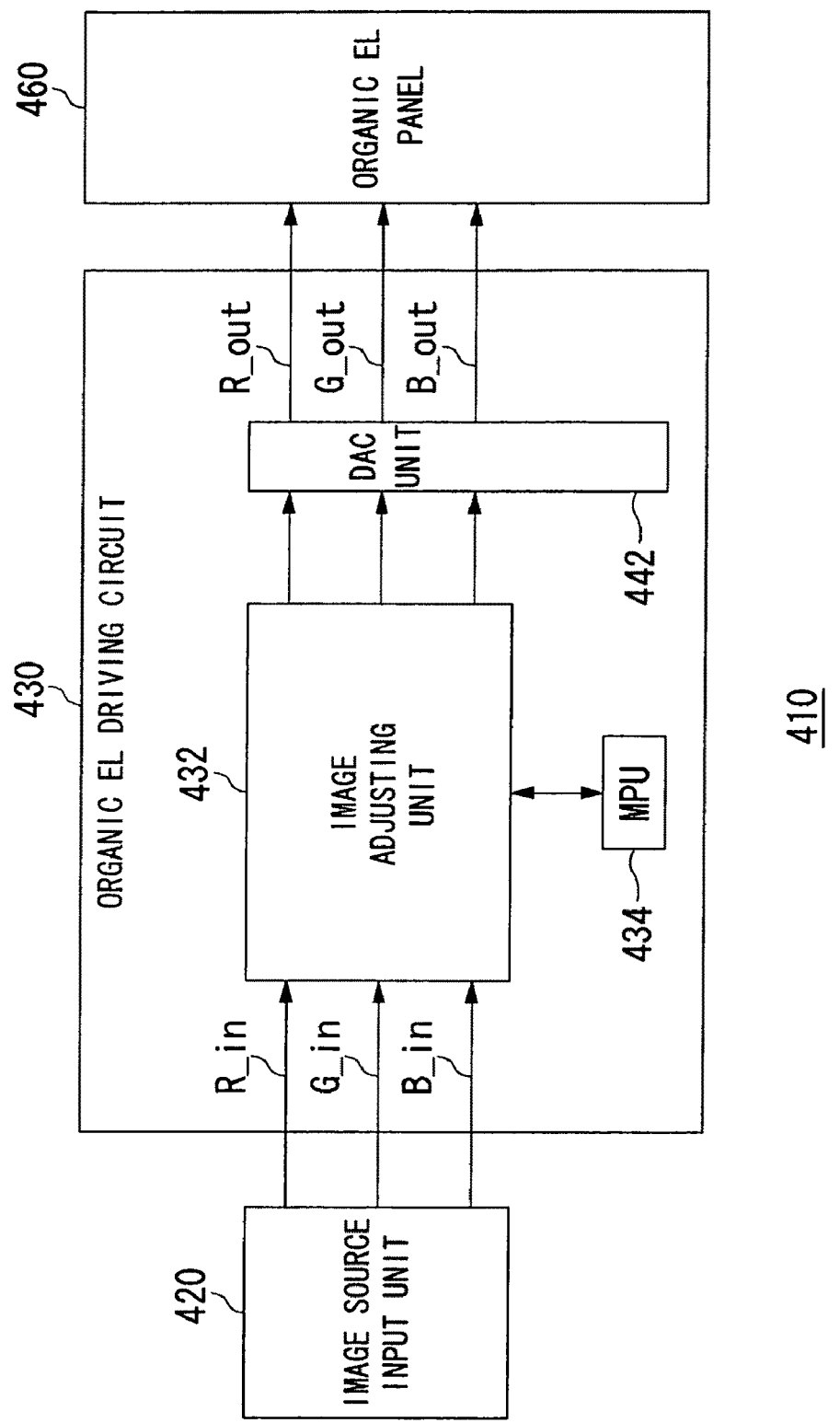
FIG. 21 is a figure showing a basic structure of an organic EL display apparatus.

In advance of explanation of the present embodiment, a structure of an organic EL display as the premise technology of the present embodiment is explained. FIG. 21 is a block diagram showing a basic structure of an organic EL display apparatus 410. The organic EL display apparatus 410 is constituted by an image source input unit 420, an organic EL driving circuit 430, and an organic EL panel 460.

The organic EL driving circuit 430 comprises an image adjusting unit 432 which carries out various processings to a digital image signal inputted from the image source input unit 420, an MPU (Micro Processing Unit) 434 which calculates when these processings are carried out, and a DAC (Digital to Analog Converter) unit 442 which converts the image signal carried out processing to an analog signal. The organic EL driving circuit 430 further comprises a control signal generating unit which generates various timing control signals and a memory which functions a table when actual processing is carried out, which are not shown in the figure.

The image adjusting unit 432 performs an offset adjusting to adjust a brightness, a gain adjusting to adjust a contrast, and a processing to adjust input image signal which is performed gamma correction to voltage-emitting luminance (V-T) characteristic of the organic EL panel.

Operation by the above structure is explained briefly. Three kinds of the digital signals R_in, G_in, and B_in are inputted from the image source input unit 420 to the image adjusting unit 432. The image adjusting unit 432 performs image adjusting processing like the offset adjusting and the gain adjusting. The digital signals are outputted from the DAC unit 442 as three kinds of analog signals R_out, G_out, and B_out to the organic EL panel 460.

In terms of hardware, this structure can be realized by a CPU, a memory and other LSIs of an arbitrary computer. In terms of software, it is realized by memory-loaded programs or the like, but drawn and described here are functional blocks that are realized in cooperation with those. Thus, it is understood by the skilled in the art that these functional blocks can be realized in a variety of forms by hardware only, software only or the combination thereof.

FIRST EXAMPLE

In a first example, luminance set to an OLED constituting each dot of a display screen is monitored. When an accumulated value thereof reaches a predetermined condition, a part or the whole of a display image is shifted. The degradation of the OLED is averaged by averaging the luminance set to the OLED corresponding to each dot.

A condition of the accumulated value for shifting the display image may be, for example, (1) when the accumulated value of the luminance in a predetermined term exceeds a predetermined value, (2) when the absolute value of the accumulated value of a difference between the luminance of neighboring pixels exceeds a predetermined value, (3) when a difference between the accumulated value of the luminance of an even-numbered column and that of an odd-numbered column exceeds a predetermined value.

Figure 22:
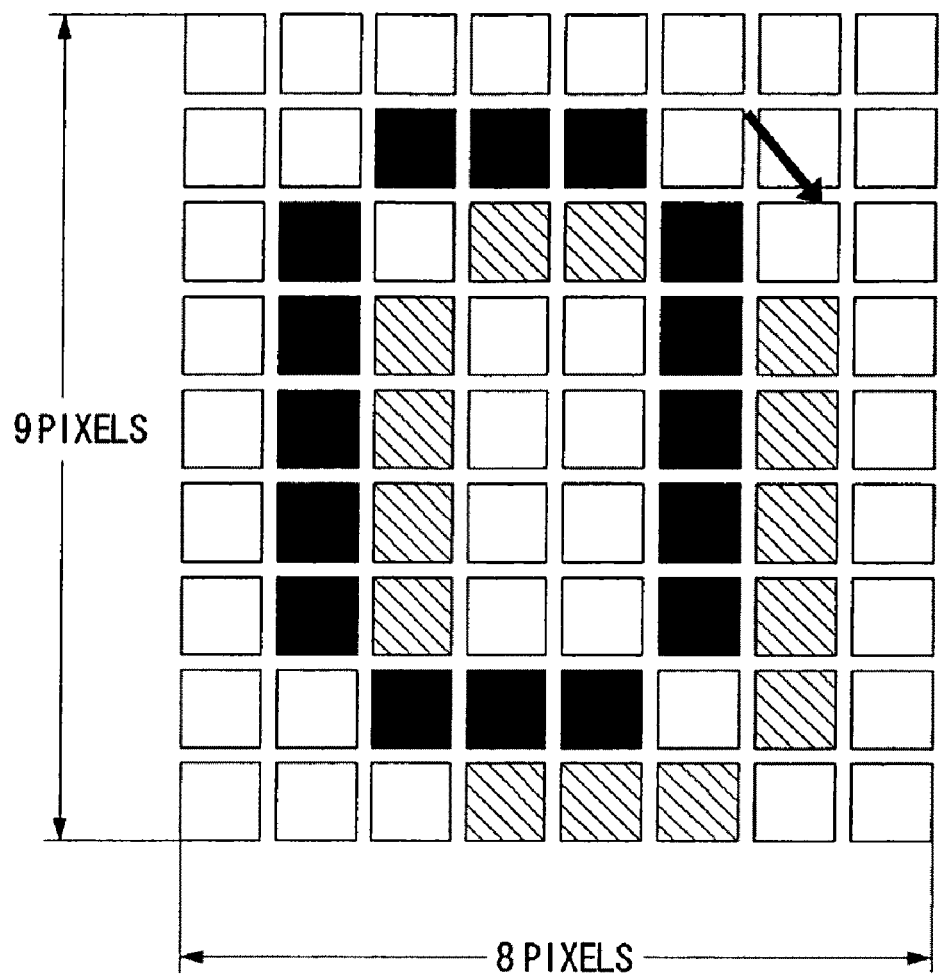
FIG. 22 is a figure showing a state where a character is shifted and displayed.

FIG. 22 shows a state where a character "0" is displayed on a display area of 9×8 pixels, and it is shifted one pixel to the right and down direction respectively. A character shown by black painting is a character before being shifted, and a character shown with slash is a character after being shifted.

Figure 23A:
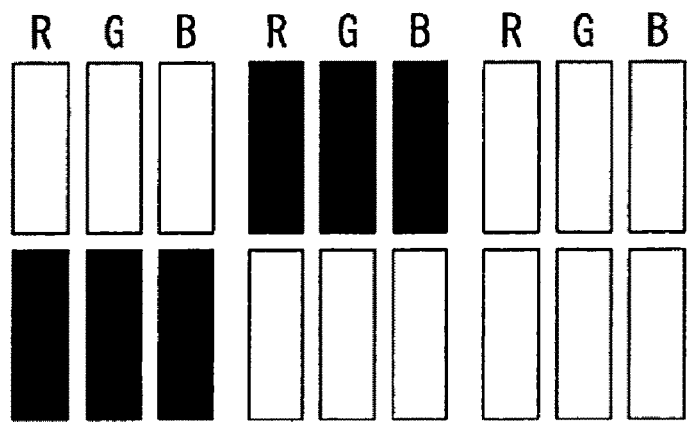
FIGS. 23A, 23B, and 23C are figures showing a method of shifting an image and a change of dots constituting a pixel when being shifted.
Figure 23B:
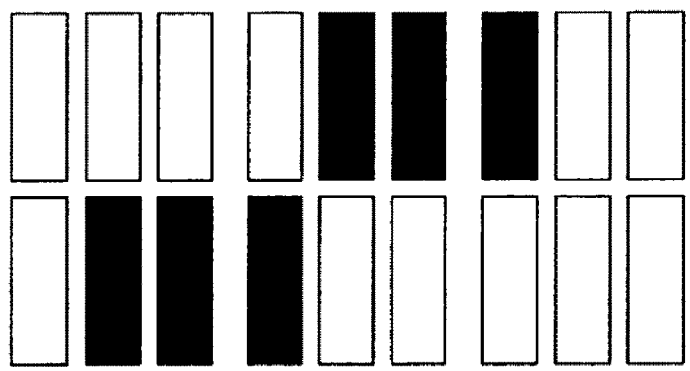
Figure 23C:
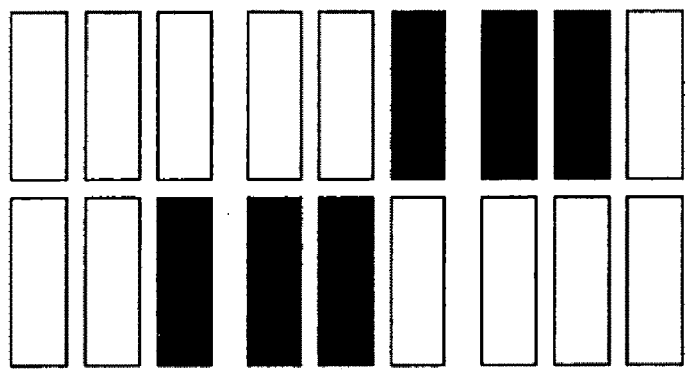

FIGS. 23A, 23B, and 23C show an example in which a display image shifted per 1 dot. FIG. 23A shows an initial state before being shifted, FIG. 23B shows a state where the display image is shifted one dot to right direction, and FIG. 23C shows a state where the display image is shifted 2 dots to right direction. In the initial state, combination of colors of the dots which constitute a pixel is R, G, B in order from the left. In the state where the display image is shifted one dot to right direction, for example, the combination is G, B, R in order from the left.

Figure 24:
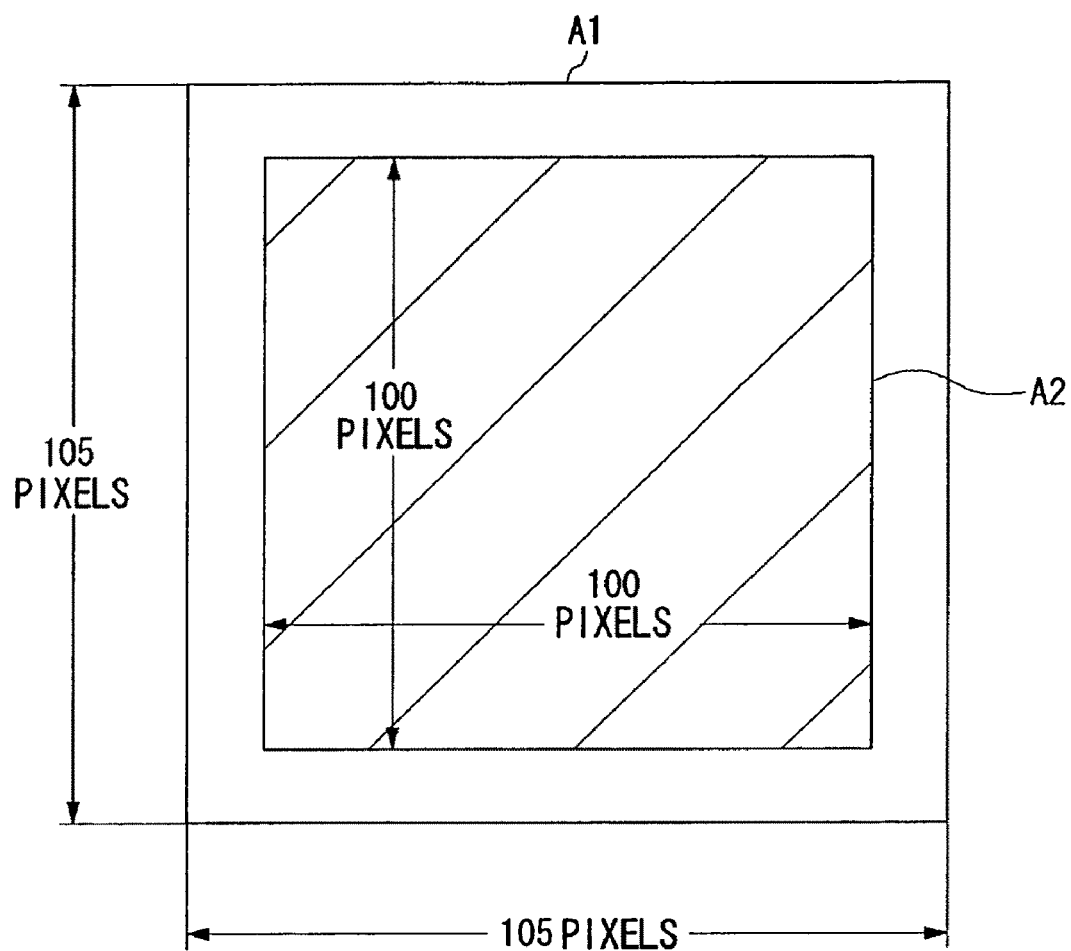
FIG. 24 is a figure showing a relation between a display area and an effective display area.

FIG. 24 shows a state where the display area A2 which is actually displayed is set up smaller than an effective display area A1 which can display the display picture. For example, when the display area A2 consists of 100×100 pixels, the effective display area A1 consists of 105×105 pixels. The display area A2 has an area in which the display image can be shifted 5 pixels in the length and the transverse direction each.

Figure 25:
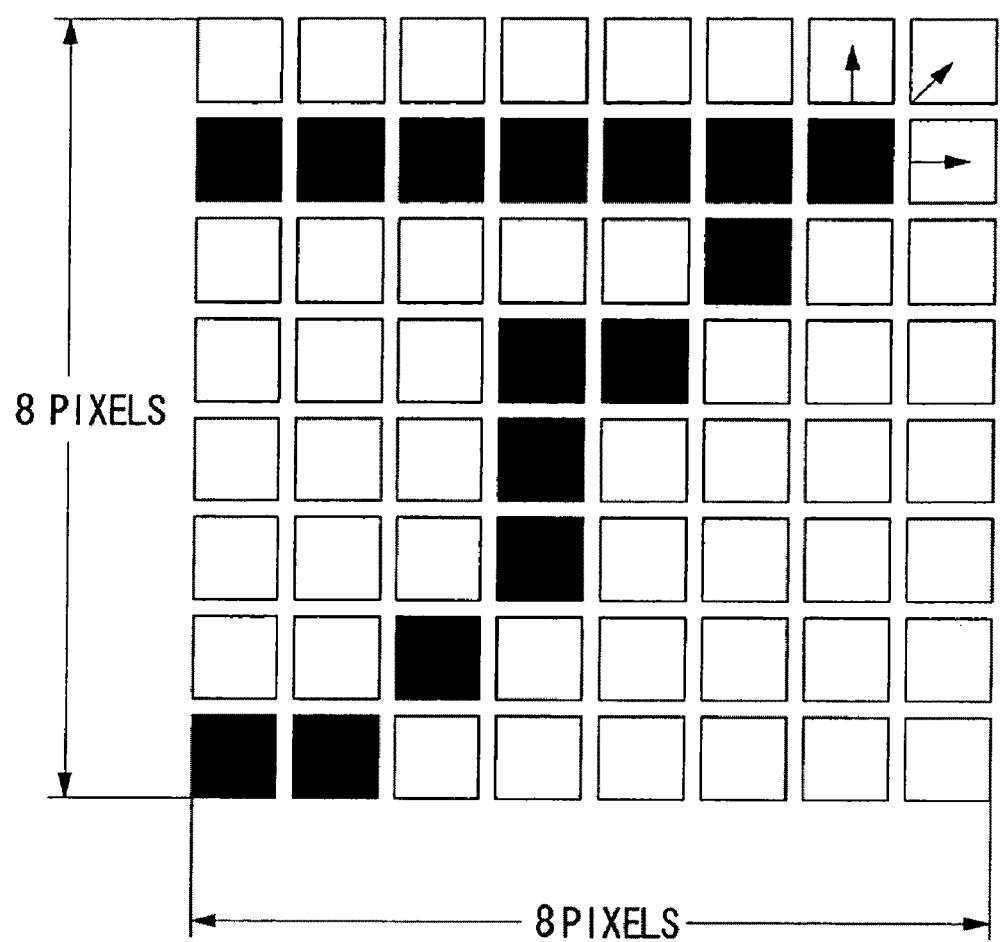
FIG. 25 is a figure showing a display area of one font.

FIG. 25 shows a state where a Japanese character is displayed on an area of 8×8 pixels. Pixels of the top line and the rightmost column are set up as a blank space area so that the character may not be touched with an adjoining character. This area is also used as a display area at the time of shifting a character. When the character sequence consists of two or more characters, a character may shift 1 pixel to up, or 1 pixel to right, or not shift at all, for example. Thereby, phosphor burn-in can be reduced without spoiling display grace greatly.

The above-mentioned shift of the display image may be carried out with a predetermined cycle. The shift can be performed without making a user conscious of the shift by shifting the display image when the user does not operate the display apparatus or the display screen is changed considerably.

The timing of shifting may be, for example, (1) when the power of the display apparatus turns on or off, (2) when the display apparatus is opened or closed in a case where the display apparatus can be opened and closed like a fold-down type cellular phone, (3) when changing an application, (4) when there is no operation from a user for a predetermined term, (5) when an operating unit is slid out or closed in a case where the operating unit of the cellular phone is a slide type and can be opened and closed.

Figure 26:
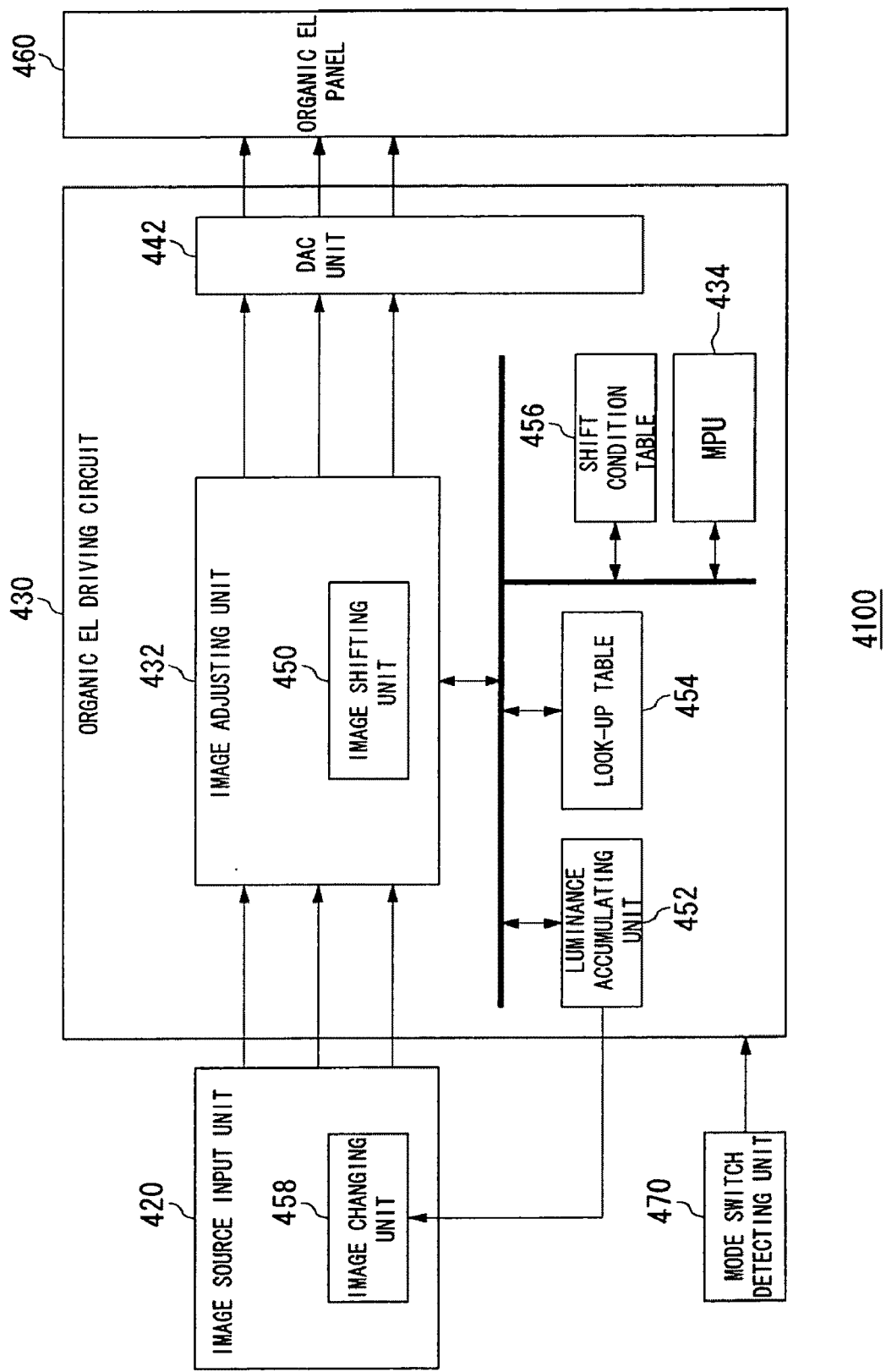
FIG. 26 is a structure diagram of an organic EL display apparatus according to an embodiment.

FIG. 26 shows a structure of an organic EL display apparatus 4100 according to the present example. The basic structure is the same as the structure shown in FIG. 21 in the premise technology. Particularly characteristic structure in the present example will be explained.

An organic EL driving circuit 430 includes a luminance accumulating unit 452 which acquires and stores luminance set to the OLED, a look-up table 343 which stores an above-mentioned condition about the accumulated luminance when shifting the display image and how to shift the display image, and a shift condition table 456 which stores above-mentioned timing of shifting. An image adjusting unit 432 includes an image shifting unit 450 which carries out processings for shifting and displaying the display image. The organic EL apparatus 4100 includes a mode switch detecting unit 470 which detects a timing of shifting the display image.

The luminance accumulating unit 452 accumulates the luminance set to each OLED which constitutes each pixel and stores thus accumulated luminance. The image source input unit 420 includes an image changing unit 458 which carries out a mosaic processing and color change of the display image shown in examples 2-4 with reference to the accumulated luminance stored in the accumulated luminance storing unit 452.

Operation about the shift of the display image by the above structure is explained briefly. The mode detecting unit 470 detects the timing of shifting the display image, for example, when the application is changed and the like, and transmits the timing to the organic EL driving circuit 430. The MPU 434 refers to the shift condition table 456. If it is the timing to shift, the MPU 434 further refers to the look-up table 454 based on the accumulated luminance stored in the accumulated luminance storing unit 452. If the accumulated luminance is in the predetermined condition, the MPU 434 instructs to shift the display image to the image shifting unit 450.

According to the first example, the degradation of specific OLED can be avoided and the phosphor burn-in of the display screen can be avoided by shifting the display image in accordance with the accumulated value of the luminance set to the OLED. Moreover, the degradation of the OLED in the whole display screen can be averaged and the variation of the luminance can be reduced.

SECOND EXAMPLE

In the first example, the display image is shifted per dot or per pixel under a predetermined condition. In the second example, when a predetermined time has passed after a user operation is completed, a part of the displayed image is scrolled horizontally or vertically, or is carried out a mosaic processing.

Figure 27A:
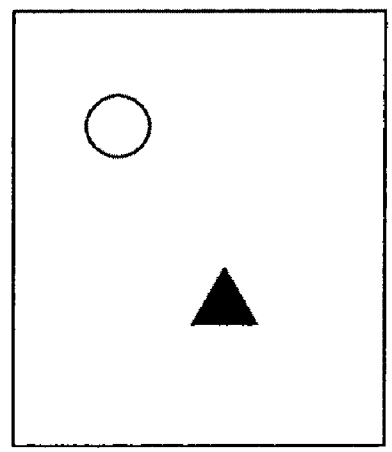
FIGS. 27A, 27B, and 27C are figures showing a state where a display image is scrolled.
Figure 27B:
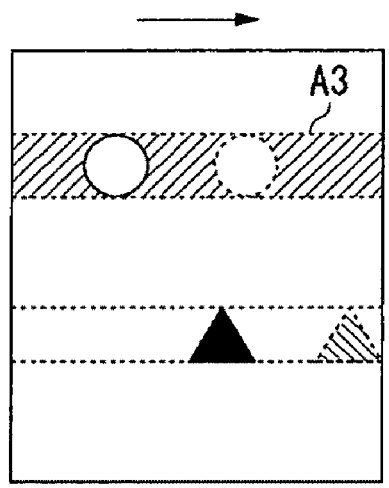
Figure 27C:
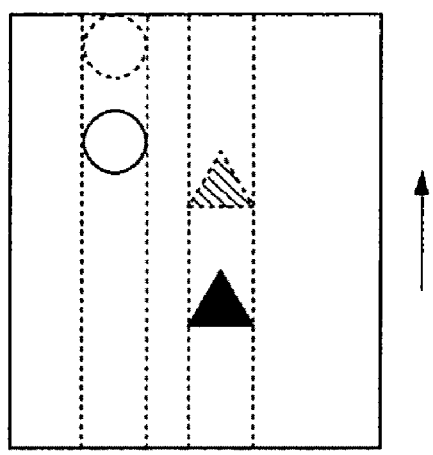

FIG. 27A shows an initial display image, in which a white circle and a black triangle are displayed. FIG. 27B shows a state where images of the circle and the triangle are scrolled horizontally. FIG. 27C shows a state where images of the circle and the triangle are scrolled vertically.

For example, the degradation of the OLED is nearly equal in an area A3 where the image of the circle shown in FIG. 27B is scrolled. The average luminance in the whole display screen can be equaled by combination of the scroll to the horizontal direction and the scroll to the vertical direction.

Figure 28A:
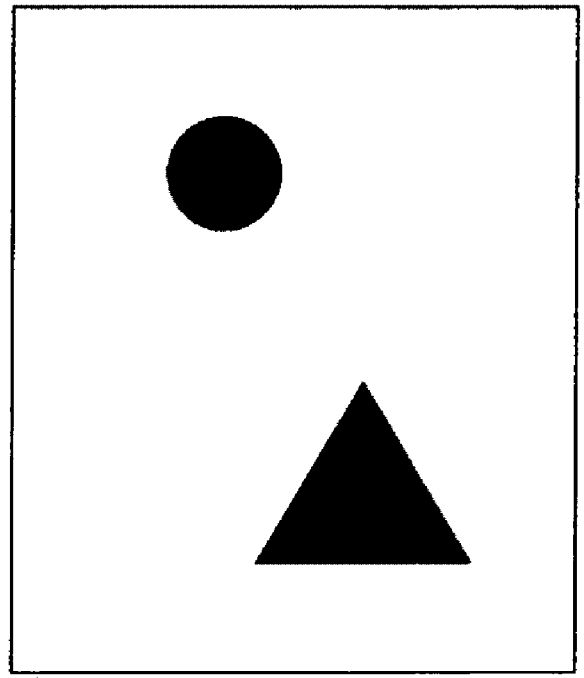
FIGS. 28A and 28B are figures showing a state where mosaic processing is carried out to a display image.
Figure 28B:
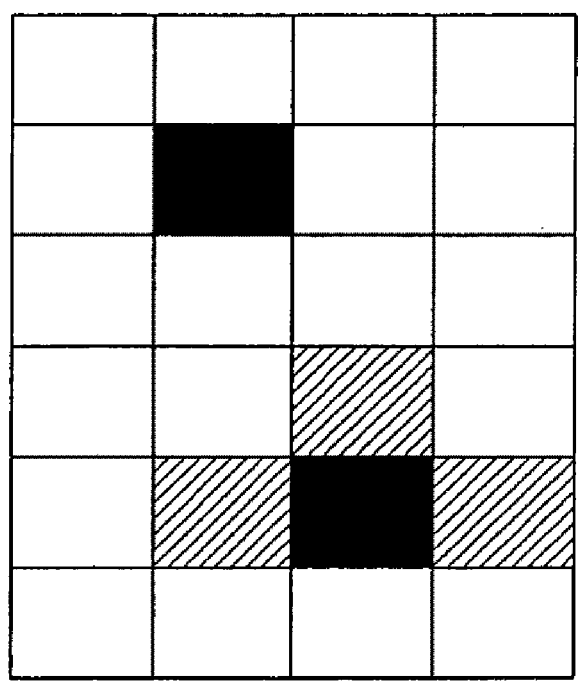

FIGS. 28A and 28B show a state where the display image is carried out a mosaic processing. This processing is also carried out when a predetermined time has passed after completed the user operation. FIG. 28A shows a display image at an initial state. FIG. 28B shows a display image carried out the mosaic processing. The phosphor burn-in of the display screen can be further reduced by changing a size of a block generated by the mosaic processing with progress of time.

The above-mentioned scroll processing and mosaic processing can be achieved by the structure of the apparatus shown in FIG. 25 in the first example. According to the second example, the same effect as the first example can be acquired.

THIRD EXAMPLE

In the first example and the second example, the degradation of the OLED is averaged and the phosphor burn-in is reduced by shifting the display image. In the third example, the degradation grade of the OLED emitting light of each color of R, G, and B is averaged by adjusting a signal set to the OLED corresponding to each dot and adjusting a color of the display image.

In the case of adjusting the color, the color may be adjusted only paying attention to a single pixel. The display image may be divided into blocks, 3*3 pixels for example, and the color may be adjusted so that balance in the block may be maintained. The blocks may be changed with progress of time.

In the case where the color tone of the adjusted image is changed remarkably from the display image before adjusted, the amount of adjusting may be adjusted to make the color tone not change a lot. For example, when the luminance ratio of R, G, and B is 50% in white respectively, the adjusting may be made where the luminance ratio or R is made into 49%, and the luminance ratio of G and B are made into 51%, for example.

Figure 29A:
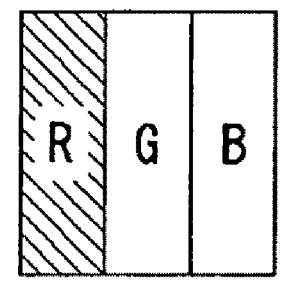
FIGS. 29A and 29B are figures showing a state where a display color of a display image is changed at a fixed timing.
Figure 29A:
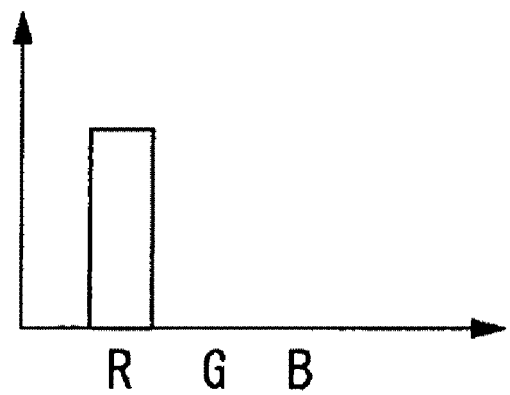
Figure 29B:
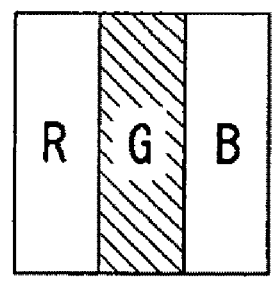
Figure 29B:
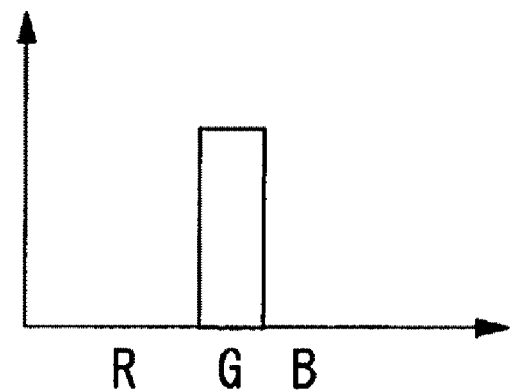

FIGS. 29A and 29B are schematic figures showing a state where a display color is changed at a fixed timing to average the emitting luminance of each color of RGB over time. The upper column shows an emitting color and the lower column shows amplitude of a signal. This change may be made per dot or may be performed to the whole display screen.

FIG. 29A shows a state where only R is displayed among three colors of RGB. The amplitude of the signal set to the OLED is 0 except R. When a predetermined time has passed after this state, only G is emitted as shown in FIG. 29B for example. Here, RGB is emitted individually, but mixed colors may be emitted.

Figure 30A:
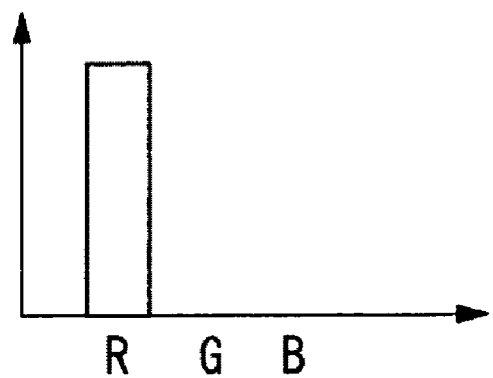
FIGS. 30A, 30B, and 30C are figures showing a state where luminance ratio of RGB is gradually changed when changing a display color of a display image.
Figure 30B:
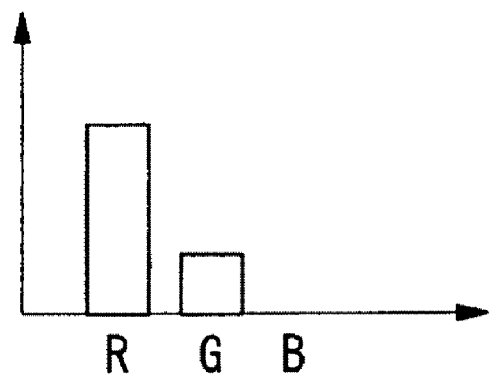
Figure 30C:
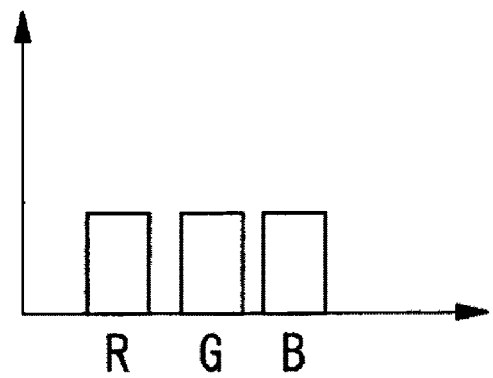

Moreover, when changing the emitting color, the luminance ratio of RGB may be gradually changed as shown in FIGS. 30A-30C. At first, only R is emitting light as shown in FIG. 30A, then the signal amplitude of R becomes small and G emits light as shown in FIG. 30B. Furthermore, with progress of time, three colors of RGB emit light with the same signal amplitude as shown in FIG. 30C.

Above-mentioned processing can be realized with the structure shown in FIG. 26 of the first example. However, in this example, since a display image is not shifted, the image shifting unit 450 is unnecessary.

Figure 31:
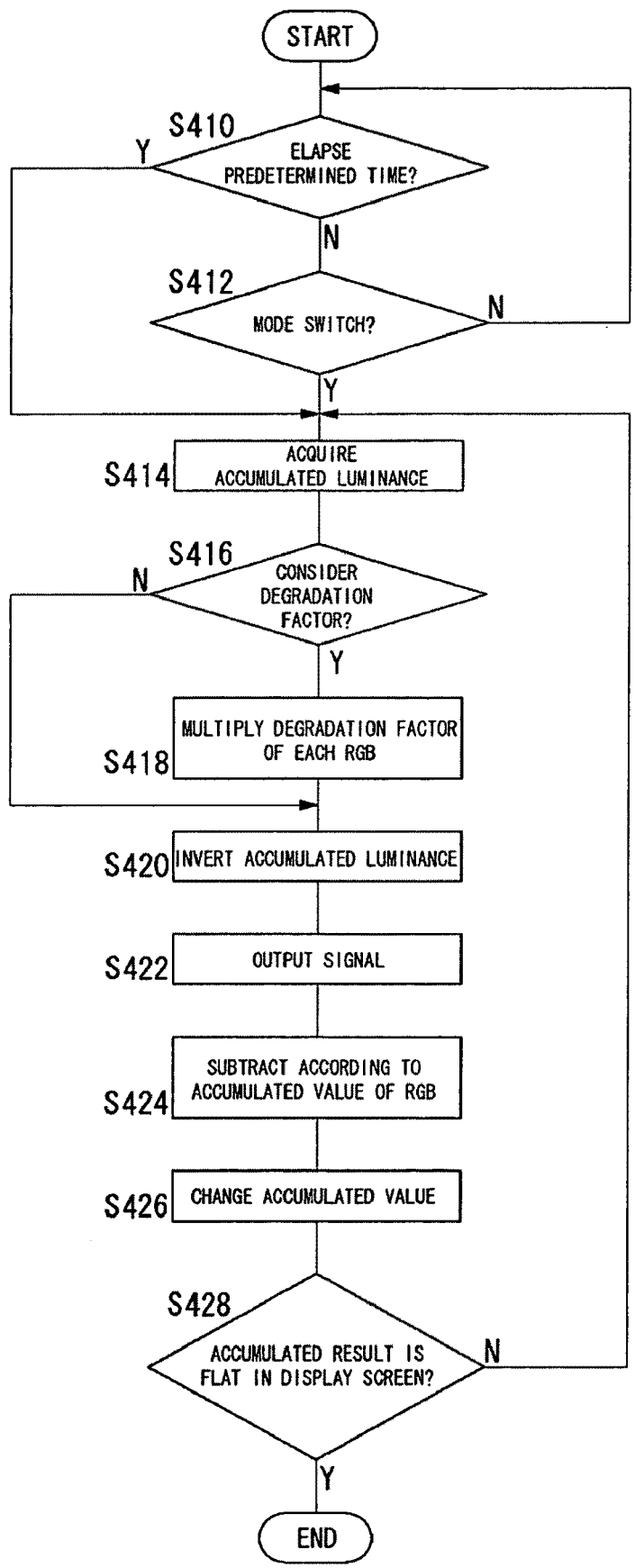
FIG. 31 is a flowchart showing a procedure of changing a display color to average grade of degradation of OLED.

FIG. 31 is a flowchart showing a procedure of a processing of the above-mentioned color change. After a predetermined time has passed from end of the user operation (Y of S410), when the mode is changed (Y of S412), the accumulated value of the luminance set to the OLED constituting the display screen is acquired (S414). In the case where the mode is not changed (N of S412), the procedure is returned to the processing of S410.

In the case where the degradation of the OLED corresponding to RGB is taken into consideration (Y of S416), the accumulated value is multiplied by a predetermined degradation rate and corrected (S418). In the case where the degradation rate is not taken into consideration (N of S416) and after correction in S418, the accumulated value of the luminance is inverted (S420). The signal for averaging the accumulated value in the display screen is outputted (S422). It subtracts from the inverted accumulated value according to the luminance set (S424) and the accumulated value of the luminance is updated (S426). If the updated accumulated value is averaged in the display screen (Y of S428), this color change processing is completed. If not averaged (N of S428), the steps S414 to S426 is repeated.

In S420 and S424, the accumulated value is inverted and subtracted the set luminance, but the processing may not be restricted to this, the processing may be made as the maximum of the accumulated value is calculated, and the set-up luminance is added to average the accumulated value.

Figure 32:
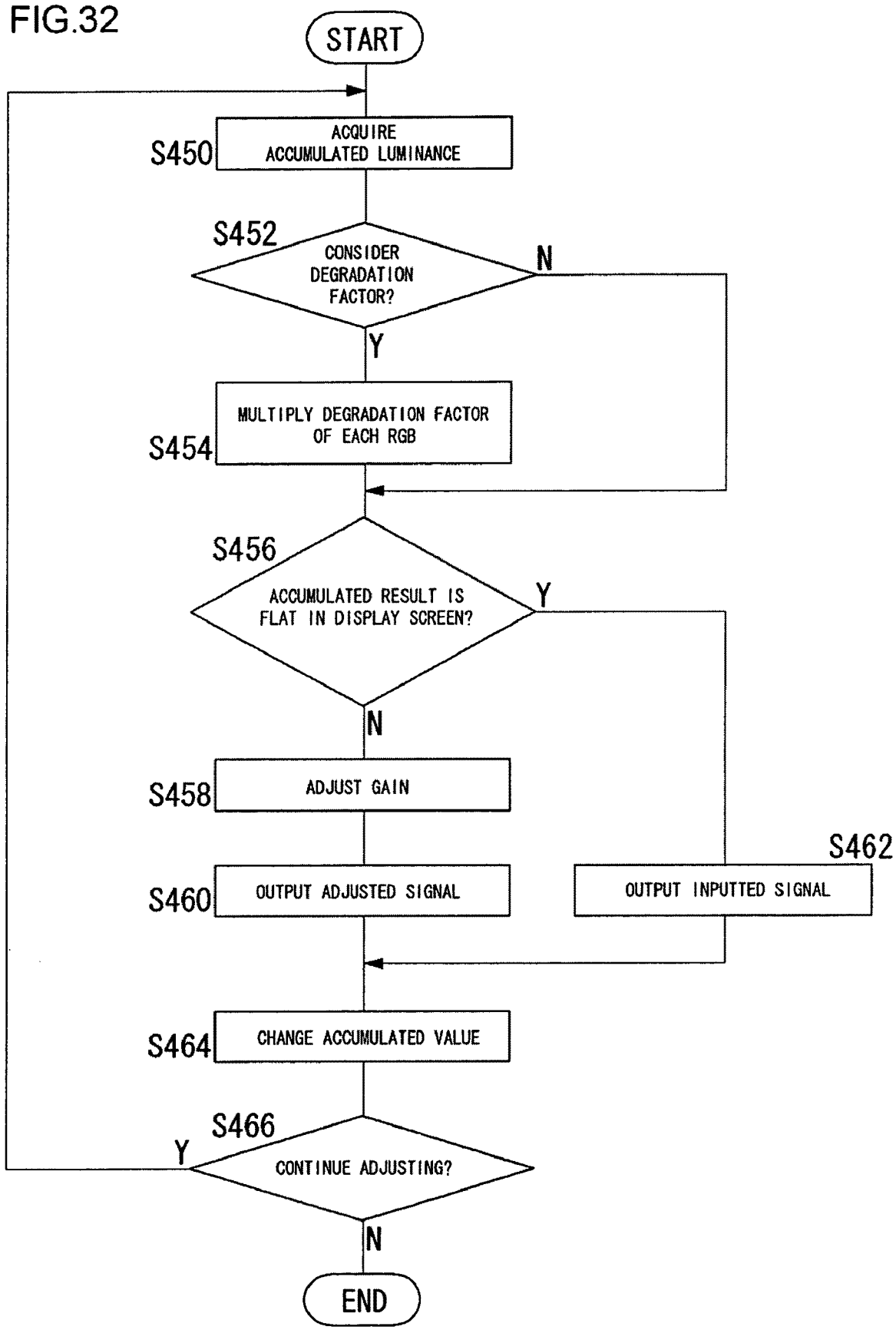
FIG. 32 is a flowchart showing a procedure of performing adjustment to a display image according to grade of degradation of OLED.

FIG. 32 is a flowchart showing a procedure of adjusting the display image according to the accumulated value of the luminance set to the OLED. The accumulated value of the luminance is acquired (S450). In the case where the degradation of the OLED corresponding to RGB is taken into consideration (Y of S452), the accumulated value is multiplied by a predetermined degradation rate and corrected (S454).

In the case where the degradation rate is not taken into consideration (N of S452) and after correction in S454, it is checked whether the accumulated value of the luminance is averaged in the display screen. If averaged (Y of S456), the inputted signal is outputted as it is (S462). If not averaged (N of S456), the gain of the luminance set to each OLED is adjusted not to arise the variation of the luminance (S458), and thus adjusted signal is outputted (S460).

After the signal is outputted in S460 or S462, the accumulated value is updated reflecting the luminance set (S464). If the adjusting is continued (Y of S466), the steps S450 to S464 are repeated. If the adjusting is not continued (N of S466), the processing is ended.

When adjusting the signal in S458, the gain is adjusted by multiplication of the signal, but the processing may not be restricted to this, the processing may be made by addition or subtraction of the signal. As mentioned above, according to the third example, the same effect as the first example and the second example is acquired, and the adjust of the display image in consideration of the variation of the luminance can be carried out.

FOURTH EXAMPLE

In this example, when the background image which functions as a wallpaper is newly set up, color tone of the wallpaper is changed according to the grade of degradation of the OLED of each dot of a display screen. This change of the color tone may be made for vanishing the variation of the luminance caused by the degradation the OLED, or for averaging the grade of degradation of the OLED. For example, when it is presumed that the grade of degradation of the OLED of R is large on the whole display screen, the wallpaper is set up with the ratio of other G or the color of B being enlarged.

The apparatus to realize this example can be realized with the structure shown in FIG. 26 of the first example. As mentioned above, according to the fourth example, the same effect as the third example is acquired.

FIFTH EXAMPLE

Figure 33:
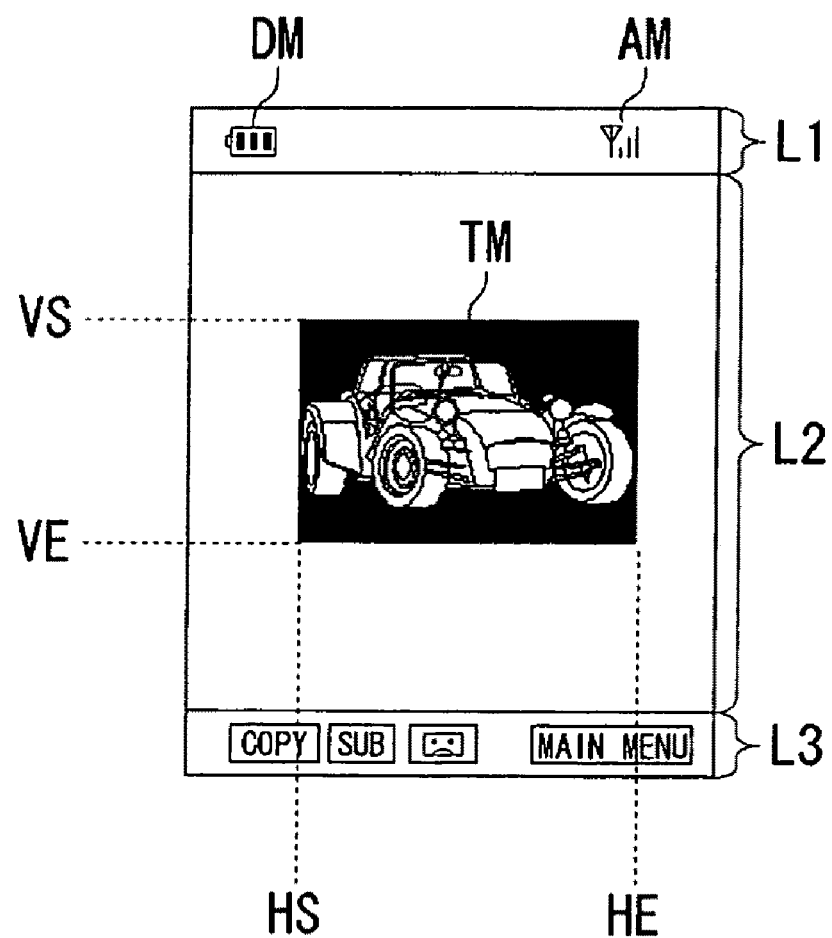
FIG. 33 is a figure showing a display screen of a cellular phone in which a display area is divided into three areas of up, middle, and down.

In the present example, display screen of the cellular phone is divided into three areas of upper, middle, and lower, and the display image is shifted in each divided area independently. FIG. 33 is a figure showing the display screen of the cellular phone. The display screen is divided into three areas of the first area L1, the second area L2, and the third area L3, in order from the top.

In the first area L1, a battery mark DM which is a picture showing residual quantity of the battery is displayed in left side, and an antenna mark AM which is a picture showing intensity of an electric wave is displayed in right side. The battery mark DM and the antenna mark AM are always displayed at a fixed position in many cellular phones. There is a probability of phosphor burn-in of these pictures. If the phosphor burn-in with a shape of the battery mark DM is arisen, there arises a probability that residual quantity of the battery cannot be shown properly to a user. Thereby, the battery mark DM and the antenna mark AM are shifted in only the first area L1. Since the first area L1 is horizontally long, horizontal scrolling, horizontal swing and the like are illustrated as the method of shifting the battery mark DM and the antenna mark AM. The horizontal scroll means shifting the battery mark DM and the antenna mark AM along a fixed direction. The horizontal swing means shifting the antenna mark DM and the antenna mark AM right and left by arbitrary number of pixels. That is, in the horizontal swing, the battery mark DM and the antenna mark AM is displayed swingingly.

The visibility does not get worse so much by shifting the battery mark DM and the antenna mark AM only horizontally because the display position thereof can be roughly predicted. Similarly, the picture displayed on the third area L3 is also shifted in the third area L3 maintaining visibility. The picture of a car displayed on the second area L2 (hereinafter simply referred to as a "car picture") TM may be scrolled arbitrary direction horizontally and vertically since the car picture is a background picture here, and the visibility thereof is not required from the user. The car picture TM displayed on the second area L2 in the middle once moves downward, then moves to down and right direction.

Figure 34:
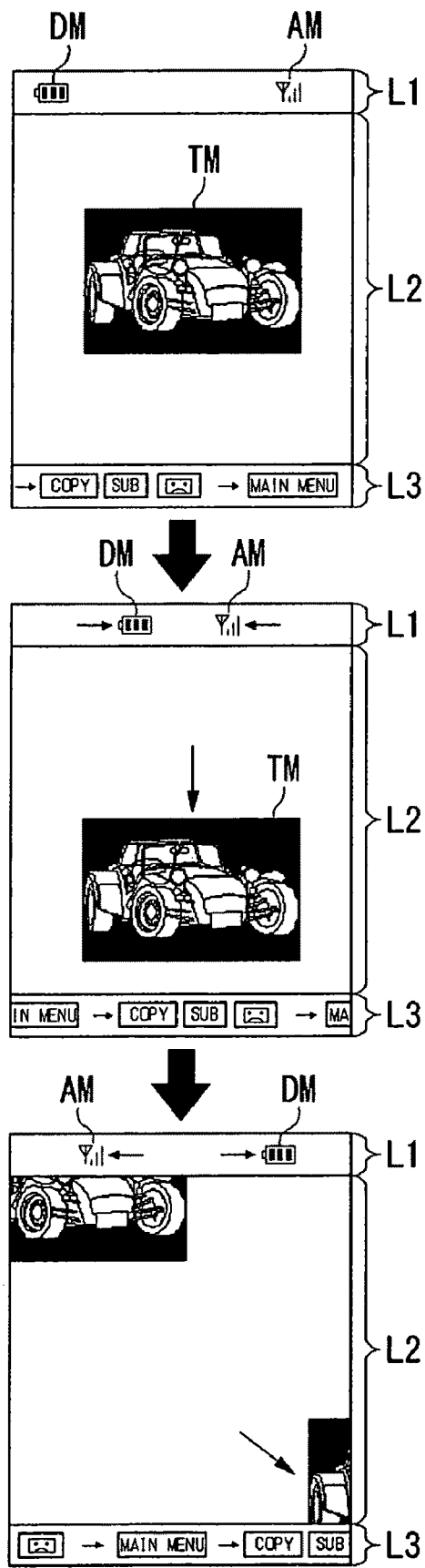
FIG. 34 is a figure showing how a display image shifts.

FIG. 34 shows a state where the image displayed on the display screen shown in FIG. 33 is shifted. The battery mark DM and the antenna mark AM are scrolled right and left respectively. All the pictures displayed on the third area L3 are scrolled right. The car picture TM displayed on the second area L2 in middle is once shifted below, and shifted to right bottom after that.

Figure 35:
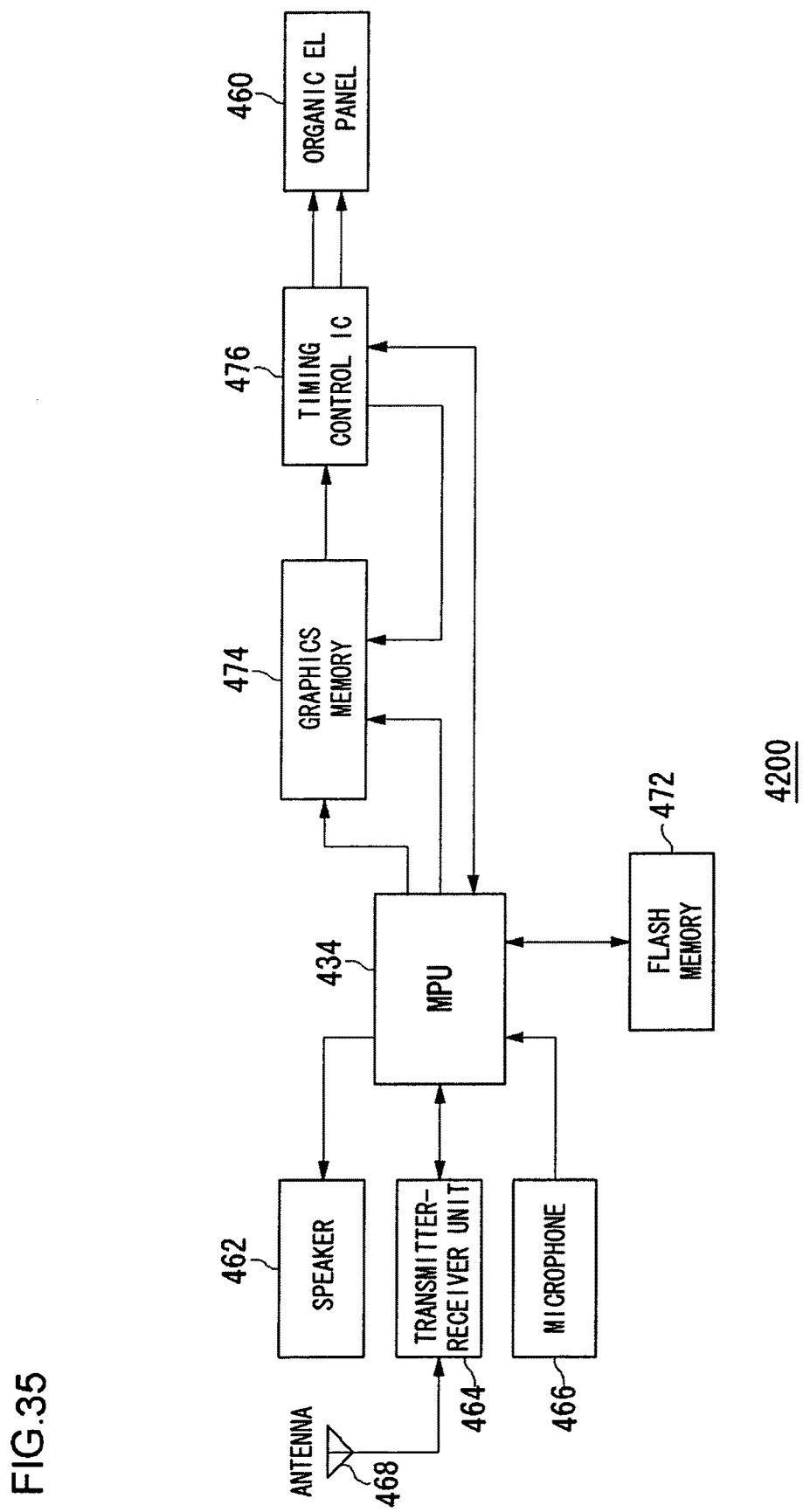
FIG. 35 is a structure diagram of a cellular phone as an organic EL display apparatus according to an embodiment.

A structure of the cellular phone for shifting the display image for every divided area. FIG. 35 is a figure showing the structure of the cellular phone 4200 according to the present example. The cellular phone 4200 comprises an MPU 434, a graphics memory 474, a timing control IC (Integrated Circuit) 476, a flash memory 472 and an organic EL panel 460. The cellular phone 4200 further comprises a speaker 462, a transmitter-receiver unit 464, and a microphone 466.

The flash memory 472 stores data to be held when the power of the cellular phone 4200 is off. The graphics memory stores image data displayed on the organic EL panel 460. The image data is written in the graphics memory 474 when receiving the image data and a write position control of the image data from the MPU 434. The graphics memory 474 outputs the image in response to an input of a read control signal synchronized with the display from the timing control IC 476.

The timing control IC 476 supplies the read control signal to the graphics memory 474 synchronizing with a scan timing of the organic EL panel 460 and reads the image data from the graphics memory 474. The timing control IC 476 supplies the thus read image data and a driving signal to the organic EL panel 460 and displays the display image on the organic EL panel 460. The timing control IC 476 also detects a vertically start point VS, a vertically end point VE, a horizontally start point HS, and a horizontally end point HE of the car picture TM displayed on the second area L2 shown in FIG. 33.

Figure 36:
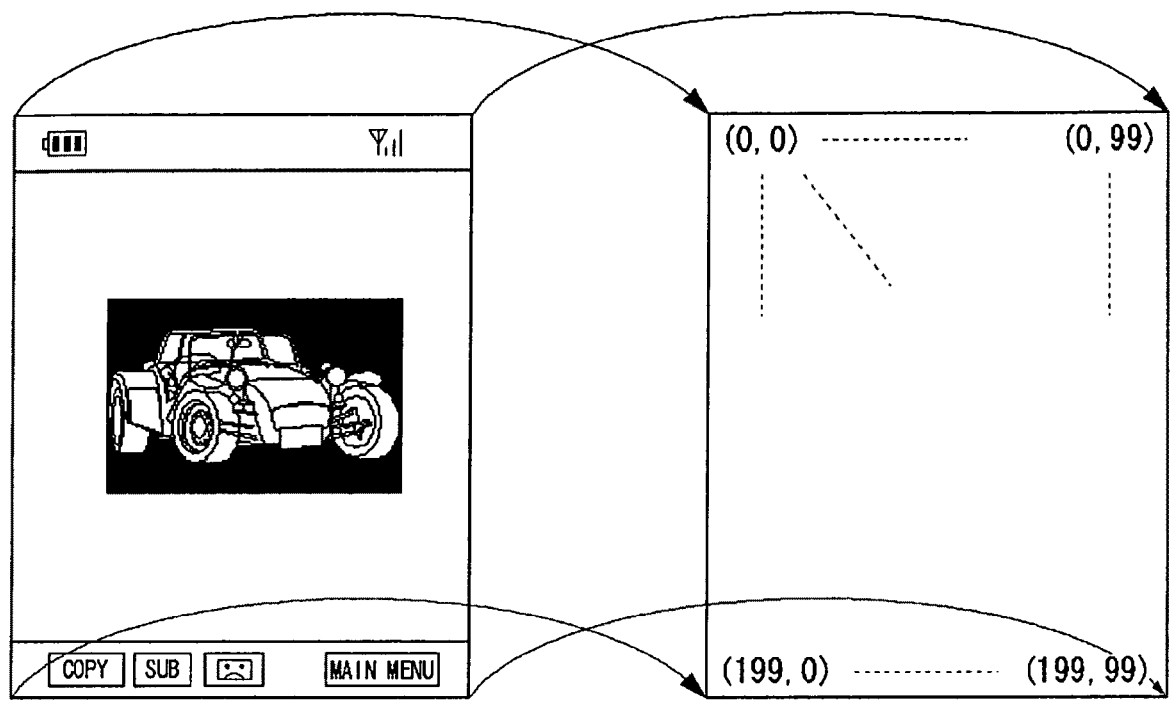
FIG. 36 is a figure showing relation between a display image which is displayed on an organic EL panel and is not scrolled, and a memory space.

FIG. 36 is a figure showing relation between the display image displayed on the organic EL panel 460 and not scrolled and the memory space. The display area of the organic EL panel 460 is constituted by 199*99 pixels. A left top position of this image corresponds to an address (0, 0) in the memory space and a right bottom position thereof corresponds to an address (199, 99).

The image data is written at the address in which the display image corresponds one by one to the memory space in the graphics memory 474 by the MPU 434 as shown in FIG. 36. The scroll of the image in the organic EL panel 460 is performed by changing a timing of reading the image data by the timing control IC 476. The method of scrolling in the first area L1, the method of scrolling in the second area L2, and the method of scrolling in the third area L3 differ each other. The method of scrolling in the first area L1 and in the third area L3 may be the same.

Figure 37B:
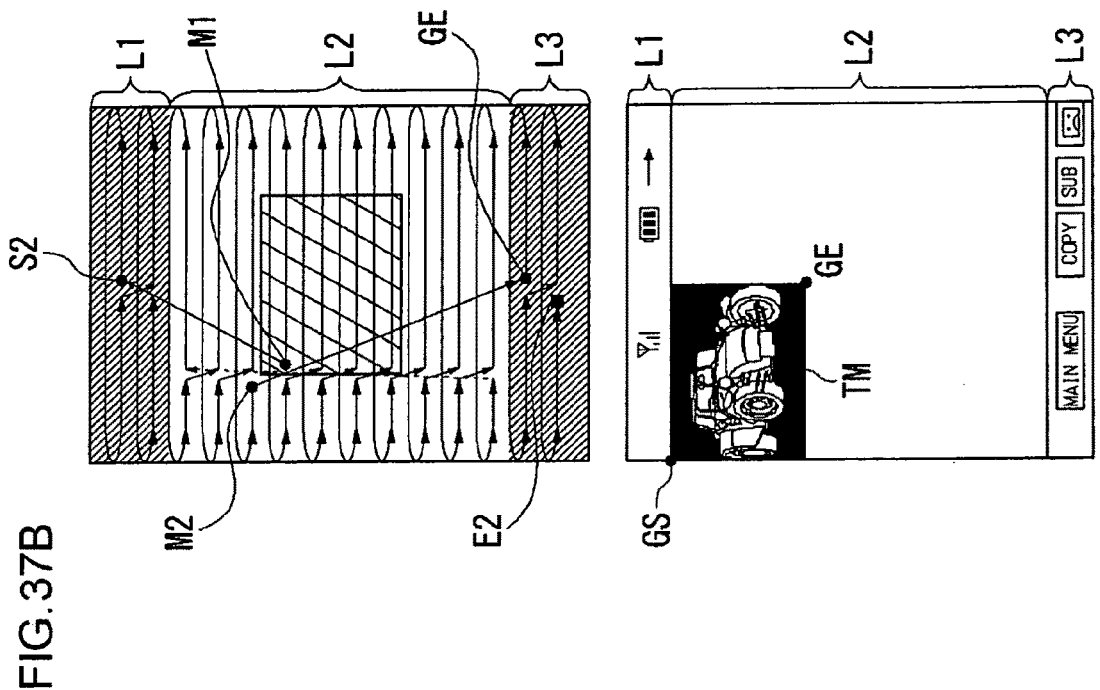
FIGS. 37A and 37B are figures showing a procedure of reading image data by a timing control IC.
Figure 37A:
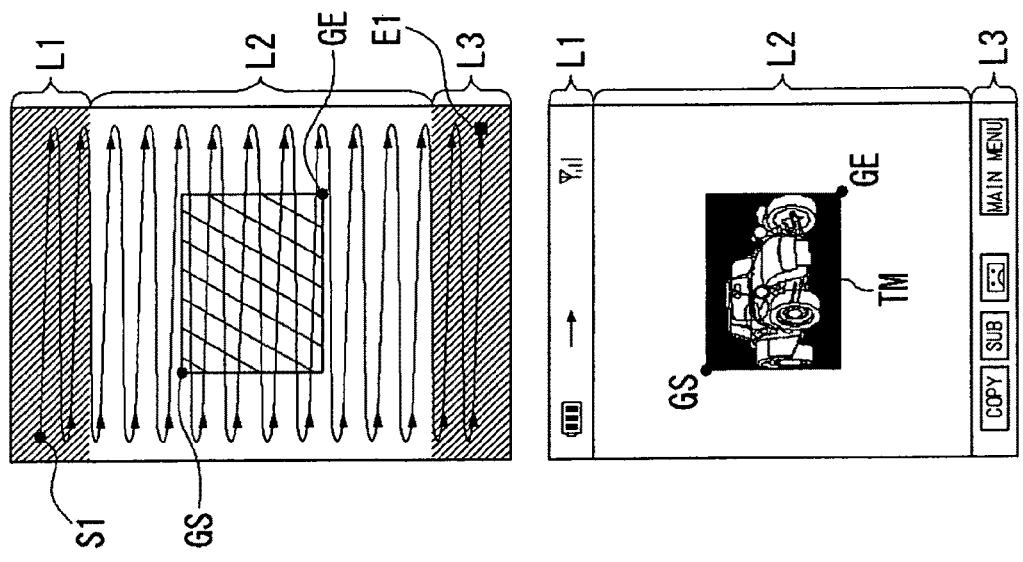

Reading the image data by the timing control IC 476 is explained based on FIGS. 37A and 37B. Upper column shows the memory space and lower column shows the display image. FIG. 37A shows a procedure of reading the image data written in the memory space in the case without scroll. The image data written in the memory space is the same in FIG. 37A and in FIG. 37B.

The read of the image data without scroll is carried out toward a horizontal direction one by one from the address (0, 0) S1 to the address (0, 99). Then, moving to the bottom of one line and the image data at the address (1, 0) is read. Similarly, the image data is sequentially read until the address (199, 99).

On the other hand, the read of the image data with scroll is shown in FIG. 37B. In this figure, the display image is scrolled only horizontally in the first area L1 and in the third area L3. The display image is shifted 50 pixels rightward. In the second area L2, the display image is scrolled not only horizontally but vertically.

The read of the image data is started at the address (0, 50). The image data is read sequentially. When the image data at the address (0, 99) is read, moving back to the top of the line, image data from the address (0, 0) to
the address (0, 49) is read. Then, image data at the address (1, 50) in a lower row is read. Similarly, the image data in the row is sequentially read.

Next, read of the image data in the first area L1 is completed, then read of the image data in the second area L2 is started. In the second area L2, the car picture TM is displayed from the left top point GS. The image data is read from the address corresponding to the point GS. This address is referred to as the image start address M1 for convenience sake. The image data is read from the address M1. If the image data is read to the bottom row of the second area L2, the image data in the top row of the second area L2 is read. If the image data is read to the address just before the address M1, all of the image data in the second area L2 is read.

Then, the image data in the third area L3 is started. Similar to the display image in the first area L1, the display image in the third area L3 is shifted 50 pixels leftward. Therefore, read-out is started from the image data at the address moved horizontally 50. Read of the image data in the third area L3 is carried out like read of the image data in the first area L1.

If the size and the display position of the display image are known when scrolling in the second area L2, it is possible to display the display image so that the display image may not be protruded from the organic EL panel 460. Since the MPU 434 is writing the image data in the graphics memory 474, the address of the start position GS of the image and the address of the end position GE of the image are grasped by the MPU 434. For this reason, the MPU 434 sets the read-out start address in the second area L2 so that the image may not be protruded from the organic EL panel 460. The scroll of the display image can be achieved by changing the address over time.

On the other hand, if the MPU 434 does not manage the size and the display position of the display image, the timing control IC 476 manages the size and the display position of the display image by detecting the image start position GS and the image end position GE of the display image.

The MPU 434 writes the only required image data which is corrected from the last display image to the graphics memory 474 one after another. Thereby, the MPU 434 may be unable to manage the picture start position GS and the picture end position GE in the second area L2. However, when the timing control IC 476 reads the image data from the memory, the picture start position GS and the picture end position GE of the second area L2 can be detected. The MPU 434 can manage the display position of the image by notifying the detected picture start position GS and the picture end position GE to the MPU 434. Scrolling without a protrusion of the image can be realized by setting the read-out start address of the second area L2 to the timing control IC 476.

The procedure of detecting the picture start position GS of the 2nd domain L2 by the timing control IC 476 and the picture end position GE is explained. It is assumed that a non-image area is covered with a single color as a premise. The address space of the second area L2 is known. If the data of the color which is not a non-image is outputted to the image data of the address in the second area L2, the timing control IC 476 detects the minimum address and the maximum address in horizontal and vertical for every frame. The detected addresses may be the picture start position GS and the picture end position GE in the second area L2. Here, the non-image area means the area other than the car picture TM among the second area L2.

As mentioned above, according to the fifth example, generating of phosphor burn-in can be reduced by shifting independently the image displayed on the display screen of the cellular phone according to the divided area, without getting worse a user's visibility.

These embodiments have been given solely by way of illustration. It will be understood by those skilled in the art that various modifications may be made to combinations of the foregoing components and processes, and all such modifications are also intended to fall within the scope of the present invention. Such modifications are given below.

In this embodiment, the image shifting unit 450 which shifts a display image is comprised in the image adjusting unit 432, the image shifting unit 450 may be comprised in the image source input unit 420 and the display image inputted in the organic EL driving circuit may be changed.

In this embodiment, the above-mentioned three conditions of the accumulated value of luminance at the time of shifting the display image are exemplified, but not restricted with these. For example, the difference of luminance set to the optical elements in the odd-numbered columns and the even-numbered columns may be accumulated until a certain time. And the difference of luminance set to the OLEDs in the odd-numbered columns and the even-numbered columns in the image to be displayed next may be accumulated. Then, the display image may be changed so that the degradation of the OLED may be averaged according to whether the accumulated value is positive or negative. The luminance set to the OLEDs in the odd-numbered columns and the even-numbered columns may be accumulated until a certain time. And the luminance set to the OLEDs in the odd-numbered columns and the even-numbered columns in the image to be displayed next may be accumulated. Then, the display image may be changed so that the degradation of the OLED may be averaged according to which of the accumulated value is greater. Here, the luminance set to the OLEDs in the even-numbered columns and the odd-numbered columns is compared, but the luminance set to the OLEDs in the even-numbered lines and the odd-numbered lines may be compared.

[Effect of the Fourth Embodiment]

The deterioration of display quality of the display apparatus can be suppressed according to the present embodiment. Particularly, the variation of the luminance in one screen and the deviation of the white balance can be mended. Moreover, the phosphor burn-in of a screen can be prevented in another viewpoint.

Fifth Embodiment

[Field of the Fifth Embodiment]

The present embodiment relates to a display apparatus, and it particularly relates to a technology for improving a display quality of the display apparatus.

[Related Art of the Fifth Embodiment]

Notebook type personal computers and mobile terminals are spreading widely. A liquid crystal display is mainly used as a display apparatus thereof. Organic EL (Electro Luminescence) display is expected as a next-generation flat display panel. As for the liquid crystal display, the straitness of the view angle and the lateness of response speed still remain as a subject. On the other hand, the organic EL display can solve the above-mentioned subject and can achieve high luminosity and high efficiency.

As for the organic EL display, however, it can not be avoided a change with the passage of time, that is, degradation, of an optical element because of the characteristic thereof. A white balance may collapse or a variation of luminance may be arisen by continuous use, even if the white balance is adjusted at the time of manufacture. It is known that degradation of the optical element of the organic EL display is remarkable compared with that of the liquid crystal display, and it is recognized that it is a big problem in view of the quality of a product.

In the organic EL display comprised in a cellular phone especially, a specific character or a specific character string is continuously displayed on a specific place in many cases. Hereafter, both of a character and a character string are also referred to as a "character string." Generally, in consideration of a user's visibility, such a character string is set up so that it can be clearly distinguished from the color of the circumferences, such as a background picture. Therefore, a remarkable difference of advance of degradation between the optical elements of an area in which the character is displayed and the surrounding optical elements tends to appear.

Moreover, since a character string is displayed from the upper part of a display screen when the character string contained in texts such as an E-mail is displayed, advance of degradation of an optical element differs in the upper part and a lower part of a display screen. The variation of luminance may be arisen thereby.

[Summary of the Fifth Embodiment]

An object of the present embodiment is to improve reduction of display quality caused by the above-mentioned variation of the luminance. Another object of the present embodiment is to avoid a phosphor burn-in of a display image caused by localizing the variation of the luminance.

An aspect of the present embodiment relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes, when a power supply of said display apparatus is turned on or off, the display form of the text data in a process of turning the power on or off. Here, the text data means a character.

Here, the display apparatus means an apparatus comprising a display screen, for example, a cellular phone, a PDA (Personal Digital Assistant), a personal computer, and the like. An organic light emitting diode (hereinafter, simply referred to as "OLED") as an optical element of an organic EL display deteriorates with passage of time as mentioned above. Cause of the deterioration is considered a current supplied to the OLED.

As mentioned above, a specific character or a specific image is displayed on a specific position in the display screen of the cellular phone in many cases. It may cause the phosphor burn-in. The degradation of the OLED can be averaged by changing a display position, luminance, or color tone of the character and the image displayed. Here, "average" may be a state almost equalized, and equalization should just be the grade where a user cannot recognize the variation of the luminance.

In the case of color display in the organic EL display, the degradation speed of the OLEDs of R (Red), G (Green), and B (Blue) differs since the materials thereof differ each other. Thereby, there may be arisen a phenomenon that the display image is displayed in a little green for example as the display is used. Therefore, it is necessary to equalize the grade of degradation of the OLED of each color of R, G, and B.

The change can be performed without making a user conscious by changing the display form of the text data when the user does not use the display apparatus. The form of the text data may be a kind, a size, a color, a brightness of the font for example. A color or a brightness of the background of the text data displayed may be changed.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes, when an application displayed on said display apparatus is changed, the display form of the text data in a process of the change of the application. The change of the application may be a change an application displayed on a display screen of a cellular phone from a web browser to an e-mail application for example. Moreover, it is contained in the change of the application, in a case where the frame which displays a certain application is changed to another frame, even if the application is performed and displayed. For example, in the case where the web browser is displayed, for example, the change of the frame which displays contents such as a homepage is included in the change of the application. Moreover, in the case where E-mail software is displayed, for example, the change from the screen for selecting the E-mail received to the screen which displays the E-mail actually selected is included in the change of the application.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes, when an electric mail is displayed on said display apparatus, the display form of the text data for every electric mail. That is, the display form of the text data is changed according to the electric mail displayed when received electric mail is displayed or when the electric mail under creation or edit is displayed.

Further another aspect of the present embodiment also relates to a display apparatus. This display apparatus is a display apparatus comprising an optical element, a display screen thereof can be opened and closed, the display apparatus comprising: a display changing unit which changes display form of a text data displayed on said display apparatus in a manner where a guessed value of degradation of each optical element can be averaged; and an opening-and-closing detecting unit which detects opening or closing of the display screen; wherein said display changing unit changes the display form of the text data when opening and closing of the display screen are detected by said opening-and-closing detecting unit.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes, while a character input means comprised in said display apparatus is operated for input of the character, the display form of the text data. The change of the display form of the text data is not limited to the change mentioned above, the color and the background color of the font may be reversed. The brightness of these colors may be adjusted according to the guessed value of the degradation of the optical element at the time of the reverse.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes, when an electric mail is displayed, the display form of the text data to be displayed according to whether the electric mail has already been read or has not been read yet. For example, a kind or size of a font of the electric mail which is already read or is not read yet when displaying the electric mail received.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes the display form of the text data according to the size of the text data to be displayed when an electric mail is displayed. For example, the size of the font is set large in the case where the size of the text data is 10 characters, the size of the font is set small in the case where the size of the text data is 100 characters.

The display changing unit may change the display form of the text data by changing a font type of the text data.

The display changing unit may shift an arbitrary character included in the text data using a margin space which is originally set to avoid displaying the characters touching each other.

Generally, the font does not use one line in one side of the display area so that the font may not contact with a neighbor font, and the line is set as the margin area. In a case of the font of 8*8 pixels, for example, only 7*7 pixels are used actually. Thereby, each vertical and horizontal one line can be used as the display area of the font.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit sets a background color of a line in which the text data is not inputted as an intermediate color between a display color of the text data and an originally selected background color when an application for inputting the text data is executed.

Further another aspect of the present embodiment also relates to a display apparatus. This display apparatus is a display apparatus comprising: an optical element; and a display changing unit which changes display form of a text data displayed on said display apparatus in a manner where a guessed value of degradation of each optical element can be averaged; wherein said display changing unit changes a luminance for displaying the text data according to a display position of the text data.

Optional combinations of the aforementioned constituting elements, and implementations of the invention in the form of methods, apparatuses and systems may also be practiced as additional aspects of the present invention.

[Example of the Fifth Embodiment]

In the present embodiment, a cellular phone comprising an organic EL display in a display screen as a display apparatus is considered. The phosphor burn-in of the organic EL display can be reduced by changing display form of a character string displayed on the cellular phone. The size or kind of the font of the character string to be displayed or the color thereof is changed when a user writes or reads an electric mail using the cellular phone. The font used for display is also changed when the power of the cellular phone is turned on or off.

Figure 38A:
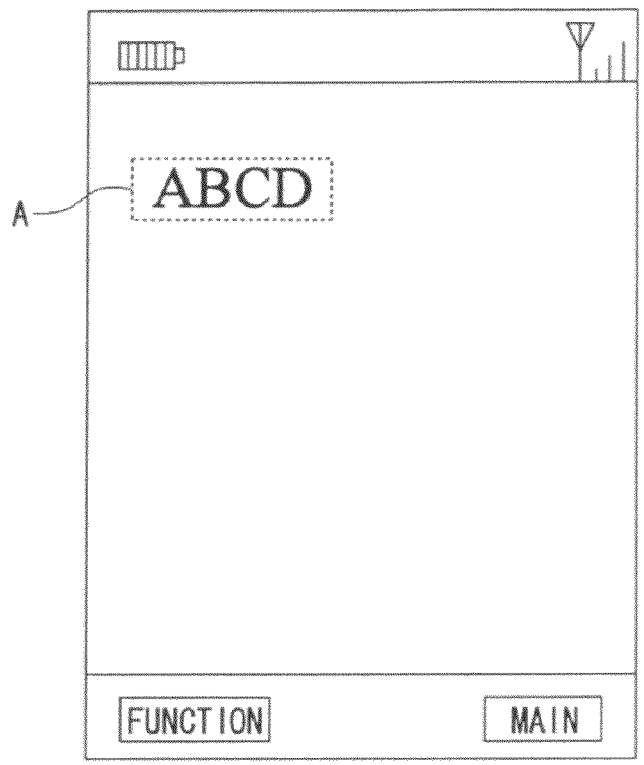
FIGS. 38A and 38B are figures showing a display screen in which a phosphor burn-in is arisen.
Figure 38B:
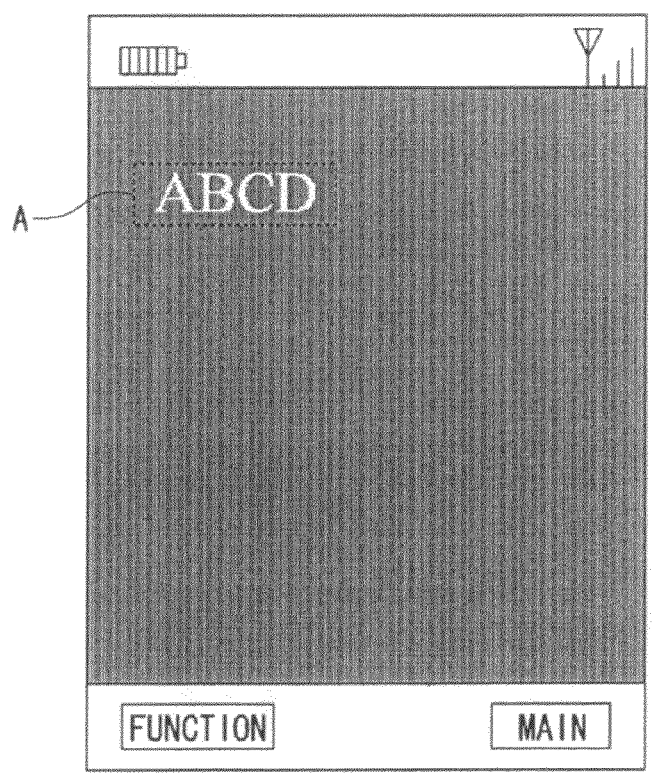

FIGS. 38A and 38B show a display screen in which the phosphor burn-in is arisen. In FIG. 38A, four characters "ABCD" are displayed in an area A on the display screen. If these characters are displayed in the area A for a long term, the four characters "ABCD" are seen as if these characters are displayed there when an image in which all pixels are same color is displayed, even if these characters are not displayed. That is, the phosphor burn-in is arisen in the area A.

When a character string is displayed on the display screen of the cellular phone, the character string is generally displayed on the same part in many cases. Moreover, the character string is displayed from upper left of the display screen in many cases, and it is not often that the character string is displayed on lower part of the display screen. Then, the font type of the character displayed on the display screen is changed, or the luminance of the screen is changed according to the area of the display screen.

The condition for changing the display form of the character string may be (1) when the power of the display apparatus is turned on or off, (2) when the display apparatus is opened or closed in a case where the display apparatus can be opened and closed like a fold-down type cellular phone, (3) when changing an application, (4) when a certain application, here, an e-mail application for example, is executed, (5) when there is no operation from a user for a predetermined term. In a case where the e-mail application is executed, the display form used may be changed according to whether the e-mail is already read or not, or the number of the characters included in the e-mail.

Figure 39A:
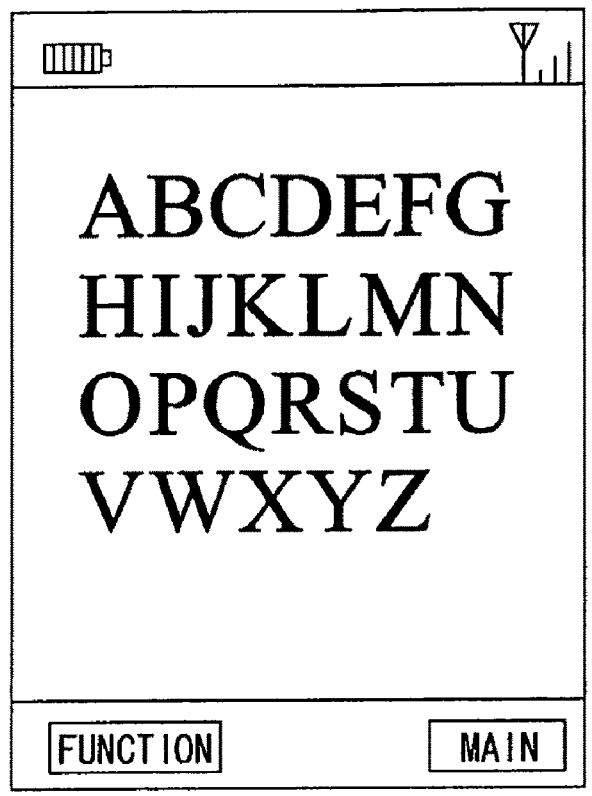
FIGS. 39A and 39B are figures showing a display screen in which a character string is displayed with two kinds of fonts different from each other.
Figure 39B:
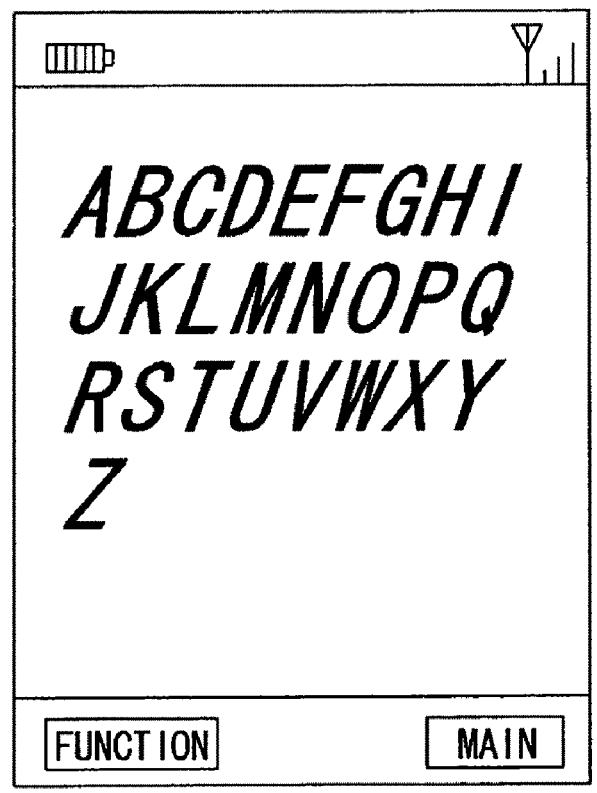

FIGS. 39A and 39B are figures showing a display screen in which a character string is displayed with two kinds of fonts different from each other. The font displayed in FIG. 39B is thin as a whole and inclines, compared with the font displayed in FIG. 39A. In FIG. 39A, five characters of the string are displayed on the fourth line, on the other hand, only one character of the string is displayed on the fourth line in FIG. 39B. An area where the character string is displayed may be changed by changing the font. That is, the phosphor burn-in of the display screen can be reduced by changing the kind of the font.

Figure 40A:
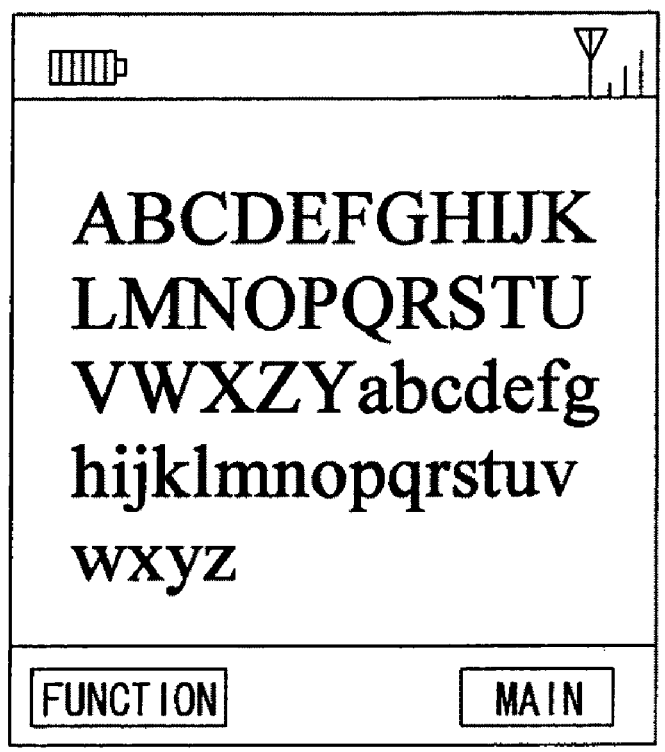
FIGS. 40A and 40B are figures showing a display screen in which a character string is displayed with two size of font, large and small.
Figure 40B:

FIGS. 40A and 40B are figures showing a state where the size of the font used is changed when the number of the characters displayed on the display screen is different.

In FIG. 40A, 52 characters of alphabet from "A" to "Z" in a capital and small letter are displayed. On the other hand, in FIG. 40B, 26 characters of alphabet from "A" to "Z" in only capital letter are displayed. In FIG. 40B, the number of the characters is decreased. If the font of the same size as the font displayed in FIG. 40A is used, the characters are displayed on only half of the display screen. Then, the character string can be displayed on the whole display screen by enlarging size of the font. Generally, when displaying a text and the like, the character string is displayed from the upper left of the display screen, and is not displayed on the bottom of the display screen in many cases. Then, text data can be displayed on the whole display screen by changing the size of the font.

Thereby, the case where only a part of the display screen is used frequently can be reduced, and the phosphor burn-in can be reduced.

Figure 41:
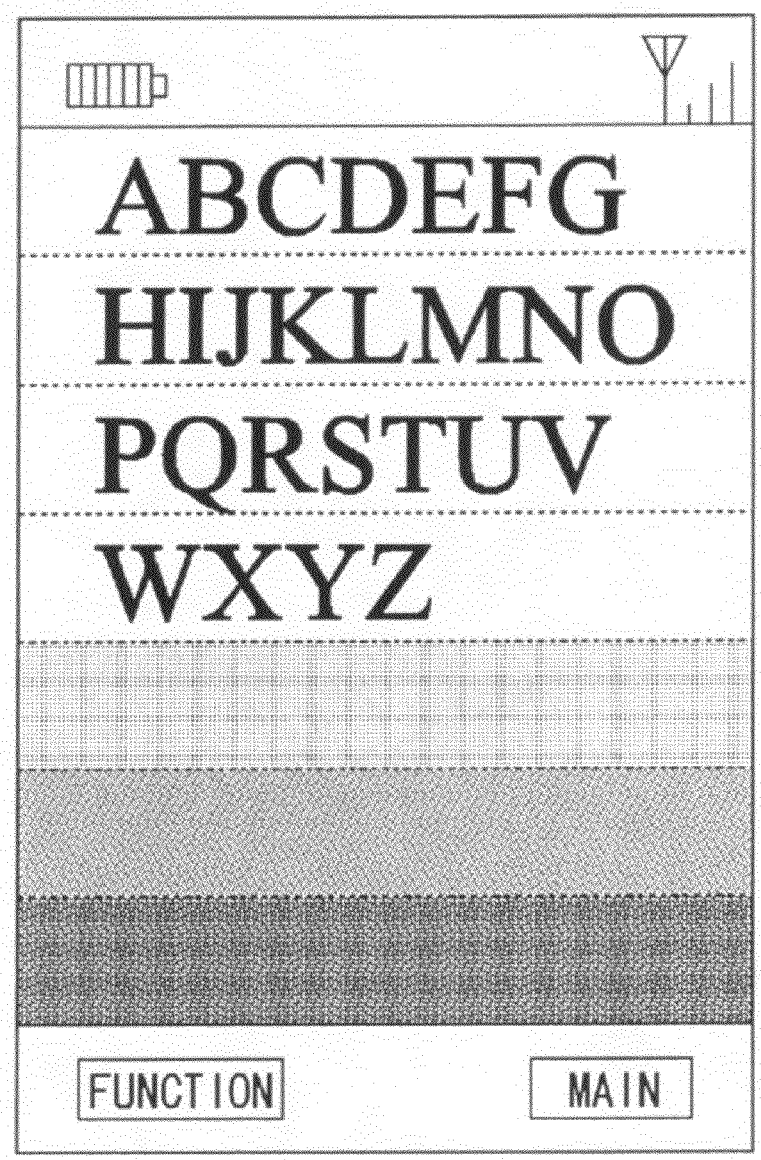
FIG. 41 is a figure showing a state where a color of an area where a character string is not displayed is gradually changed from a background color to a display color of the character string.

FIG. 41 is a figure showing a state where a color of an area where a character string is not displayed is gradually changed from a background color to a color same as the display color of the character string. The character string is displayed from the top to the fourth line. On the other hand, the character string is not displayed in the fifth to seventh lines. The color tone of these lines is gradually changed for every line so that the color may not be changed extremely. All the lines in which the character string is not displayed may be displayed in the same color, for example, an intermediate color between the color of the character and the color of the background.

Figure 42A:
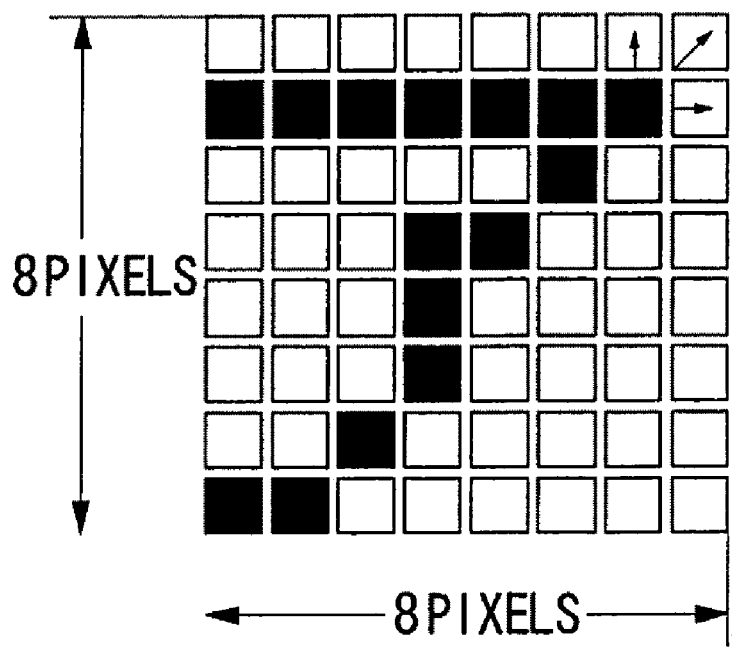
FIGS. 42A and 42B are figures showing a state where a character is shifted in a pixel area which forms one font.
Figure 42B:
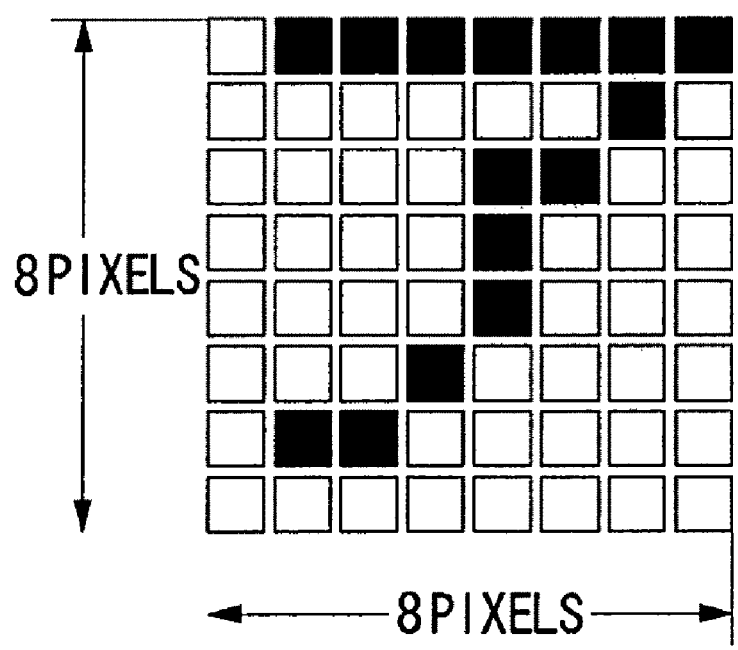

FIGS. 42A and 42B are figures showing a state where a Japanese is displayed in an area of 8*8 pixels. The pixels of the top row and rightmost column of this area is set up as a margin space so that neighboring characters may not be touched. This area is also used as the display area at the time of shifting the character. FIG. 42A shows a state before the character is shifted, and FIG. 42B shows a state where the character string is shifted one pixel to up and right, respectively. In the case where the character string consists of two or more characters, a character may be shifted one pixel to up, another right, or further another not shifted, for example, depending on the character. The phosphor burn-in can be reduced without spoiling display quantity greatly.

The apparatus for realizing the above-mentioned change of the display form of the character string and its operation are shown hereinafter.

Figure 43:
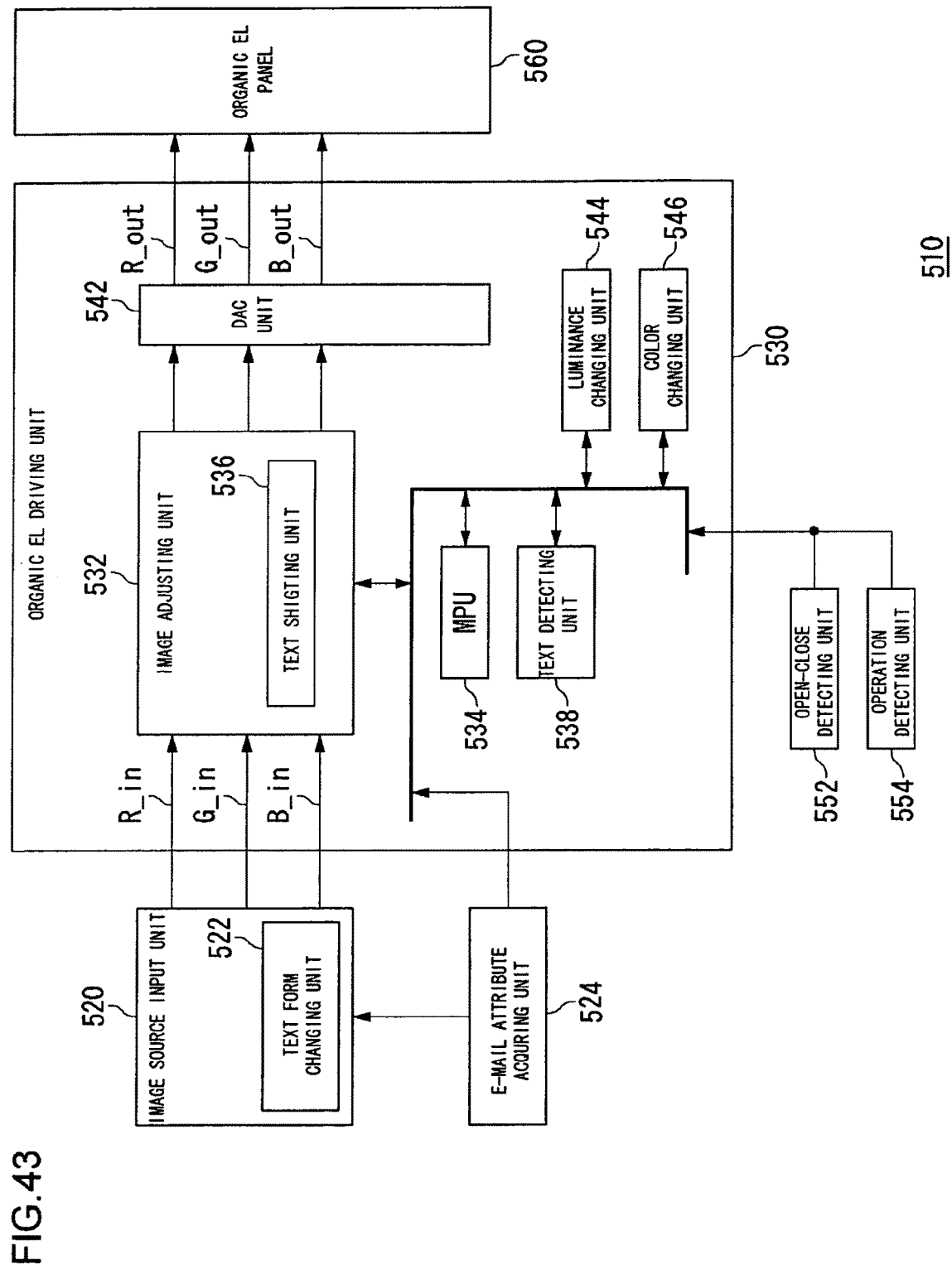
FIG. 43 is a structure diagram of an organic EL display apparatus according to an embodiment.

FIG. 43 is a block diagram showing a basic structure of an organic EL display apparatus 510. The organic EL display apparatus 510 is constituted by an image source input unit 520, an e-mail attribute acquiring unit 524, an open-close detecting unit 552, an operation detecting unit 554, an organic EL driving circuit 530, and an organic EL panel 560.

The organic EL driving circuit 530 comprises an image adjusting unit 532 which carries out various processings to a digital image signal inputted from the image source input unit 520, an MPU (Micro Processing Unit) 534 which calculates when these processings are carried out, and a DAC (Digital to Analog Converter) unit 542 which converts the image signal carried out processing to an analog signal. The organic EL driving circuit 430 further comprises a text detecting unit 538, a luminance changing unit 544, and a color changing unit 546. The organic EL driving circuit 538 further comprises a control signal generating unit which generates various timing control signals and a memory which functions a table when actual processing is carried out, which are not shown in the figure.

The image adjusting unit 532 performs an offset adjusting to adjust a brightness, a gain adjusting to adjust a contrast, and a processing to adjust input image signal which is performed gamma correction to voltage-emitting luminance (V-T) characteristic of the organic EL panel.

When the display form of the character string is not changed, three kinds of the digital signals R_in, G_in, and B_in are inputted from the image source input unit 520 to the image adjusting unit 532. The image adjusting unit 532 performs image adjusting processing like the offset adjusting and the gain adjusting. The digital signals are outputted from the DAC unit 542 as three kinds of analog signals R_out, G_out, and B_out to the organic EL panel 560.

When the display form of the character string is changed, the change is carried out by the structure shown below. The image adjusting unit 532 comprises a text shifting unit 536 which shifts the character to use an area where the character does not originally use among pixels which constitute the font as shown in FIG. 42.

The text detecting unit 538 detects the character string from the inputted digital image signal. The text detecting unit 538 changes the display form of the detected character string in collaboration with the MPU 534 as shown in FIGS. 39 and 40. The luminance changing unit 544 changes the luminance of the character according to a display position thereof. The luminance changing unit 544 also changes the luminance in an area where the character string is not inputted as shown in FIG. 41. Similarly, the color changing unit 546 changes the color of the character and the color of an area where the character string is not inputted.

The e-mail attribute acquiring unit 524 acquires an attribute of each e-mail when an e-mail application is executed. The attribute may be (1) whether the e-mail is already read or not, (2) the number of the characters included in the e-mail and the like.

The image source input unit 520 further comprises a text form changing unit 522. The text form changing unit 522 changes the display form of the character string displayed in the e-mail based on the attribute acquired by the e-mail attribute acquiring unit 524. The change of the display form is also carried out by the text detecting unit 538, but the change here is carried out before the digital image signal is inputted to the organic EL driving circuit 524. The text detecting unit 538 may change the display form of the character string based on the attribute of the e-mail acquired by the e-mail attribute acquiring unit 524.

The open-close detecting unit 552 detects open or close of the display screen in a case where the display screen of the cellular phone is a fold-down type. The open-close detecting unit 552 instructs the MPU 534 to change the display form of the character string used in the cellular phone when detecting. The operation detecting unit 554 instructs the MPU 534 to change the display form of the character string used in the cellular phone when there is no operation to the cellular phone for a predetermined term.

In terms of hardware, this structure can be realized by a CPU, a memory and other LSIs of an arbitrary computer. In terms of software, it is realized by memory-loaded programs or the like having a function of controlling display, but drawn and described here are functional blocks that are realized in cooperation with those. Thus, it is understood by the skilled in the art that these functional blocks can be realized in a variety of forms by hardware only, software only or the combination thereof.

As mentioned-above, according to this embodiment, the generation of the luminance variation in the display screen can be reduced by changing the display form of the character string and by changing the background color of the display screen according to whether the character string is displayed or not. Moreover, the phosphor burn-in of the display screen caused by the concentration of the luminance variation can be reduced.

These embodiments have been given solely by way of illustration. It will be understood by those skilled in the art that various modifications may be made to combinations of the foregoing components and processes, and all such modifications are also intended to fall within the scope of the present invention.

[Effect of the Fifth Embodiment]

According to this embodiment, reduction of deterioration of the display quality caused by the luminance variation is expectable. Moreover, reduction of the phosphor burn-in of the display screen caused by the concentration of the luminance variation is also expected in another view point.

Although the present invention has been described by way of exemplary embodiments, it should be understood that many changes and substitutions may be made by those skilled in the art without departing from the spirit and the scope of the present invention which is defined only by the appended claims.

What is claimed is:

1. A mobile terminal which comprises an organic electroluminescence display apparatus and can display an electric mail received or to be sent, the mobile terminal comprising:
    an image processing circuit which can switch a display mode between a black character display mode in which a character part is displayed in black or a color with luminance lower than that of a background part and the background part is displayed in white or a color with luminance higher than that of the character part, and a white character display mode in which the background part is displayed in black or a color with luminance lower than that of the character part and the character part is displayed in white or a color with luminance higher than that of the background part; and
    a control circuit which controls an operation of said image processing circuit;
    wherein said control circuit alternately switches the display mode between the black character display mode and the white character display mode.

2. The mobile terminal according to claim 1, wherein said control circuit instructs a mode switch between the black character display mode and the white character display mode in accordance with a predetermined rule.

3. The mobile terminal according to claim 1, wherein said control circuit switches the mode between a display of a mail at the time of mail creation, and a display of a mail which has already been received or transmitted.

4. The mobile terminal according to claim 1, wherein said control circuit switches the mode for every one time or predetermined number of times on the occasion of a display of a mail at the time of mail creation.

5. The mobile terminal according to claim 1, wherein said control circuit switches the mode for every one time or predetermined number of times on the occasion of a display of a mail which has already been received or transmitted.

6. The mobile terminal according to claim 1, wherein said control circuit switches the mode between a display of a mail which has already been received, and a display of a mail which has already been transmitted.

7. The mobile terminal according to claim 1, wherein said control circuit switches the mode with a predetermined cycle.

8. The mobile terminal according to claim 1, wherein said control circuit switches the mode at a random timing.

9. A display method of a specific picture which is displayed on a color organic EL display and in which a lighting for only a part of the displayed specific picture is increased or decreased according to a frequency of display of the part in a display area of the color organic EL display corresponding to the specific picture being displayed, wherein a higher frequency of display of the part causes a lower predetermined luminance to be set for only the part of the specific picture displayed in the display area.

10. A display method of a specific picture which is displayed on a color organic EL display and in which a lighting part of the specific picture increases or decreases according to a situation, wherein the higher a probability of lighting of a part, the lower a luminance of the part, and the specific picture is a picture showing an antenna and/or a picture showing residual quantity of a battery.

* * * * *